(12) United States Patent
Kunitake et al.

(10) Patent No.: US 7,069,501 B2
(45) Date of Patent: Jun. 27, 2006

(54) STRUCTURED DOCUMENT PROCESSING SYSTEM AND STRUCTURED DOCUMENT PROCESSING METHOD

(75) Inventors: Setsu Kunitake, Nakai-machi (JP); Ichiro Yamashita, Nakai-machi (JP); Shigehisa Kawabe, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1119 days.

(21) Appl. No.: 09/765,434

(22) Filed: Jan. 22, 2001

(65) Prior Publication Data

US 2001/0018697 A1 Aug. 30, 2001

(30) Foreign Application Priority Data

Jan. 25, 2000 (JP) .............................. 2000-018059

(51) Int. Cl.
*G06K 9/36* (2006.01)

(52) U.S. Cl. ...................... 715/513; 715/511; 715/514

(58) Field of Classification Search .................... 707/1; 715/513, 501.1, 511, 514; 364/419
See application file for complete search history.

(56) References Cited

U.S. PATENT DOCUMENTS

| | | | | |
|---|---|---|---|---|
| 5,367,621 | A * | 11/1994 | Cohen et al. ............. | 715/501.1 |
| 5,438,512 | A * | 8/1995 | Mantha et al. ............ | 715/517 |
| 6,014,680 | A * | 1/2000 | Sato et al. ............... | 715/513 |
| 6,546,406 | B1 * | 4/2003 | DeRose et al. ........... | 715/513 |
| 6,635,089 | B1 * | 10/2003 | Burkett et al. ........... | 715/513 |
| 6,643,633 | B1 * | 11/2003 | Chau et al. .............. | 707/1 |

FOREIGN PATENT DOCUMENTS

| | | |
|---|---|---|
| JP | A 6-52161 | 2/1994 |
| JP | A 7-56920 | 3/1995 |

OTHER PUBLICATIONS

U.S. Appl. No. 60/168,659.*
Jocelyne, Using structured types to incorporate knowledge in hypertext, 1991, ACM Press, pp. 329-343.*
"Akane Document Operation Command Set Programs Guide", Fuji Xerox Co., Ltd., pp. 2-95 to 2-96.
"XML Development Examples", ASCII Corporation, pp. 277-292.

* cited by examiner

*Primary Examiner*—Heather R. Herndon
*Assistant Examiner*—Gautam Sain
(74) *Attorney, Agent, or Firm*—Oliff & Berridge, PLC

(57) ABSTRACT

Without using a script that describes a procedure, document parts are extracted from structured documents and inserted or substituted in a template to synthesize a document. An extraction instruction to retrieve document parts, and repetitive duplication and insertion/substitution instructions are provided to the structured documents. Therefore, document part retrieval, repetitive duplication, and a document part (location) in which a document part is to be inserted or substituted are specified, and instructions retrieved from plural inputted structured documents are dynamically synthesized to create a document processing description, so that a document processing description script becomes unnecessary. Consequently, the inconvenience of managing scripts in addition to original documents is eliminated.

14 Claims, 33 Drawing Sheets

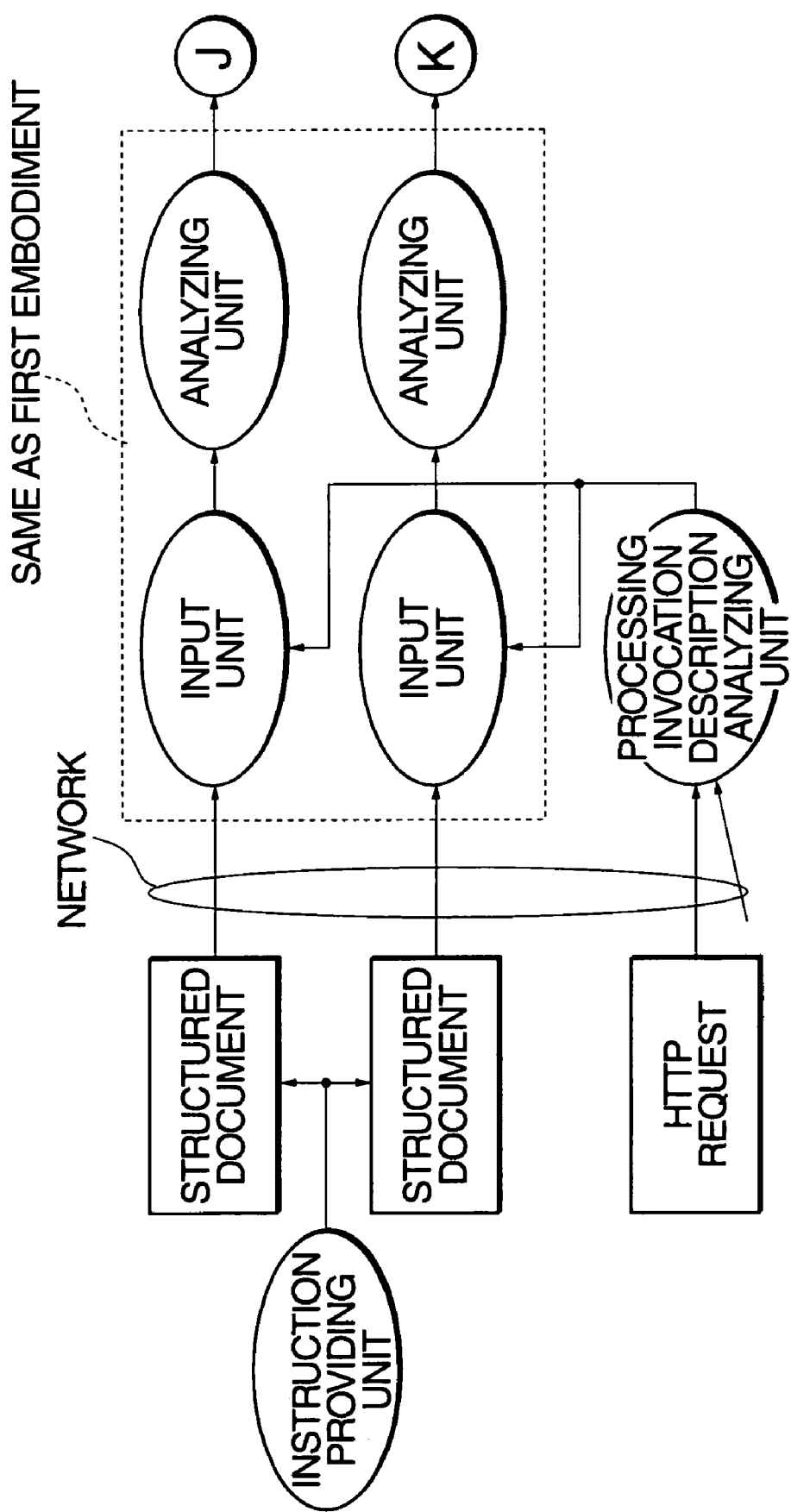

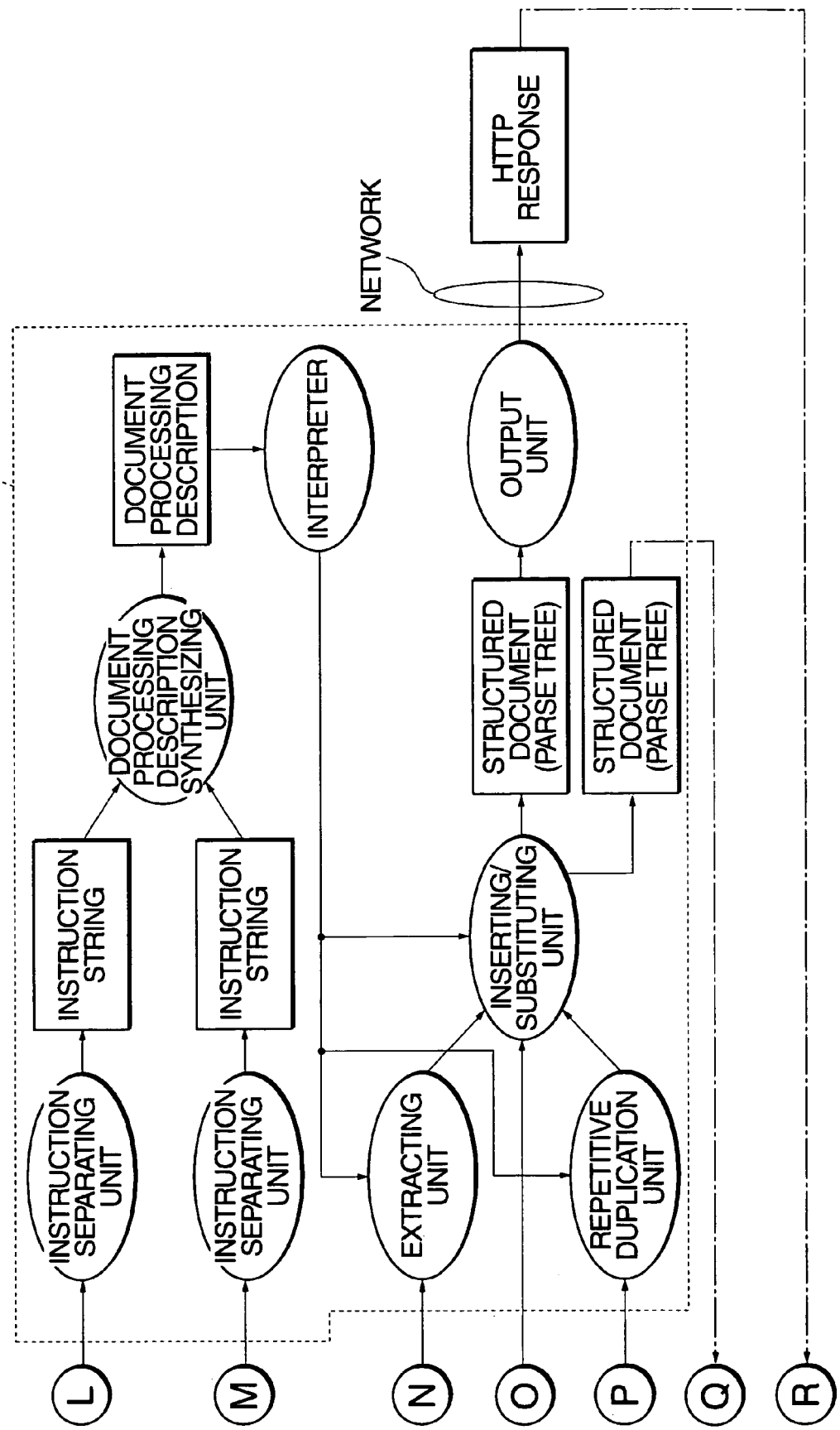

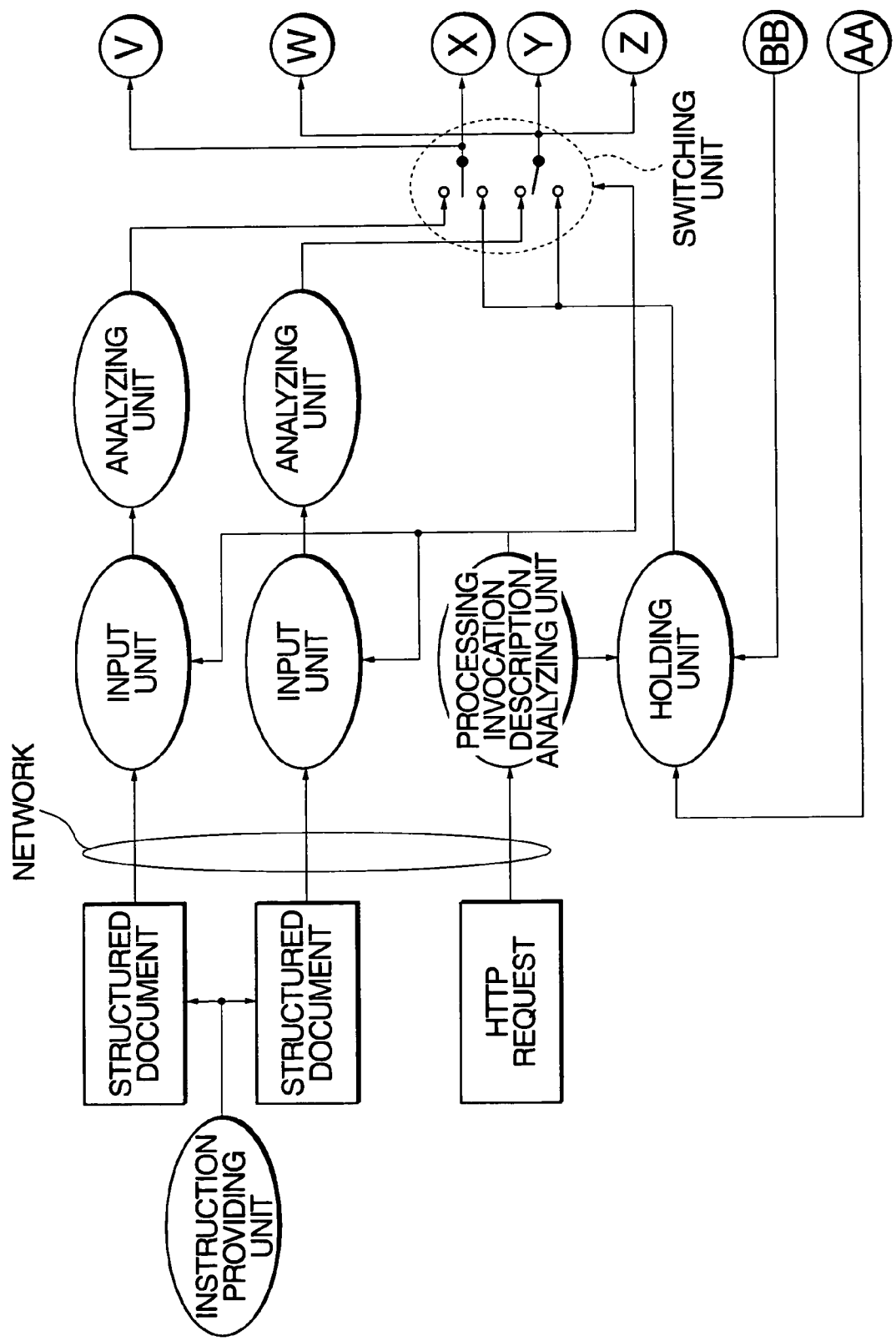

FIG.18

TEAM A OCTOBER REPORT ← PORTION SPECIFIED BY EXTRACTION INSTRUCTION

SUMMARY

PORTION SPECIFIED BY EXTRACTION INSTRUCTION

- PROGRESS OF ITEM 1 60%: ON SCHEDULE
- PROGRESS OF ITEM 2 30%: THREE DAYS BEHIND SCHEDULE
- PROGRESS OF ITEM 3 70%: UNEXPECTED PROBLEM OCCURRED. IT IS NECESSARY TO REVIEW THE SCHEDULE

FIG.19

MONTHLY REPORT FOR TEAM B ← PORTION SPECIFIED BY EXTRACTION INSTRUCTION

SUMMARY — PORTION SPECIFIED BY EXTRACTION INSTRUCTION

| ITEM | PROGRESS | EVALUATION |
|---|---|---|
| 1 | 20% | A LITTLE BEHIND SCHEDULE (ONE DAY) |
| 2 | 40% | NO DELAY |
| 3 | 60% | AHEAD OF SCHEDULE: THREE DAYS |

FIG.20

PROGRESS SUMMARY

| TEAM | STATUS | EVALUATION |
|---|---|---|
| TEAM A | · PROGRESS OF ITEM 1 60%: ON SCHEDULE<br>· PROGRESS OF ITEM 2 30%: THREE DAYS BEHIND SCHEDULE<br>· PROGRESS OF ITEM 3 70%: UNEXPECTED PROBLEM OCCURRED. IT IS NECESSARY TO REVIEW THE SCHEDULE | A LITTLE BEHIND SCHEDULE (ONE DAY) |
| TEAM B | ITEM  PROGRESS<br>  1      20%<br>  2      40%<br>  3      60% | NO DELAY<br>AHEAD OF SCHEDULE: THREE DAYS |

FIG.21

PROGRESS SUMMARY

| TEAM | TEAM A | TEAM B | |
|---|---|---|---|
| STATUS | · PROGRESS OF ITEM 1 60%: ON SCHEDULE<br>· PROGRESS OF ITEM 2 30%: THREE DAYS BEHIND SCHEDULE<br>· PROGRESS OF ITEM 3 70%: UNEXPECTED PROBLEM OCCURRED. IT IS NECESSARY TO REVIEW THE SCHEDULE | ITEM | PROGRESS | EVALUATION |
| | | 1 | 20% | A LITTLE BEHIND SCHEDULE (ONE DAY) |
| | | 2 | 40% | NO DELAY |
| | | 3 | 60% | AHEAD OF SCHEDULE: THREE DAYS |

FIG.24

| PROGRESS SUMMARY | |
|---|---|
| TEAM | STATUS |
| TEAM A | • PROGRESS OF ITEM 1 60%: ON SCHEDULE<br>• PROGRESS OF ITEM 2 30%: THREE DAYS BEHIND SCHEDULE<br>• PROGRESS OF ITEM 3 70%: UNEXPECTED PROBLEM OCCURRED. IT IS NECESSARY TO REVIEW THE SCHEDULE |
| TEAM B | ITEM  PROGRESS     EVALUATION<br>1     20%           A LITTLE BEHIND SCHEDULE (ONE DAY)<br>2     40%           NO DELAY<br>3     60%           AHEAD OF SCHEDULE: THREE DAYS |

FIG.25

| PROGRESS SUMMARY | |
|---|---|
| TEAM | STATUS |
| TEAM A | • PROGRESS OF ITEM 1 60%: ON SCHEDULE<br>• PROGRESS OF ITEM 2 30%: THREE DAYS BEHIND SCHEDULE<br>• PROGRESS OF ITEM 3 70%: UNEXPECTED PROBLEM OCCURRED. IT IS NECESSARY TO REVIEW THE SCHEDULE |
| TEAM B | ITEM  PROGRESS     EVALUATION<br>1     20%           A LITTLE BEHIND SCHEDULE (ONE DAY)<br>2     40%           NO DELAY<br>3     60%           AHEAD OF SCHEDULE: THREE DAYS |

STRUCTURED DOCUMENT PROCESSING SYSTEM AND STRUCTURED DOCUMENT PROCESSING METHOD

BACKGROUND OF THE INVENTION

1. Field of the Invention

The present invention relates to a structured document processing technology of disassembling a document into chapters, sections, paragraphs and charts, or plural primitives such as captions, chapter titles, and summaries to represent and handle the document, using a structure such as a tree structure or graph structure with the primitives as nodes, and more particularly to a structured document processing technology of newly synthesizing a document from plural structured documents.

To be more specific, the present invention relates to a structured document processing technology of retrieving document portions ("document parts") satisfying specific conditions from plural structured documents and inserting or substituting the document parts in other documents for document synthesis, and relates to a structured document processing technology of synthesizing documents without using a script that describes a procedure for extracting document parts from the structured documents, and inserting or substituting the document parts in a document as a template.

2. Description of the Prior Art

It is rare that a document is made up of only strings, and generally it often includes segments such as chapters, sections and paragraphs, and inserted contents such as charts, or primitives such as captions, chapter titles, and summaries.

For this reason, document processing technologies have been developed which disassemble a single document into chapters, sections, paragraphs and charts, or plural primitives such as captions, chapter titles, and summaries to represent and handle the document, using a structure such as a tree structure or a graph structure with the primitives as nodes. Documents thus structured are generally called "structured documents" and can be processed in various ways using computing systems.

In a structured document, a parent-child relationship represented by nodes and links expresses a logical structure of the document. For example, for nodes having attributes such as "chapter title", "diagram", and "chapter", layout processing for printing on a node basis, final copy creation processing, and automatic creation of an abstract collection and a table of contents from the node attributes can be performed.

Presently, as formats for describing structured documents, description languages such as SGML (Standard Generalized Markup Language), XML (eXtensible Markup Language), HTML (Hyper Text Markup Language) are well known. For example, HTML has notations for specifying tables (TABLE) and an item list (UL).

One method of specifying a structure for a plane text file is a method called markup. Markup defines a structure by sandwiching a portion of a document by a tag symbol for indicating the start of a specific logical structure and a tag symbol for indicating the end thereof according to predetermined rules. For example, HTML describes an item list as follows by using <UL> as an item list start tag, </UL> as an item list end tag, <LI> as an item start tag, and </LI> as an item end tag.

<UL>
<LI> item 1 of item list </LI>
<LI> item 2 of item list </LI>
<LI> item N of item list </LI>
</UL>

A method of synthesizing such structured documents is proposed. According to the method, searching is performed based on document structures to retrieve document portions (hereinafter referred to as "document parts") satisfying specific conditions from plural documents and insert the retrieved document parts in other documents for document synthesis. For example, in a document processing method disclosed as "Document Processing Method and Document Processing Apparatus" in Japanese Published Unexamined Patent Application No. Hei 6-52161 already assigned to the applicant, from a structured document represented in a tree or graph structure, document parts having given attributes are retrieved by select-type instructions specifying the types of document parts (referred to as components in the publication) represented as nodes and inserted into a second document. There is shown an example that specifies, e.g., "Figure" and "Segment" as arguments of the select-type instruction to retrieve figures and sections, respectively. As for insertion of document parts, an example is described which specifies a specific node of a document into which to insert them and inserts them in the last child node of the specified node. By judging parent-child relationships of nodes, a node having a specific structure pattern can be retrieved.

"Akane" produced by Fuji Xerox Co., Ltd. is a document processing application software product based on an structured document editor that operates on a window system. Document processing command sets are provided as tools for Akane. In Chapter 3 "Application Examples" of "Akane Document Operation Command Set Programmers Guide" on pages 2–95 and 2–96, examples are described which retrieve nodes having structures satisfying specific conditions as document parts for synthesis into one document.

In this way, a program in advance specifying a retrieval expression and a program for processing document parts retrieved as retrieval results are coupled by a pipeline, whereby document parts satisfying specific conditions as path pattern expressions can be retrieved from an input original document to synthesize a new structured document and document parts.

As already described, XML is a language capable of describing structured documents. In "XML Development Examples" (Ascii Corp. ISBN-7561-3112-3), there are disclosed the XSL (extensible Stylesheet Language) language that inputs and processes structured documents described in XML, and the handling of structured documents by its processor. The syntax of XSL has the following structure, for example.

<rule>

[pattern]

[action]

</rule>

[pattern] describes a retrieval expression for document parts to be processed. [action] describes processing for retrieved document parts. An example of a retrieval expression is shown below.

```
<rule>
    <target-element type="section"/>
<element type="figure"/>
[action]
</rule>
```

<target-element type="section"/> indicates that the node type of a document part to be retrieved is "section", and the next <element type="figure"/> is a retrieval expression for limiting the document part so as to contain a child node having "figure" as the node type of the document part.

An example shown below is an expression for retrieving document parts that a node type is "employee" and the type of a parent node is "person".

```
<rule>
    <element type="employee"/>
    <target-element type="person"/>
    [action]
</rule>
```

In this way, by interpreting and executing a script in advance describing a retrieval expression and action for processing document parts retrieved as retrieval results, document parts satisfying specific conditions can be retrieved from an input original document to synthesize a new structured document and document parts.

A document processing apparatus disclosed as "Structured Document Processing Apparatus" in Japanese Published Unexamined Patent Application No. Hei 7-56920 already assigned to the applicant has a partial structure string extraction part that extracts plural document parts from structured documents and outputs a string of document parts, and a processing execution part that inputs and processes the string of document parts. According to the document processing apparatus thus configured, by separately managing an extraction specification part and a processing specification part, for a change of the structure of an original document, changes of document processing can be confined to only the extraction specification part. For example, it becomes easy to revise and maintain the system and documents in response to the above-described conventional technologies.

The above-described conventional technologies take a system configuration as shown in FIG. 26 or 27. For example, in a structured document processing system as shown in FIG. 26, first, an original document and a template are inputted to an extracting/synthesizing program. The extracting/synthesizing program performs a procedure such as extraction of document parts from the original document and the insertion and substitution of the document parts in the template according to an extraction/synthesis script described in script format, and generates a synthesized document.

In a structured document processing system as shown in FIG. 27, an extracting program extracts document parts from an original document according to a procedure described in an extraction script. The extracted document parts are inputted to a synthesizing program along with a template. The synthesizing program performs the insertion and substitution of the document parts in the template according to a procedure described in a synthesis script, and generates a synthesized document.

Any of these above-described technologies uses a script (extraction script) describing a procedure for extracting document parts from an original document and a script (synthesis script) for inserting or substituting document parts extracted from the original document into a template which serves as the base of a document outputted as a result. In other words, these conventional technologies, which require management of these scripts, in addition to the original documents, have the problems described below.

1. To retrieve document parts from an original document, a retrieval expression for locating the structures and patterns of the document parts must be described in a script. Therefore, changes of the structure of the original document involve corresponding modifications of the retrieval expression in the script.

2. To process a mixture of plural original documents that are structurally different, a different script must be prepared for each of different structures.

3. It is difficult to describe as a procedure a retrieval expression for locating the structures and patterns of document parts and steps for processing the retrieved document parts. Generally, the procedure that "document parts satisfying condition A are retrieved and procedure B is performed for obtained results" must be described as a script. Where the number of document parts depends on original documents, commands must be described as a script, to perform repetition processing (e.g., insertion and substitution) by combining repetition instructions such as "for" and "repeat" statements to count the number of document parts and perform repetition, and instructions (e.g., insertion instruction) to actually perform desired processing. The creation of such a description and script requires as much knowledge as required for programming, probably making widespread use among general users difficult.

4. No reference is made to a mechanism for easily reusing intermediate results of document processing (e.g., document parts extracted by retrieval processing). For example, the above-described Akane requires that a script to save intermediate results in a file is explicitly described.

The first problem is in the point that, where the structure of an original document is changed, all scripts to process the original document must be searched for, and the negligence to modify the scripts causes document processing to malfunction.

The second problem is in the point that, for each of input documents different in structure, the development and maintenance of a dedicated script to process the input document require much expense in time and effort. Users must select an appropriate script for use. If an appropriate script is not selected, an improper operation of document processing or other malfunctions might occur.

With the third problem, it is extremely difficult for users themselves to implement a document processing system capable of creating structured document processing applications serving individual purposes.

The fourth problem is in the point that the development of efficient applications requires much time.

SUMMARY OF THE INVENTION

The present invention has been made in consideration of the above-described technical problems and provides an excellent structured document processing system and structured document processing method that disassemble a document into chapters, sections, paragraphs and charts, or plural primitives such as captions, chapter titles, and summaries to represent and handle the document, using a structure such as a tree structure or a graph structure with the primitives as nodes.

Furthermore, the present invention provides an excellent structured document processing system and a structured document processing method that synthesize a new document from plural structured documents.

Furthermore, the present invention provides an excellent structured document processing system and a structured document processing method that retrieve document portions ("document parts") satisfying specific conditions from plural structured documents and insert or substitute the document parts in other documents for document synthesis.

Furthermore, the present invention provides an excellent structured document processing system and a structured document processing method that synthesize structured documents without using a script that describes a procedure for extracting document parts from structured documents, and inserting or substituting the document parts in a template.

The present invention has been made in consideration of the above-described problems, and the first aspect of the present invention is a structured document processing system for processing a structured document that is structurally represented and contains one or more document parts. The structured document processing system has: an instruction providing unit that provides, to corresponding document parts, extraction instructions to extract document parts, repetitive duplication instructions to duplicate document parts by a given number of times, or insertion/substitution instructions to insert or substitute document parts, by embedding the instructions in the structured document containing the document parts; an analyzing unit that analyzes the structure of a structured document to generate a parse tree; an instruction separating unit that separates the instructions embedded in the structured document from the document parts, to which the instructions are provided, to retrieve the instructions, based on the parse tree generated by the analyzing unit; a document processing description generating unit that merges and sorts the extraction instructions retrieved by the instruction separating unit from a first structured document in which the extraction instructions are embedded, and the repetitive duplication instructions and/or insertion/substitution instructions retrieved by the instruction separating unit from a second structured document, in which the repetitive duplication instructions and/or insertion/substitution instructions are embedded, to generate a document processing description having instruction strings for processing the first and second structured documents; an extracting unit that retrieves first document parts subject to the extraction instructions from the first structured document; a repetitive duplication unit that repeatedly duplicates document parts subject to the repetitive duplication instructions and instructions provided to the document parts by a given number of times; an inserting/substituting unit that inserts the first document parts before or after second document part subject to the insertion/substitution instructions or substituting the first document parts for the second document parts; and an interpreter for sequentially interpreting the document processing description and synthesizing document parts using the extracting unit, the repetitive duplication unit, and/or the inserting/substituting unit.

The structured document processing system of the first aspect of the present invention can provide, by the instruction providing unit, extraction instructions to extract document parts, a repetitive duplication instruction to duplicate document parts by a given number of times, and an insertion/substitution instruction to insert or substitute document parts to corresponding document parts in the structured document.

When the first structured document in which the extraction instructions are embedded and the second structured document in which the repetitive duplication instructions and/or insertion/substitution instructions are embedded are inputted to the structured document processing system, a parse tree is formed for each of the structured documents by the analyzing unit, and instruction strings provided to the each structured document are retrieved by the instruction separating unit. Furthermore, the retrieved plural instruction strings are merged, sorted, and converted, and a document processing description is synthesized by a document processing description synthesizing unit.

The interpreter sequentially scans the document processing description, extracts the first document parts from the first document by the extracting unit according to instructions contained in the document processing description, repeatedly duplicates document parts of the second structured document by the number of times determined depending on the number of the first document parts by the repetitive duplication unit, and inserts or substitutes the first document parts in the second structured document by the inserting/substituting unit, thereby synthesizing the structured documents.

According to the structured document processing system of the first aspect of the present invention, effects described below can be obtained.

1. When the structure of an original document is changed, a script separately managed to deal with the change need not be prepared.

2. When document parts are to be retrieved from a mixture of plural original documents different in structure, since the extraction instructions are provided to the document parts on a document basis, extraction processing need not be specified individually for each of the documents. Likewise, document part insertion or substitution processing need not be specified. Users need not specify a script each time the structure of a document changes.

3. Document parts can be created by directly putting desired instructions in an original document and specifying conditions (e.g., a matching label string, etc.) for document parts subject to insertion or replacement by retrieved document parts. Users can constitute document processing applications by designing (creating) a template according to their purposes or selecting a template in which instructions to perform desired processing are embedded, and combining them with original documents by themselves. In this way, since document processing can be performed by a non-procedural, in other words, assertive (declaration-like) method, even users not having adequate programming knowledge can perform a wide range of document processing. That is, a structured document processing system which enables users to easily create structured document processing applications satisfying their purposes can be implemented.

In the structured document processing system of the first aspect of the present invention, the extraction instruction may be an attribute extraction instruction that specifies the retrieval of the attributes of document parts, and the insertion/substitution instruction may be an attribute substitution instruction that specifies the substitution of the attributes of document parts. In such a case, the instruction separating unit may retrieve attribute extraction instructions and attribute insertion/substitution instructions from the structured documents; the inserting/substituting unit may be an attribute substituting unit that substitutes the attribute of the first document parts for the attributes of the second document part subject to attribute substitution instructions; and the interpreter may interpret the document processing description synthesized by the document processing description synthesizing unit and extract the attributes of given nodes of document parts specified in the attribute extraction instructions. As a result, the extracted attributes can be set in given nodes of document parts specified in the attribute substitution instructions.

In this case, the attribute substituting unit may be an attribute substituting unit that, for an attribute substitution instruction, makes a substitution by a string synthesized by combining an attribute value string set in advance in the document parts and a string obtained from a system state.

Or, the extraction instructions may be extraction instructions having a path name, and the repetitive duplication instructions and insertion/substitution instructions may be repetitive duplication instructions having a pattern expression and insertion/substitution instructions having a pattern expression, respectively. In such a case, the instruction separating unit may retrieve, from the structured documents, extraction instructions and path names, or repetitive duplication instructions, insertion/substitution instructions, and pattern expressions; the repetitive duplication unit may perform pattern matching between the path names provided to the extracted document parts and the pattern expressions, and perform repetitive duplications by the number of document parts having a matching path name; and the inserting/substituting unit may perform pattern matching between the path names provided to the extracted document parts and the pattern expressions, and insert or substitute document parts having a matching path name.

The inserting/substituting unit may insert or substitute the extraction instructions provided to the document parts retrieved by the extracting unit. As a result, two or more of the structured document processing system can be connected to constitute a pipeline. This function enables more flexible and complex structured document processing to be performed.

In such a case, the inserting/substituting unit may, when inserting or substituting the extraction instructions, change the path name of the extraction instructions having a path name and then insert or substitute the extraction instructions. As a result, document parts contained in an original document outputted in a first structured document processing system can be identified by checking path names in structured document processing of the second or subsequent stages.

A second aspect of the present invention is a structured document processing system for processing a structured document containing one or more document parts and being structurally represented, and the processing is implemented by cooperative processing through computer communications on a distributed network system constituted of two or more networked computers. The structured document processing system includes at least: a file server that stores structured documents as files of a predetermined format, and in response to the receipt of a file name, sends a corresponding file via the network; and a structured document processing server that performs document processing for files. The structured document processing server has: an input unit that inputs and analyzes a processing invocation description containing the file name of a first structured document provided with extraction instructions specifying the extraction of document parts and the file name of a second structured document provided with repetitive duplication instructions or insertion/substitution instructions, sending a file name contained in the processing invocation description to the file server via the network, and inputting a file corresponding to the file name from the file server via the network; a document processing unit that analyzes the first structured document and the second structured document to generate parse trees, analyzing the parse trees and separating document parts and the instructions to retrieve the instructions, merges and sorts the instructions to generate a document processing description containing instruction strings for processing the structured documents, and interprets the document processing description to synthesize a structured document; and an output unit that outputs the structured document or document parts obtained by the document processing unit as a file of a given format via the network.

The network referred to herein is a distributed network constituted by connecting plural computers by TCP/IP (Transmission Control Protocol/Internet Protocol), e.g., like the Internet. In such a case, structured documents are described by a markup language such as HTML (Hyper Text Markup Language). The file server is constituted as an HTTP server that provides HTML files in accordance with the HTTP (Hyper Text Transfer Protocol) protocol. The file names are represented in the format of resource access identifier such as URL (Uniform Resource Locator).

The structured document processing server can input a processing invocation description in the format of HTTP request. The processing invocation description is constituted as a "virtual URL" which is described in the format that another URL is embedded in a URL of an HTTP request. To be more specific, the processing invocation description is a virtual URL containing the respective file names or URLs of the first and second structured documents. Therefore, the structured document processing server can obtain the first and second structured documents via the network, from a corresponding file server, that is, an HTTP server, obtained from such a virtual URL.

Furthermore, the structured document processing server analyzes the first and second structured documents to generate their respective parse trees, analyzes the parse trees and separates document parts and instructions to retrieve the instructions, merges and sorts the instructions to generate a document processing description containing instruction strings for processing the structured documents, interprets the document processing description, and can thus synthesize the structured documents.

A structured document or document parts obtained in this way can be outputted as a file of HTML format, that is, an HTTP response via the network.

In the structured document processing system of the second aspect of the present invention, the processing invocation description may define distributed file names on the network in the format in which the server name of the structured document processing server is contained.

For example, when first and second structured document processing servers to process structured documents exist on the network, in a first processing invocation description inputted to a first structured document processing server, the file names of a first original document and/or first template subject to document processing can be described in the format of a second processing invocation description containing the server name of a second structured document processing server.

The first structured document processing server, in response to the input of the first processing invocation description, may extract the second processing invocation description described as the file names of the first original document and/or first template and send it to the second structured document processing server via the network. The second structured document processing server interprets the second processing invocation description and invokes processing, and sends a file containing a structured document or document parts as processing results via the network. The first structured document processing server receives the file from the second structured document processing server and can use it as the first original document and/or first template.

The second structured document processing server to input the second processing invocation description may also be configured on the same computer system as that of the first structured document processing server not requiring communications via the network. In this case, the first structured document processing server, in place of the file containing a structured document or document parts, may have a switching unit that inputs, as a parse tree, the structured document or document parts, which are the products of processing by the second structured document processing server. As a result, duplicate parse processing by the analyzing unit can be omitted, with increased processing speed and reduced computer loads and communication loads.

The structured document processing system of the second aspect of the present invention may further have: a holding unit that holds the parse tree of an original document or template inputted from the file server in association with a file name or a processing invocation description; and an input unit that, instead of inputting a structured document file corresponding to a file name from the file server, inputs a corresponding parse tree from the holding unit. As a result, the parse tree cached in the holding unit can be effectively reused to increase processing speed.

The structured document processing system of the second aspect of the present invention can also use, as input, a processing invocation description containing the file name of a first structured document provided with extraction instructions specifying the extraction of document parts, and the file name of a second structured document provided with repetitive duplication instructions or attribute substitution instructions. In this case, the attribute substituting unit may set a string obtained by replacing part of the processing invocation description by an attribute string set in advance in the document parts, as the attribute string of the document parts.

A third aspect of the present invention is also a structured document processing system for processing a structured document that is structurally represented and contains one or more document parts. The structured document processing system has: an analyzing unit that analyzes the structure of the structured document to generate a parse tree; an instruction separating unit that separates instructions and document parts provided to the structured document to retrieve the instructions, from the parse tree generated by the analyzing unit, and outputting error information upon detection of a syntax error of the instructions; an error notice document synthesizing unit that inputs the error information to synthesize a document for error notice; a processing invocation description synthesizing unit that merges and sorts instructions retrieved from the structured document to generate a document processing description containing instruction strings for processing the structured document, and generates information about access to the error notice document; a processing invocation description analyzing unit that interprets a processing invocation description and retrieving the error notice document; and a holding unit that holds the error notice document.

The error information referred to herein may be information often used in ordinary error processing such as an error type and a position (line count) in a document in which an error was detected.

The error notice document synthesizing unit inputs error information and synthesizes a document for error notice. Error information is, e.g., an error number and an error document is a file using the error number as a file name. The error notice document synthesizing unit regards an error number inputted from the instruction analyzing unit as a file name and inputs one of error notice documents from the file. The inputted document is used by the analyzing unit to generate a parse tree. Although the parse tree is held in the holding unit, it need not always be generated and the inputted document may be held in the holding unit in the form of string information without having to be transformed into a parse tree.

Information about access to an error notice document generated by the processing invocation description synthesizing unit is described, e.g., as a URL for a corresponding error notice page. The error notice document is held in the holding unit, using a URL synthesized by the processing invocation description synthesizing unit as keyword.

According to the third aspect of the present invention, errors occurring in the process of document processing can be reported to users, aside from the synthesizing results of the document processing. Therefore, advanced and flexible document processing applications can be created. Furthermore, the structured document processing system can operate so that an error notice document is generated at the point where an error occurs, is stored in a holding unit that temporarily stores the results of document processing (before a request for the error notice document), and is outputted for a subsequent request for the error notice document. Consequently, there need not be provided a mechanism for holding error types and error information in association with processes in which the errors occurred.

A fourth aspect of the present invention is a structured document processing method for processing a structured document that is structurally represented and contains one or more document parts. The structured document processing method includes the steps of: analyzing the structured document provided with instructions to generate a parse tree; analyzing the parse tree and separating document parts and instructions to retrieve the instructions; merging and sorting the instructions retrieved from the structured document to generate a document processing description containing instruction strings for processing the structured documents; and interpreting the document processing description to synthesize a structured document.

A fifth aspect of the present invention is also a structured document processing method for processing a structured document that is structurally represented and contains one or more document parts. The structured document processing method includes the steps of: (a) analyzing a first structured document, in which extraction instructions specifying the extraction of document parts are embedded, to generate a parse tree; (b) analyzing a second structured document, in which repetitive duplication instructions specifying the duplication of document parts by a given number of times or insertion/substitution instructions specifying the insertion or substitution of document parts are embedded, and generating a parse tree; (c) analyzing the parse tree and separating document parts and instructions to retrieve the instructions; (d) merging and sorting extraction instructions retrieved from the first structured document and repetitive duplication instructions and/or insertion/substitution instructions retrieved from the second structured document provided with the repetitive duplication instructions and/or insertion/substitution instructions and generating a document processing description containing instruction strings for processing the first and second structured documents; (e) interpreting the document processing description and retrieving a first document part subject to an extraction instruction from the first structured document; (f) interpreting the document processing description and repeatedly duplicating a document part subject to a repetitive duplication instruction and an instruction provided to the document part by a given number of times; (g) interpreting the document processing description and inserting the first document part before or after a second document part subject to an insertion/substitution instruction or substituting the first document part for the second document part; and (h) outputting a parse tree obtained as a result of execution of the steps (e) to (g).

According to the present invention, a document processing description is synthesized from extraction instructions (string), repetitive duplication instructions (string), and insertion/substitution instructions (string) that conform to the structure of an input document. When structured documents are inputted to the structured document processing system of the present invention, instructions (string) are separated from the document and merged, and document processing description is dynamically synthesized before processing the documents. Therefore, the synthesized document processing description is one suited for processing of plural input documents.

According to the present invention, each time document processing is performed, a processing description conforming to input documents is dynamically formed. Consequently, document processing scripts having conventionally been required become unnecessary, naturally leading to the elimination of the inconvenience of managing the scripts with managing documents.

According to the present invention, programming for document processing scripts is not required. A different script need not be prepared each time a document structurally different is inputted. Users need not select these scripts in accordance with input documents.

Since scripts need not be changed in accordance with changes of the structure of input documents, there is no need to search for the scripts to be changed, or no trouble resulting from change negligence. Therefore, a system is easily built which enables users of structured documents to create structured document processing applications serving their purposes and easily customize output results in a form satisfying desired purposes. That is, it becomes easy to develop efficient applications.

As a whole, according to the present invention, it is easy to develop, maintain and manage, and use a structured document processing system.

Other purposes, features, and advantages of the present invention will be made apparent by more detailed descriptions based on embodiments of the present invention described later and the accompanying drawings.

BRIEF DESCRIPTION OF THE DRAWINGS

Preferred embodiments of the present invention will be described in detail based on the followings, wherein:

FIG. 18 shows the result of displaying the first original document by a standard HTML browser;

FIG. 19 shows the result of displaying the second original document by a standard HTML browser;

FIG. 20 shows the result of displaying, by a standard HTML browser, an HTML file synthesized from the first original document, the second original document, and the first template;

FIG. 21 shows the result of displaying, by a standard HTML browser, an HTML file synthesized from the first original document, the second original document, and the second template (first embodiment);

FIG. 24 shows the result of displaying, by a standard HTML browser, an HTML file synthesized from an original document 4, an original document 5, an original document 6, and a template 4 (third embodiment);

FIG. 25 shows the result of displaying, by a standard HTML browser, an HTML file synthesized from the original document 4, the original document 5, and the template 4 (fourth embodiment);

DESCRIPTION OF THE PREFERRED EMBODIMENTS

Conventional structured document processing methods have had the problem that scripts for processing documents must be created and managed, in addition to original documents and templates.

In contrast, the present invention processes structured documents without using instructions having appearances of procedures such as scripts.

Figure 1:
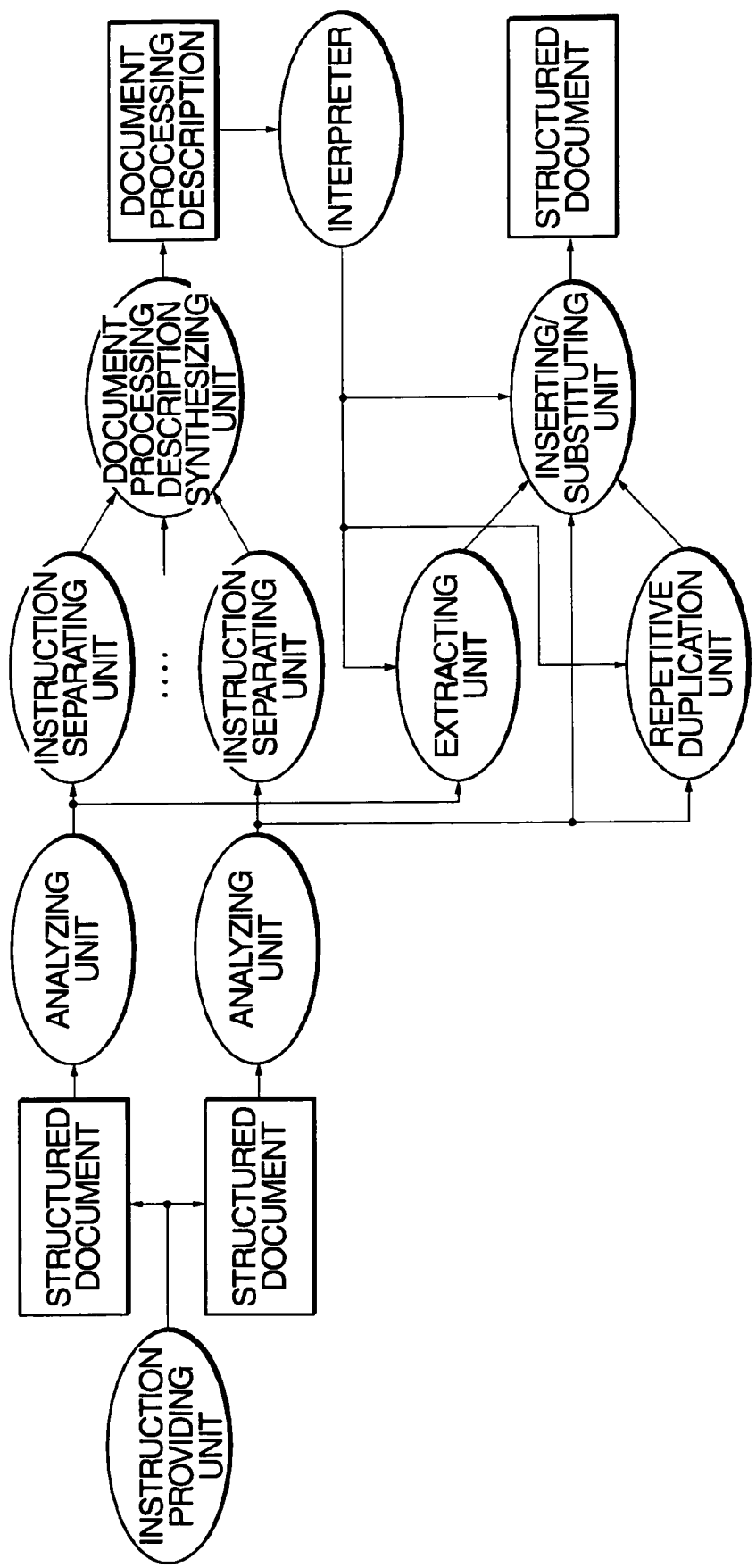
FIG. 1 is a functional block diagram showing a basic concept of a structured document processing system of the present invention.

FIG. 1 illustrates a basic concept of a structured document processing system of the present invention. As shown in the drawing, the structured document processing system has an instruction providing unit, an analyzing unit, an instruction separating unit, a document processing description synthesizing unit, an interpreter, an extracting unit, a repetitive duplication unit, and an inserting/substituting unit. These units can be implemented, e.g., as processing processes on a computing system.

The instruction providing unit embeds instructions within structured documents as original documents. The instructions referred to here include an extraction instruction to extract document parts of the structured documents, a repetitive duplication instruction to duplicate document parts by a given number of times, and an insertion/substitution instruction to insert or substitute document parts.

These instructions themselves do not have appearances as procedures describing processing like scripts. For example, when structured documents are written in a markup language such as HTML and XML, the instructions are embedded in the documents in the form of so-called comments.

The analyzing unit receives a first structured document and a second structured document in which instructions are embedded, and analyzes them.

The instruction separating unit separates inputted first and second structured documents into document parts and instructions, and retrieves the instructions.

The document processing description synthesizing unit merges retrieved instructions and sorts them in a specified order to synthesize a document processing description.

The interpreter sequentially interprets and executes instruction strings contained in the document processing description. In the present invention, the interpreter specifies a document part for the extracting unit to retrieve it from an original document. Also, the interpreter specifies a document part for the repetitive duplication unit to repeatedly duplicate it and a relevant instruction. Furthermore, the interpreter specifies two document parts for the inserting/substituting unit to insert or substitute them. As a result, the structured document processing of synthesizing document parts is achieved.

Each of structured documents inputted to the structured document processing system of the present invention is provided with extraction instructions to retrieve document parts, and repetitive duplication and insertion/substitution instructions. Therefore, document part retrieval, repetitive duplication, and a document part (location) in which a document part is to be inserted or substituted are specified, and instructions retrieved from plural inputted structured documents are dynamically synthesized to create a document processing description, so that a document processing description script becomes unnecessary. Consequently, the inconvenience of managing scripts by modification of original documents is eliminated.

Hereinafter, for convenience of description, a structured document (hereinafter simply referred to as "document") is an HTML file written in the HTML (Hyper Text Markup Language). However, it goes without saying that the present invention is applicable to structured documents written in the XML (eXtensible Markup Language) and other languages.

Figure 2A:
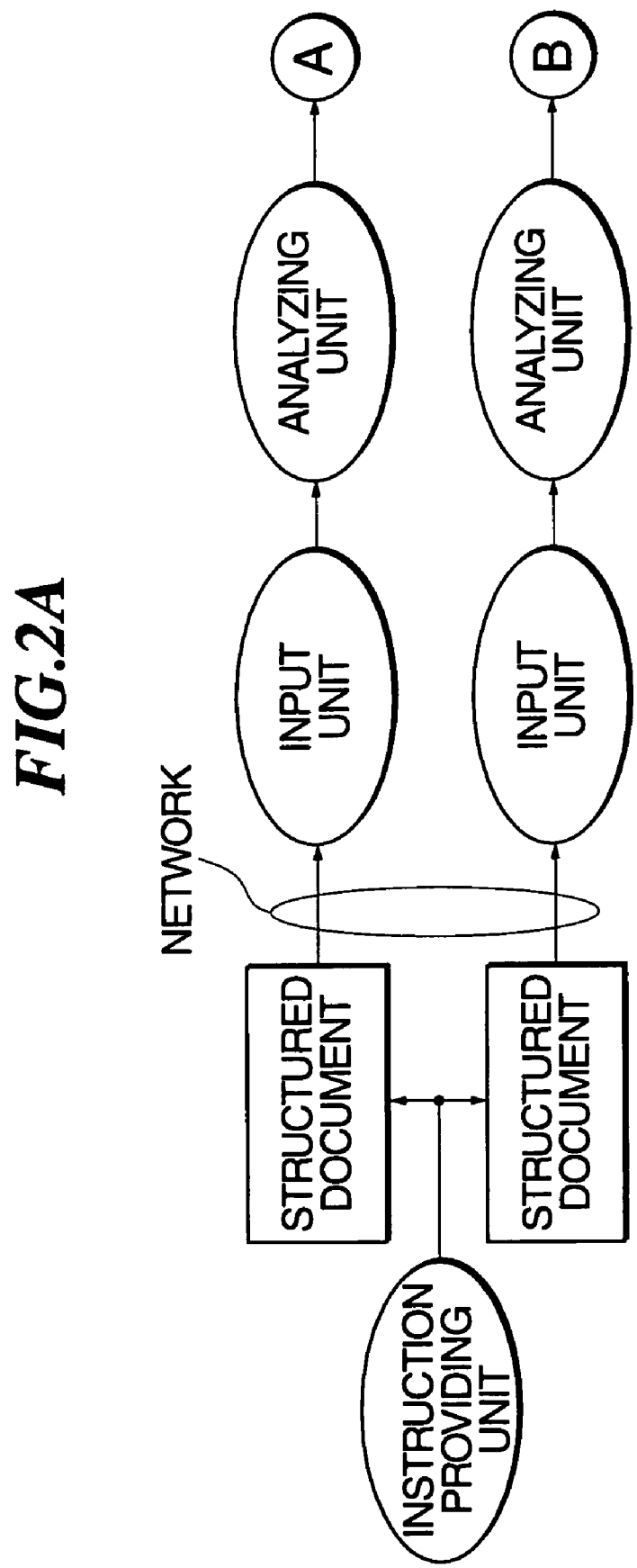
FIG. 2 is a functional block diagram schematically showing the configuration of a structured document processing system of a first embodiment of the present invention.
Figure 2B:
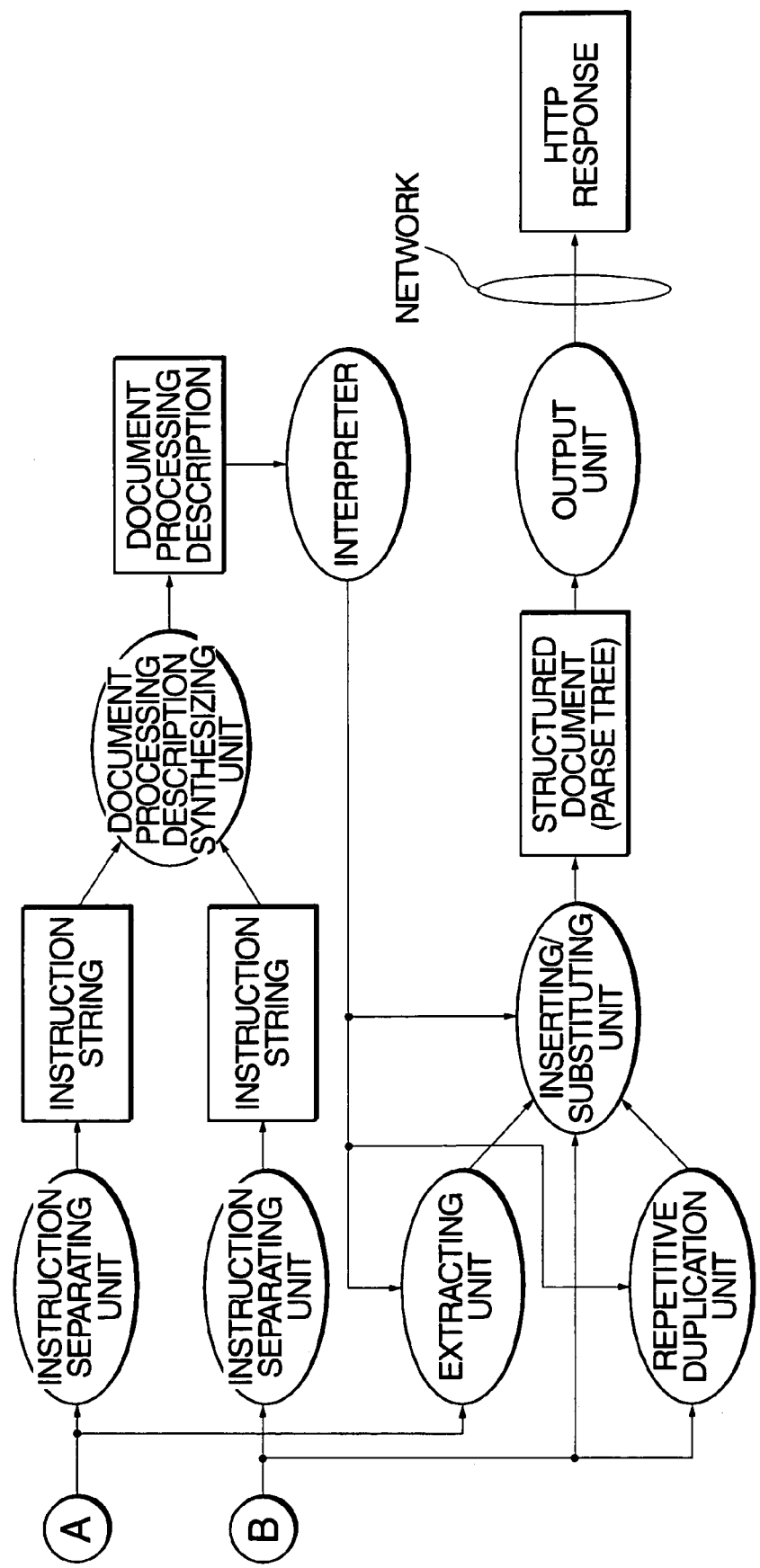

FIG. 2 schematically shows the configuration of a structured document processing system of a first embodiment of the present invention. Hereinafter, referring to the drawing, individual blocks will be described.

An instruction providing unit embeds extraction instructions, repetitive duplication instructions, and insertion/substitution instructions (hereinafter simply referred to as "instructions" collectively) within an inputted document. The instructions are described as follows. That is, Extraction Instruction

<!--#OUT LABEL-->

* Document part written in HTML

<!--#/OUT-->

Repetitive Duplication Instruction

<!--#RP LABEL-->

* Document part written in HTML

<!—/#RP-->

Insertion/Substitution Instruction

<!--#IN LABEL-->

* Document part written in HTML

<!--#/IN-->

In this example, 'OUT', 'RP', and 'IN' designate an extraction instruction, a repetitive duplication instruction, and an insertion instruction, respectively. LABEL may be any string. <!--#OUT LABEL--> is referred to as an extraction instruction start tag, and <!--#/OUT--> is referred to as an extraction instruction end tag. Likewise, <!--#RP LABEL--> and <!—/#RP--> are referred to as a repetitive duplication instruction start tag and a repetitive duplication instruction end tag, respectively. <!--#IN LABEL--> and <!--#/IN--> are referred to as an insertion/substitution instruction start tag and an insertion/substitution instruction end tag, respectively. Nothing may be written between the insertion/substitution instruction start tag and the insertion/substitution instruction end tag. In that case, a correct HTML file may not be formed before document synthesis processing.

In this embodiment, structured documents provided with extraction instructions are used as original documents. An HTML file of a first original document is shown below.

<HTML>

<HEAD>

<TITLE> Sample 1</TITLE>

</HEAD>

<BODY>

<FONT SIZE="5"><!--#OUT group-->Team A<!--#/OUT-->October report

</FONT>

```
<H2>summary</H2>
<HR>
<!--#OUT summary-->
  <UL>
  <LI> Progress of item 1 is 60%. On schedule
  <LI> Progress of item 2 is 30%. Three days behind
    schedule
  <LI> Progress of item 3 is 70%. An unexpected problem
    occurred. It is necessary to review the schedule.
  </UL>
<!--#/OUT-->
<HR>
</BODY>
</HTML>
```

Figure 3:
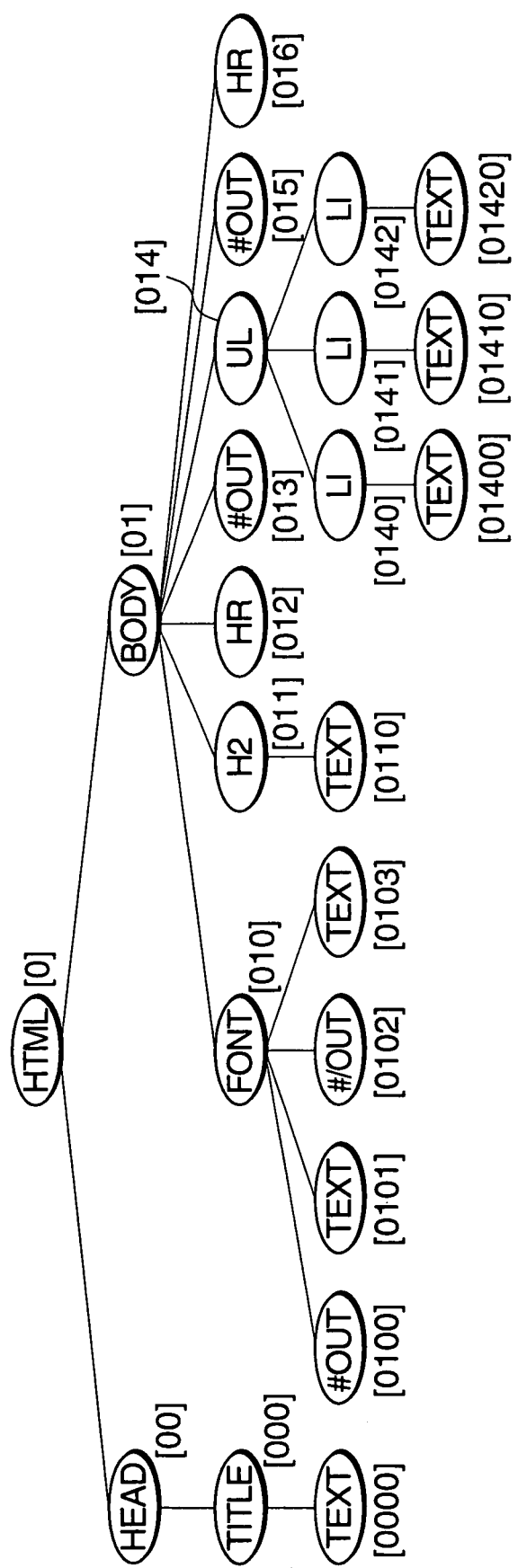
FIG. 3 is a diagram representing a first original document as a parse tree.

The first original document is represented as shown in FIG. 3, in the format of a parse tree. The first original document is displayed by a standard HTML browser, as shown in FIG. 18. The extraction instruction "OUT" embedded in the original document requests the retrieval of a portion surrounded by the dashed line.

An HTML file of a second original document is shown below.

```
<HTML>
<HEAD>
<TITLE> Sample 2</TITLE>
</HEAD>
<BODY>
<H1> monthly report <!--#OUT group-->Team B<!--#/OUT--></H1>
<H2> summary </H2>
<HR>
<!--#OUT summary-->
  <TABLE BORDER="0" CELLSPACING="0" CELLPADDING=" 1">
  <TR><TH> item </TH><TH> progress </TH><TH
    ALIGN=LEFT"> evaluation </TH></TR>
  <TR><TH>1</TH><TD>20%</TD><TD>   a   little
    behind schedule (one day)</TD></TR>
  <TR><TH>2</TH><TD>40%</TD><TD>  no   delay
    </TD></TR>
  <TR><TH>3</TH><TD>60%</TD><TD>  ahead  of
    schedule :three days </TD></TR>
  </TABLE>
<!--#/OUT-->
<HR>
</BODY>
</HTML>
```

Figure 4:
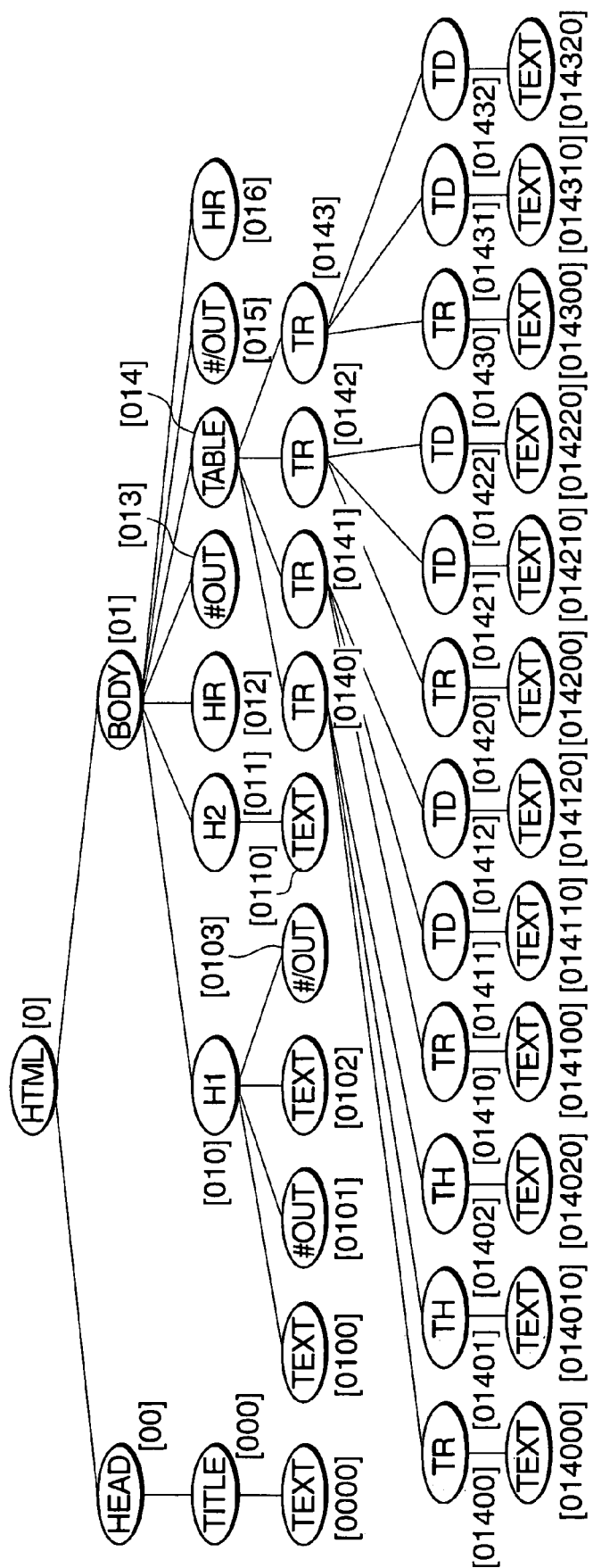
FIG. 4 is a diagram representing a second original document as a parse tree.

The second original document is represented as shown in FIG. 4, in the format of a parse tree. The second document is displayed by a standard HTML browser, as shown in FIG. 19. The extraction instruction "OUT" embedded in the original document requests the retrieval of a portion surrounded by the dashed line.

In this embodiment, a structured document provided with repetitive duplication instructions "RP" and insertion/substitution instructions "IN" is used as a template. An HTML file of a first template used in this embodiment is shown below.

```
<HTML>
<HEAD>
<TITLE> Template1</TITLE>
</HEAD>
<BODY BGCOLOR="#404040">
  <H1> progress summary </H1>
  <TABLE BORDER="1">
  <TR><TH> team </TH><TH> summary </TH></TR>
<!--#RP group-->
  <TR>
    <TH>
<!--#IN group-->
  A group name is substituted or inserted here.
<!--#/IN group-->
    </TH>
    <TD>
<!--#IN summary-->
  The summary of each group is substituted or inserted here.
<!--#/IN-->
    </TD>
  </TR>
<!--#/RP-->
  </TABLE>
</BODY>
</HTML>
```

Figure 5:
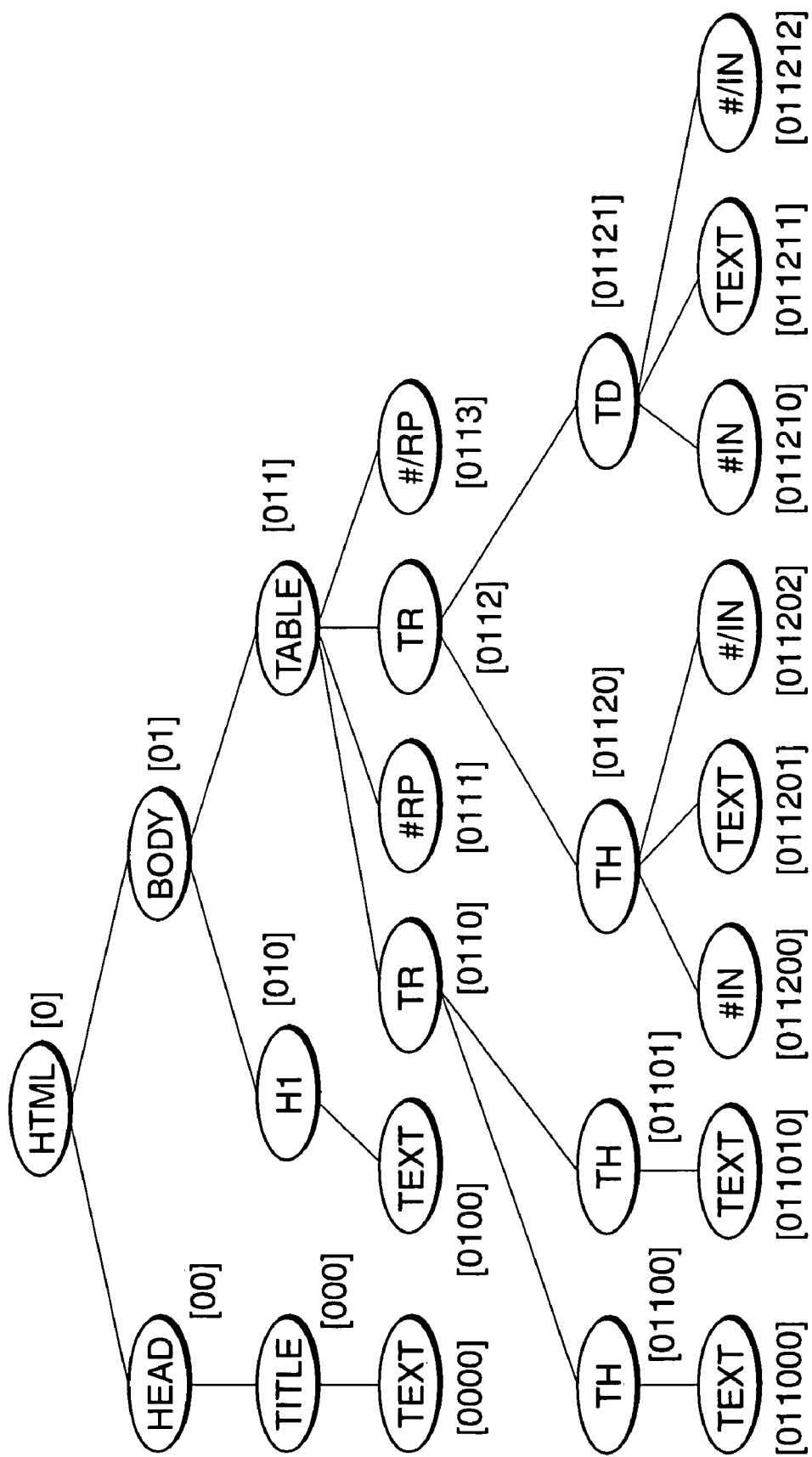
FIG. 5 is a diagram representing a first template as a parse tree.

The first template is represented in the form of parse tree, as shown in FIG. 5.

An HTML file of a second template used in this embodiment is shown below.

```
<HTML>
<HEAD>
<TITLE> Template 2</TITLE>
</HEAD>
<BODY>
  <H1> progress summary </H1>
  <TABLE BORDER=" 1">
  <TR>
    <TH> team </TH>
<!--#RP group-->
    <TH>
<!--#IN group-->
  A group name is substituted or inserted here.
<!--#/IN-->
    </TH>
<!--#/RP-->
  </TR>
  <TR>
  <TH> summary </TH>
<!--#RP summary-->
    <TD ALIGN="LEFT">
<!--#IN summary-->
  The summary of each group is substituted or inserted here.
```

```
<!--#/IN-->
    </TD>
<!--#/RP-->
    </TR>
    </TABLE>
</BODY>
</HTML>
```

Figure 6:
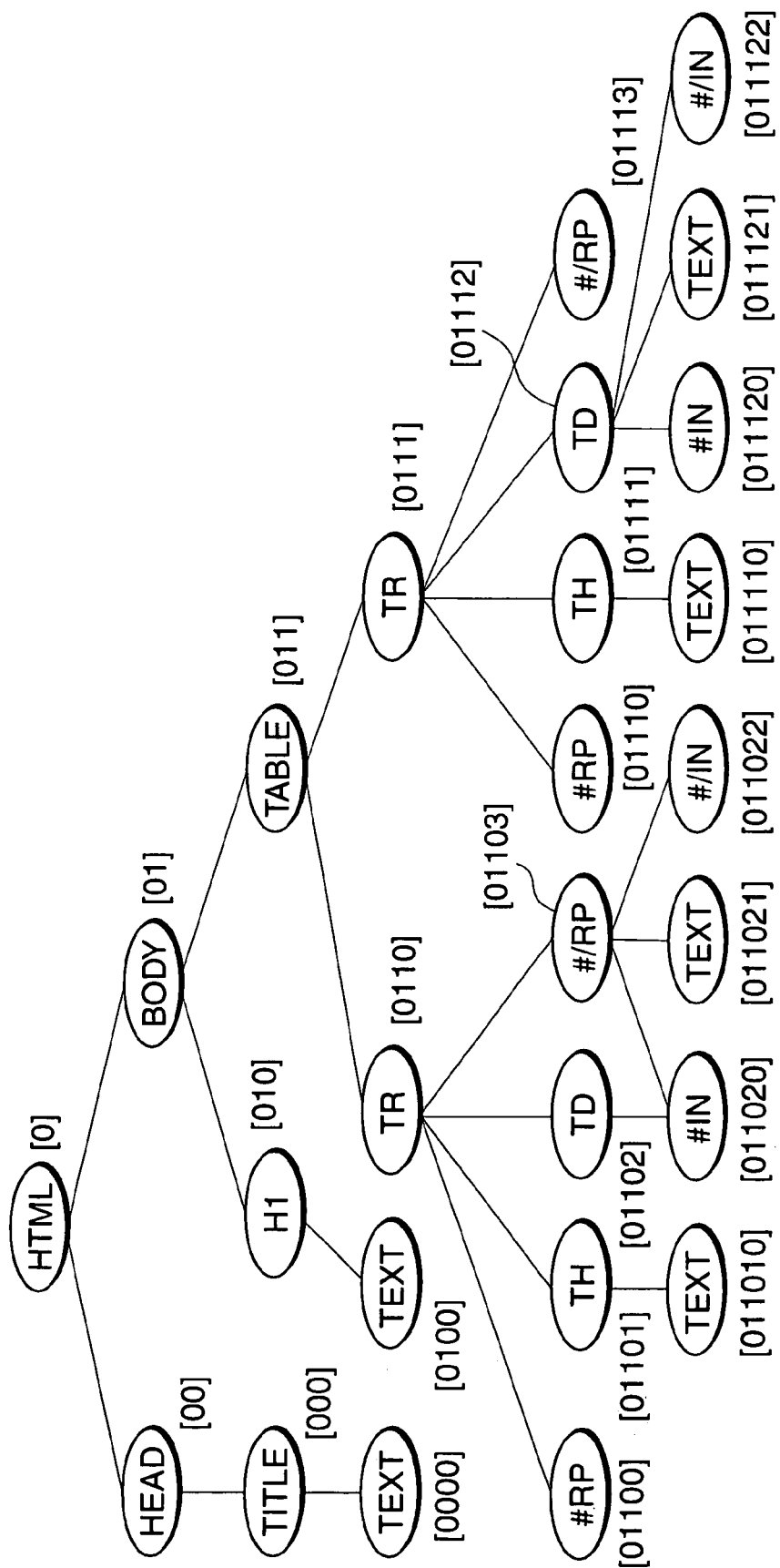
FIG. 6 is a diagram representing a second template as a parse tree.

The second template is represented in the form of a parse tree, as shown in FIG. 6.

In templates, LABEL is used to specify the correspondence between an extraction instruction and a repetitive duplication instruction or insertion/substitution instruction.

By the number of extraction instructions with a specific LABEL argument specified, a repetition count of repetitive duplication instructions having the same label is determined. For the first template indicated above, only the LABEL argument "group" in an original document is repeatedly duplicated. On the other hand, for the second template indicated above, both the LABEL arguments [group] and [summary] in an original document are repeatedly duplicated.

A document part extracted by an extraction instruction with a specific LABEL specified is inserted or substituted by an insertion/substitution instruction having the same LABEL argument. For the templates indicated above, insertion or substitution is made for both the LABEL arguments "group" and "summary" in a template.

When all LABEL strings are identical, it has the same effect as when a LABEL string is omitted.

In this embodiment, instructions are formed as comments (comment tags) of an HTML file. Therefore, since these instructions are ignored in standard applications handling HTML, including HTML browsers, the instructions exert no substantial influence on applications that display and process document contents. The instructions are separated and retrieved from documents written in an HTML by a subsequent instruction separating unit.

The instruction providing unit, in this embodiment, is formed as an editor capable of editing HTML files. Since the instructions are simply comment tags inserted in HTML files, they can be easily provided through editing operations on ordinary text editors or HTML editors. For example, users can provide an instruction by manually inserting a comment tag <!--#OUT LABEL--> equivalent to extraction instruction start before the document part to be retrieved from an HTML file and a comment tag <!--#/OUT--> equivalent to extraction instruction end after the document part, using a text editor. Hereinafter, <!--#OUT LABEL--> will be referred to as an extraction instruction start tag and <!--#/OUT--> as an extraction instruction end tag. It is to be fully appreciated that these instructions themselves inserted do not have the appearances of procedures. The text editor used here may be a common editor and will not be further described in this specification.

Another implementation method is achieved by automatically analyzing the structure of a document on a computer system and inserting instructions like the above ones before and after document parts sandwiched by specific markups. That is, instructions can also be provided to documents by performing a structure-specifying retrieval by use of a method disclosed in Japanese Published Unexamined Patent Application No. Hei 6-52161 (described previously) and inserting the start tags and end tags of required instructions before and after desired document parts for the purpose of synthesis. Also, instructions can be provided to documents by ordinary text processing. An example described in a script of the perl language is shown below (perl is an interpreter language developed by Larry Wall of NetLabs in the U.S. and is primarily used on the OS of UNIX systems).

```
$htmlfile="sample.html";
open(HTML, "% htmlfile") ? ? die "Can't open $htmlfile.";
while(<HTML>){
    s/<TABLE[^>]*>/<!--#OUT LABEL--> $&/gi;
    s/<¥/TABLE[^>]*>/$&<!--#¥/OUT-->/gi;
    print;
}
```

In the above example, document parts are retrieved using pattern matching by regular expressions. The above script inputs an HTML file, retrieves a <TABLE> tag, inserts <!--#OUT LABEL--> immediately before it, retrieves a </TABLE> tag, inserts <!--#/OUT--> immediately after it, and outputs results.

Next, an input unit and an output unit are described.

The input unit specifies a file name and inputs an HTML file from a file server. The file server is e.g., a WWW (World Wide Web) server. On a WWW naming space, a URL (Uniform Resource Locator) can be accessed as the name of an HTML file.

The input unit forms a network connection to a WWW server connected to a network and transfers an HTML file by a protocol known as HTTP (HyperText Transfer Protocol). That is, the input unit sends an HTTP request including an HTML file name to the WWW server and receives an HTTP response including the HTML file from the WWW server. To be more specific, the input unit forms a TCP/IP (Transmission Control Protocol/Internet Protocol) connection to a WWW server waiting with a specific port number and inputs an HTTP request. A file identifier provided as a URL is included in the HTTP request. On the other hand, the WWW server provides an HTML file for the URL specified in the HTTP request by reading the HTML file from a local file system according to the URL, starting a proper program to synthesize the HTML file, or inputting the HTML file from other WWW servers, and includes the HTML file in an HTTP response to output it to the input unit.

Such an input unit can be implemented by using equivalents of, e.g., java.net.URL and java.net.URLConnection, included in JDK (Java Development Kit) of Sun Microsystems, Inc.

An output unit outputs a structured document converted into an HTML format as the body part of an HTTP response via a network. That is, the structured document processing system of this embodiment is implemented as a structured document processing server that receives a proper request from a client via a network, inputs an original document and a template from a file server and processes them, and outputs processing results as a response to the client. Particularly, the structured document processing server of this embodiment is implemented as an HTTP server that inputs an HTTP request, performs required structured document processing, and outputs an HTTP response.

A structured document sent to the output unit is the parse tree of the structured document. A parse tree will be described later. To convert the parse tree into HTML, the parse tree is scanned in order of depth first way to output start tags, text contents, and end tags. If a node encountered during the scanning holds text contents, text strings are outputted. Otherwise, a start tag (e.g., "<TABLE>" for a TABLE tag) is outputted, and then child nodes are sequentially scanned, and for each of the child nodes, a start tag, an end tag, and text contents are outputted as HTML. After all child nodes is outputted, an end tag (e.g., "</TABLE>" for TABLE tag) is outputted. This specification will not describe in more detail the inclusion of HTML in an HTTP response for output because it is the same as in ordinary HTTP servers. Portion for inputting an HTTP request is not described because it has no direct relation to the purpose of the present invention. As an example of implementing such an HTTP server, Apache WWW server is well known.

Next, an analyzing unit and a separating unit are described.

The analyzing unit is an HTML parser that inputs an HTML file described in text form, analyzes it according to the syntax of HTML, and forms a parse tree. Since an HTML parser comparable to prior arts can be used to embody the present invention, the analyzing unit is not described in detail in this specification. (Examples of implementing an HTML parser are described in Corporation for National Research Initiatives, "Python Library Reference Release 1.5.2" Section 12.2 htmllib—A parser for HTML documents, and the like. A method of analyzing syntax for the computer language is described in detail in A.V. Eiho, "Compiler 1" SAIENSU-SHA Co., Ltd. Publishers, Chapter 4.)

An HTML parser outputs data of tree structure upon input of an HTML file of text form. Nodes of the tree structure are temporarily stored in memory. Each node has an attribute with an THML tag name or 'TEXT' as a node name. Each node corresponds to a markup of HTML tag or text contents. It has the attribute of HTML tag. Furthermore, it has an array of pointers to child nodes. The array has pointers to a first child node, a second child node, and so forth stored in the sequence of a first element, a second element, and so forth. By specifying any node in an parse tree, subtrees subordinate to the node are determined as document parts. (Implementation of tree structure is described in detail in, e.g., "Algorithm and Data Structure" Iwanami Shoten Publishers, pages 48 to 54.)

The parse trees of the first original document, second original document, first template, and second template are as shown in FIGS. 3, 4, 5, and 6, respectively.

Next, the HTML parser as an analyzing unit analyzes the parse trees in prefix order and determines by pattern matching of strings whether a node name is a comment tag and a comment string described in the comment tag follows any of the rules shown below. The left hand side of symbol "→" is a pattern and the right hand side is an instruction. <blank> denotes one or more blanks and <LABEL string> denotes a string containing no blank (a method of analyzing a tree structure in prefix order is described as preorder scanning of tree structure in, e.g., "Algorithm and Data Structure" Iwanami Shoten Publishers, pages 52 and 53.)

"#OUT<blank><LABEL string>"→Extraction instruction start tag

"#/OUT<blank><LABEL string>"→Extraction instruction end tag

"#RP<blank><LABEL string>"→Repetitive duplication instruction start tag

"#/RP<blank><LABEL string>"→Repetitive duplication instruction end tag

"#IN<blank><LABEL string>" Insertion/substitution instruction start tag

"#/IN<blank><LABEL string>"<Insertion/substitution instruction end tag

Such pattern matching can be performed by regular expression. There is shown below an example that extracts the start tag and end tag of instructions by pattern matching usable by the Perl language.

$htmlfile="Template2.html";

open(HTML, "$htmlfile") ? ? die "Can't open $htmlfile.";

while(<HTML>) {
  @_=split('>',$_);
  foreach $_(@_){
    $value="";
    $value="extraction instruction start tag/". $1 if/<!--#OUT_([^¥s]+)¥s*--/;
    $value="repetitive duplication instruction start tag/".$1 if/<!--#RP_([^¥s]+)¥s*--/;
    $value="insertion/substitution instruction start tag/".$1 if/<!--#IN_([^¥s]+)¥s*--/;
    $value="extraction instruction end tag/".$1 if /<!--#¥/OUT_([^¥s ]+)¥s*--/;
    $value="repetitive duplication instruction end tag/".$1 if /<!--##¥/RP_([^¥s]+)¥s*--/;
    $value="insertion/substitution instruction end tag/".$1 if /<!--#¥/IN_([^¥s]+)¥s*--/;
    print "$value¥n" if $value ne ""
  ;
  }
}

An address in a parse tree is represented by a vector that indicates the position of a document part by a path from the root node to the node of the document part in the parse tree. The elements of the vector correspond to nodes existing on the path. The address of a document part at a position having a depth level of 3 is represented by a three-dimensional vector, each element of which is a number indicating the position of a child node relative to the parent of each node (the first child node is counted as 0). For example, the address representation of [0 1 2] is the address of a document part represented by a subtree of a node and its subordinate nodes positioned at the third child of the second child of a root node. If the address of a desired node is specified, node is decided to the desired node in the parse tree by the following procedure (search steps from the root node).

Step 1: Set a target node at the root node and set a depth level to 1. Repeat steps 2 to 4 by the number of vector dimensions minus one.

Step 2: Retrieve a number (i) indicating a depth level of the elements of an address vector. (The first element is counted as a 0-th element.)

Step 3: Retrieve i-th element from a child node array of the target node and use it as a new target node (the first element of the array is counted as a 0-th element).

Step 4: 1 is added to the depth level.

The address representation of such a parse tree is described referring to FIG. 5. In the figure, a document part provided with a repetitive duplication instruction [0 1 1 1] is a subtree of [0 1 1 2] node and its subordinate nodes, a document part provided with a first insertion/substitution instruction [0 1 2 0 0] is a subtree of [0 1 1 2 0 1] node and its subordinate nodes, and a document part provided with a second insertion/substitution instruction [0 1 2 2 1 0] is a subtree of [0 1 1 2 1 1] node and its subordinate nodes.

A document part ID is used to identify a document part, and the document part can be retrieved by specifying the ID.

In this embodiment, a document part ID is represented by a pair of a parse tree ID and the address of a document part. The parse tree ID may be, e.g., a number assigned in order of formed parse trees or e.g., the pointer of the parse tree to the root node, to indicate the address of the memory in which the parse tree is stored.

Next, the instruction separating unit is described. The instruction separating unit of this embodiment scans parse trees in prefix order, gets the operation code of each instruction, a label string thereof, and the ID of a document part provided with the instruction, and outputs an instruction string having the three items as operands for the operation code. The operation code is OUT for an extraction instruction, RP for a repetitive duplication instruction, and IN for an insertion/substitution instruction. The ID of a parse tree is 1 for a first original document, 2 for a second original document, 3 for a first template, and 4 for a second template. Instruction strings separated from each document are shown below.

Instruction strings separated from a first original document

| Operation code | Label | Document part ID |
| --- | --- | --- |
| OUT | Group | <0, [0 1 0 1]> |
| OUT | Summary | <0, [0 1 4]> |

Instruction strings separated from a second original document

| Operation code | Label | Document part ID |
| --- | --- | --- |
| OUT | Group | <1, [0 1 0 2]> |
| OUT | Summary | <1, [0 1 4]> |

Instruction strings separated from a first template

| Operation code | Label | Document part ID |
| --- | --- | --- |
| RP | Group | <2, [0 1 1 2]> |
| IN | Group | <2, [0 1 1 2 0 1]> |
| IN | Summary | <2, [0 1 1 2 1 1]> |

Instruction strings separated from a second template

| Operation code | Label | Document part ID |
| --- | --- | --- |
| RP | Group | <3, [0 1 1 0 1]>, <3, [0 1 1 0 2]> |
| IN | Group | <3, [0 1 1 0 2 1]> |
| RP | Summary | <3, [0 1 1 1 1]>, <3, [0 1 1 1 2]> |
| IN | Summary | <3, [0 1 1 1 2 1]> |

Next, a document processing description synthesizing unit inputs instruction strings separated from plural original documents or templates, merges and sorts the instruction strings, and outputs a document processing description after conversion and synthesis.

Herein, the operation of the document processing description synthesizing unit is described using an example of forming a document processing description from instruction strings separated from each of original documents 1 and 2, and template 1. The document processing description synthesizing unit performs the procedure A to the procedure C described below in that order.

Procedure A: Counting OUT

The number of OUTs contained in instruction strings separated from each of the original documents 1 and 2 is counted for each label string. This can be achieved by scanning the instruction strings, as described below, and for instructions having an operation code of OUT, using label strings as key and incrementing an associative array represented by an integer value. After the termination of the scanning, using label strings as key, the number of OUT instructions can be obtained for each label string.

For all instruction strings of all original documents, the following is performed.

Step 11: If operation code is OUT, step 12 is executed. Otherwise, the next instruction is examined.

Step 12: An associative array is examined using the label string of an operand as key. If the associative array is unregistered, 1 is set as a value. If the associative array is registered, 1 is added to its value.

Step 13: Step 11 is performed for the next instruction.

Procedure B: Duplication of Instructions by RP

If RP is contained in instruction strings of template 1, then IN, OUT, and RP contained in document parts of operands of all RPs are duplicated according to the number of OUT instructions of the original documents. This duplication is made by executing steps 21 to 26 described below for one template.

Step 21: An RP list is created.

Step 22: While sequentially modifying pertinent RPs (repetitive duplication instruction) in the RP list, step 23 and subsequent steps are performed for each of the RPs.

Step 23: The label string of an operand of a pertinent RP is retrieved, a value is retrieved from the associative array created in the above procedure A and is used as a repetitive duplication count t. If t is 2 or greater, step 24 and subsequent steps are executed.

Step 24: The label string of the operand of the RP instruction is replaced by the repetitive duplication count t, which is outputted to a document processing description.

Step 25: A document part ID is retrieved from an operand to get a first address. It is assumed that the number of dimensions (number of elements) of the first address is k.

Step 26: Of instructions of instruction strings, instructions having as an operand an address that have a greater number of dimensions than the first address retrieved in step 22 and match it in the first k elements are retrieved.

For example, since [0 1 2 3 4] and [0 1 2] match in the first three elements, [0 1 2 3 4] is a descendant of the [0 1 2] node. Since [0 1 1 0 2] and [0 1] match in the first two elements, [0 1 1 0 2] is a descendant of the [0 1] node. Such checking can be easily achieved by comparing corresponding elements between two arrays.

Step 27: The instruction retrieved in step 24 is duplicated and the address (second address) of an operand of the duplicated instruction is modified as follows.

First address=[A1 A2 A3 ... Ak−1 Ak] (the address of a document part of the operand of the RP instruction)

Second address=[A1 A2 A3 ... Ak−1 Ak N1 N2 N3 ...]

Modified address=[A1 A2 A3 . . . Ak−1 Ak+i N1 N2 N3 . . . ]

i is an integer incremented for each duplication, that is, 1, 2, . . . , t−1. Where plural consecutive document parts are specified in the operand of the RP instruction, if the number of specified document parts is n, i is incremented by n for each duplication. For example, if n is 2, i is 2, 4, . . . , (t−1)×n.

For all instructions except the duplicated instructions, instructions having an address that matches the first address in the first k−1 elements of the address (third address) of a document part of the operand and is greater than Ak in the k-th element are readdressed.

First address=[A1 A2 A3 . . . Ak−1 Ak] (the address of a document part of the operand of the RP instruction)

Third address=[A1 A2 A3 . . . Ak−1 BN1 N2 N3 . . . ]

Modified address=[A1 A2 A3 . . . Ak−1 B+t−1 N1 N2 N3 . . . ]

It is assumed that B is greater than Ak and i is an integer incremented for each duplication, that is, 1, 2, . . . , t−1.

The readdressing is performed to correct incorrect addresses generated due to repetitive duplication. If a duplicated instruction is RP, it is added to the RP list created in step 21.

Instruction strings resulting from execution of the procedure B for instruction strings separated from the first template

| Operation code | Label | Document part ID |
|---|---|---|
| RP | 2 | <2, [0 1 1 2]> |
| IN | Group | <2, [0 1 1 2 0 1]> |
| IN | Summary | <2, [0 1 1 2 1 1]> |
| IN | Group | <2, [0 1 1 3 0 1]> |
| IN | Summary | <2, [0 1 1 3 1 1]> |

Instruction strings resulting from execution of the procedure B for instruction strings separated from the second template

| Operation code | Label | Document part ID |
|---|---|---|
| RP | 2 | <3, [0 1 1 0 1]>, <3, [0 1 1 0 2]> |
| IN | Group | <3, [0 1 1 0 2 1]> |
| IN | Group | <3, [0 1 1 0 4 1]> |
| RP | Summary | <3, [0 1 1 1 1]>, <3, [0 1 1 1 2]> |
| IN | Summary | <3, [0 1 1 1 2 1]> |
| IN | Summary | <3, [0 1 1 1 4 1]> |

Procedure C: Synthesizing Instructions

OUTs of all original documents and INs of the template are paired which match in a label string, and new instructions are synthesized from the pairs. The procedure of the operation is described below.

In this embodiment, for example, "FILL document-part-1 document-part-2" is synthesized from the pair of "OUT LABEL document part 1" and "IN LABEL document part 2." FILL indicates an instruction that substitutes the document part 1 for the document part 2. This operation enables document parts of original documents to be substituted or inserted in user-desired positions of the template, regardless of the occurrence order of the document parts in the original documents.

Step 31: All instruction strings of the original documents are scanned and an array of instructions is created for each of label strings. This array is called an OUT array. The OUT array is stored in an associative array with label strings as key.

Step 32: All instruction strings of the template are scanned and an array of instructions is created for each of label strings. This array is called an IN array. The IN array holds label strings as attributes.

Step 33: For all the IN arrays, step 34 and subsequent steps are executed.

Step 34: An OUT array having, as an operand, a string matching a label string of the IN arrays, which is the attribute of the IN arrays, is retrieved.

Step 35: For all elements of the IN arrays, step 36 and subsequent steps are executed for the 0-th to m-th elements sequentially in that order.

Step 36: Document part 1 as document part ID is retrieved from an operand of an OUT instruction stored as the m-th element of the OUT array. Document part 2 as document part ID is retrieved from an operand of an IN instruction stored as the m-th element of the IN array.

Step 37: The following instruction is added to the document processing description. In this example, the operation code of the instruction is FILL and operands are document part 1 and document part 2.

FILL document-part-1 document-part-2

Contents, e.g., "employee number", contained in a document part are retrieved, OUT instructions are sorted in order of employee numbers to form an OUT array, and FILL can also be constituted in association with an IN array formed in the occurrence order of IN instructions in the template. In this way, the association of document parts extracted by OUT instructions of an original document with insertion/substitution positions specified by IN instructions can be made not only by label strings and contents sorting but also by various methods. For example, a table can be searched to determine an order, or insertion/substitution positions can be changed depending on from what server an original document (e.g., a host name) was sent. This can be achieved by performing the same procedure according to a table containing the correspondences between document IDs of operands of OUT instructions and, e.g., host names, which are specified in label strings of IN instructions.

A document processing description is generated by the above-described procedure. Examples of document processing descriptions are shown below.

*An example 1 of a document processing description synthesized from the first original document, second original document, and first template

| RP | 2 | 2, [0 1 1 2] |
|---|---|---|
| FILL | 0, [0 1 0 1] | 2, [0 1 1 2 0 1] |
| FILL | 1, [0 1 0 2] | 2, [0 1 1 3 0 1] |
| FILL | 0, [0 1 4] | 2, [0 1 1 2 1 1] |
| FILL | 1, [0 1 4] | 2, [0 1 1 3 1 1] |

*An example 2 of a document processing description synthesized from the first original document, second original document, and second template

| RP   | 2         | 3, [0 1 1 0 1] | 3, [0 1 1 0 2] |
|------|-----------|----------------|----------------|
| RP   | 2         | 3, [0 1 1 1 1] | 3, [0 1 1 1 2] |
| FILL | 0, [0 1 0 1] | 3, [0 1 1 0 2 1] | |
| FILL | 1, [0 1 0 2] | 3, [0 1 1 0 3 1] | |
| FILL | 0, [0 1 3] | 3, [0 1 1 1 2 1] | |
| FILL | 1, [0 1 3] | 3, [0 1 1 1 3 1] | |

In the above example, since one RP instruction is provided to two consecutive document parts, it is to be noted the RP instruction has two operands specified. Instead of synthesizing a FILL instruction, the following document processing description may be outputted by preparing labels for specifying a temporary area in which to store document parts.

*An example 3 of a document processing description synthesized from the first original document, second original document, and second template

| RP   | 2          | 2, [0 1 1 2]    |
|------|------------|-----------------|
| OUT  | 0, [0 1 0 1] | tmp           |
| IN   | tmp        | 2, [0 1 1 2 0 1] |
| OUT  | 0, [0 1 4] | tmp             |
| IN   | tmp        | 2, [0 1 1 2 1 1] |
| OUT  | 1, [0 1 0 2] | tmp           |
| IN   | tmp        | 2, [0 1 1 3 0 1] |
| OUT  | 0, [0 1 4] | tmp             |
| IN   | tmp        | 2, [0 1 1 3 1 1] |

Next, the operation of an interpreter, extracting unit, repetitive duplication unit, and inserting/substituting unit is described.

When the above-described document processing description is inputted to the interpreter, the interpreter scans the document processing description sequentially from the start thereof, judges an operation code, and inputs a document part ID specified in an operand to one of the extracting unit, the repetitive duplication unit, or the inserting/substituting unit. OUT instructions are processed by the extracting unit; RP instructions by the repetitive duplication insertion unit; and IN instructions by the inserting/substituting unit. To the inserting/substituting unit, a document part ID, and a document part to be inserted or substituted are inputted. For FILL, a document part ID specified in a first operand is inputted to the extracting unit, and a document part obtained as a result and a document part ID specified in a second operand are inputted to the inserting/substituting unit.

The interpreter may be a common interpreter that reads an instruction description, sequentially interprets each instruction step by step, and performs proper processing. Interpreters of such a type, already known in the information processing industry, are not described herein (e.g., a method of creating an interpreter is described in detail in Masamitsu Takiguchi, "Compiler/Interpreter Learned through Assembling", CQ Publishing Co., Ltd.). In this embodiment, in the order of instruction steps within a document processing description, a proper processing unit is selected for each operation code, and a document part ID as an operand is inputted to a pertinent processing unit.

The extracting unit finds a node of a specified parse tree from the inputted document part ID and returns a copied document part. The copy operation is performed for each of nodes scanned in prefix order for all nodes subordinate to the node. The copied document parts may be stored on a memory so that pointers to them are returned. tmp specified as a temporary storage area in the document processing description example 3 described previously may be provided to store such copied document parts, or may also be the above pointers.

The repetitive duplication unit finds a node of a specified parse tree from the inputted document part ID and repeatedly duplicates it on the parse tree. (Since there may be nodes incorrectly addressed as a result of the repetitive duplication, it is to be noted that the document parts specified in the operand are readdressed in the step 24 of procedure B described previously.)

Figure 7A:
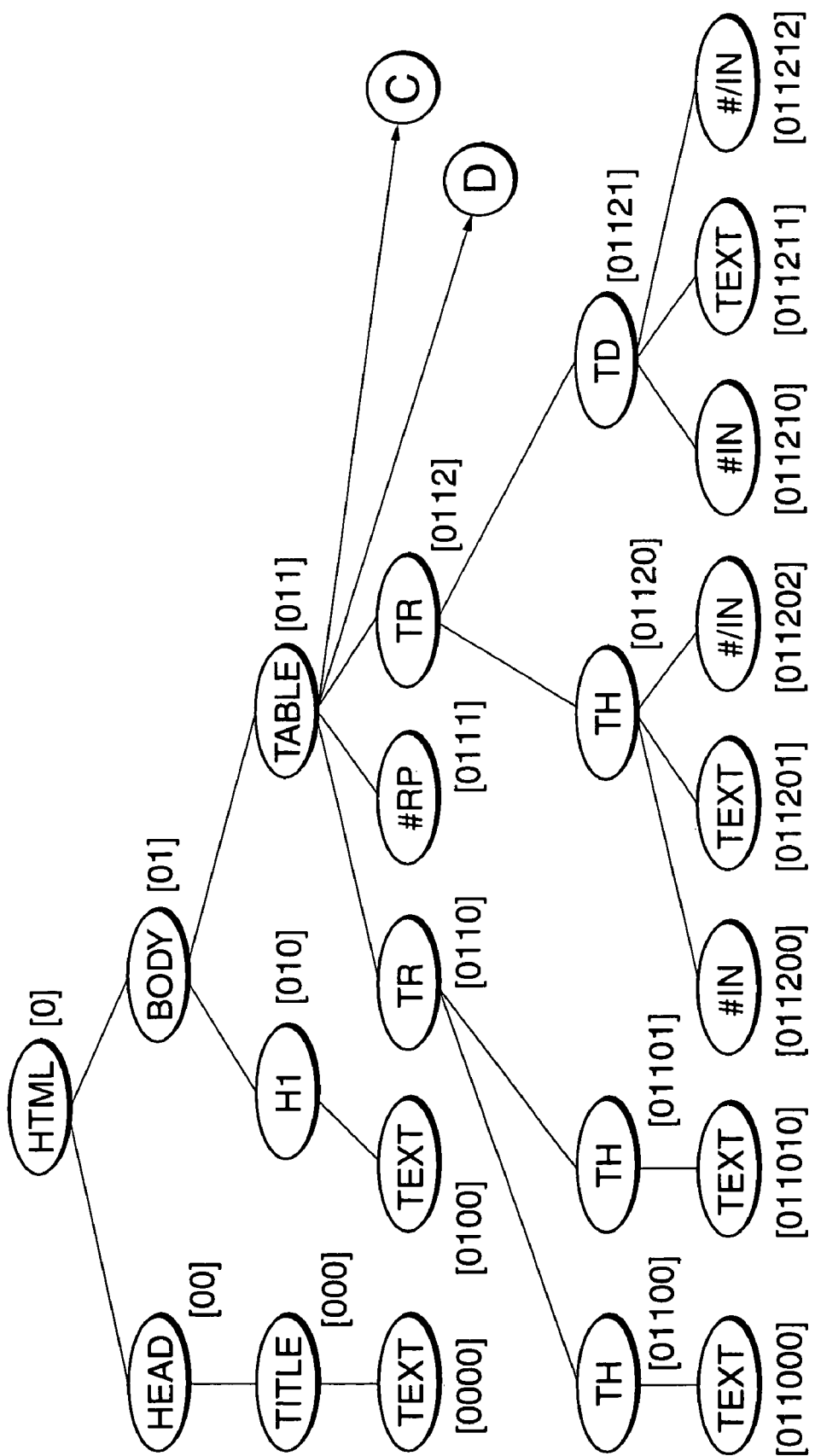
FIG. 7 shows an example of a parse tree resulting from repetitive duplication of an RP instruction of a document processing description example 1 for a template 1.
Figure 7B:
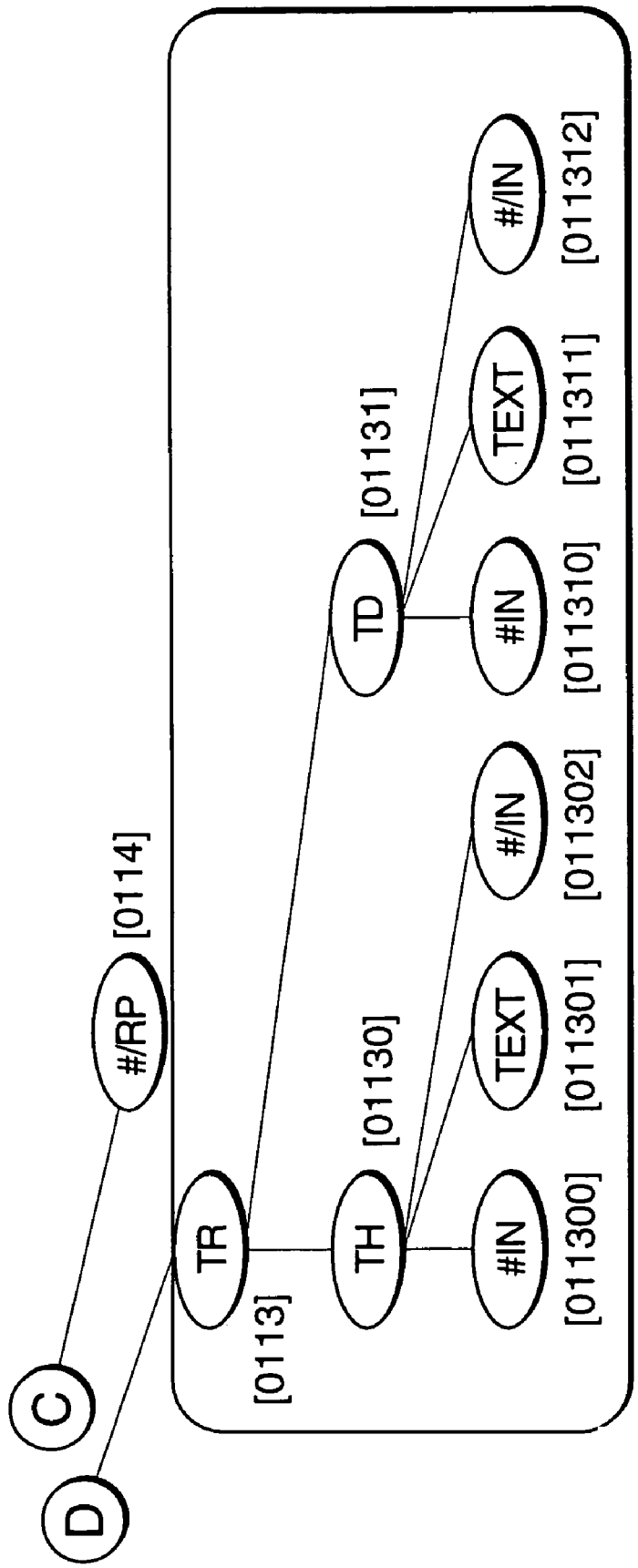
Figure 8A:
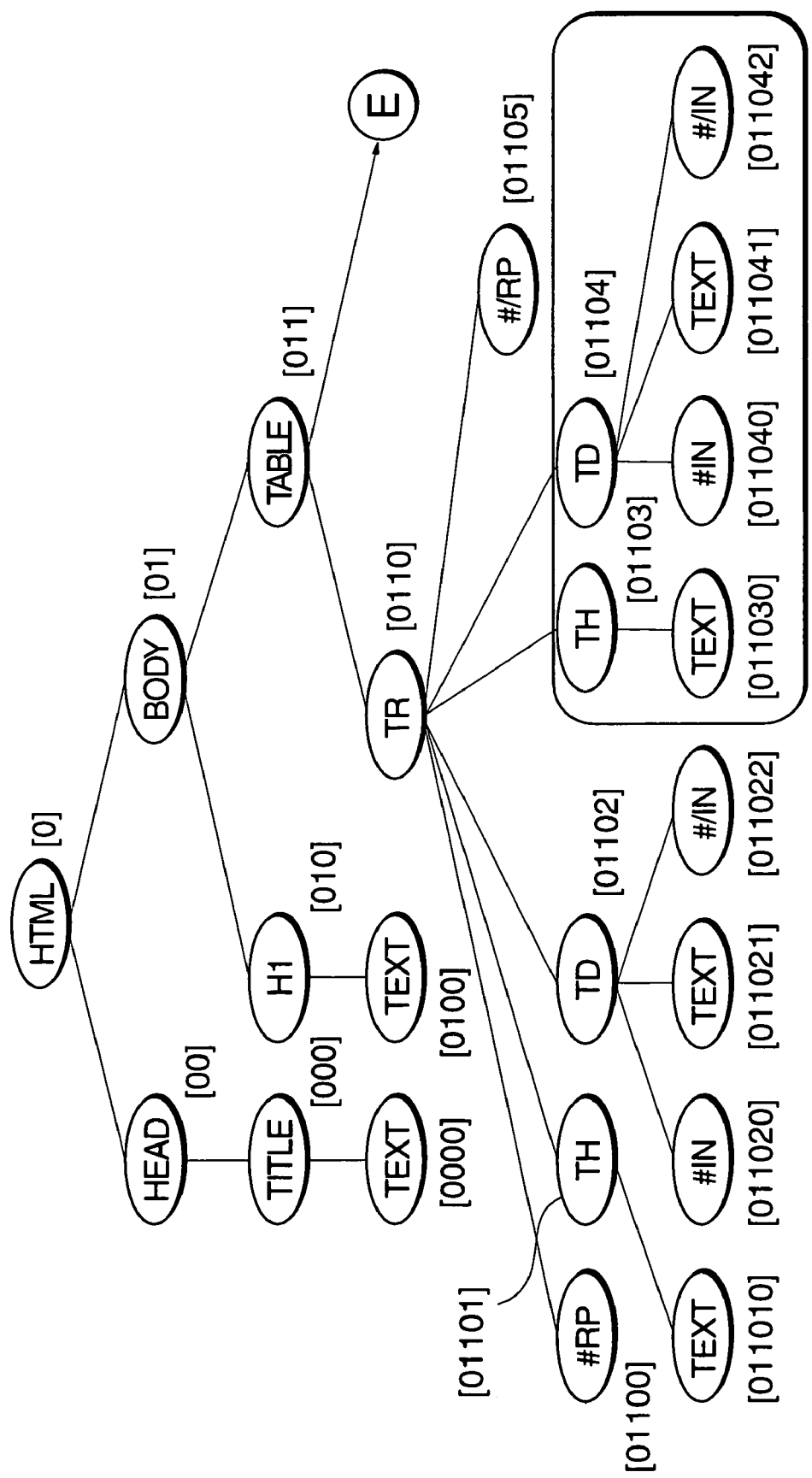
FIG. 8 shows an example of a parse tree resulting from repetitive duplication of an RP instruction of a document processing description example 2 for a template 2.
Figure 8B:
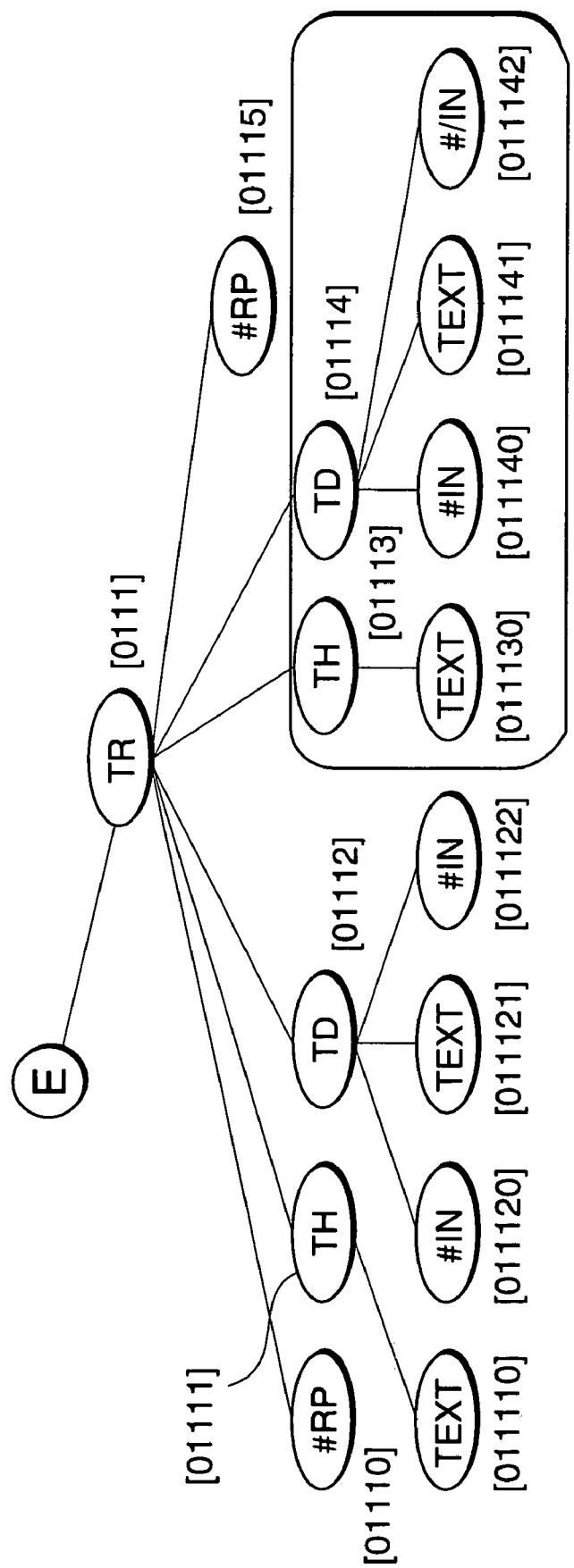

FIG. 7 shows an example of a parse tree resulting from the repetitive duplication of the RP instruction of the document processing description example 1 for the template 1. FIG. 8 shows an example of a parse tree resulting from the repetitive duplication of the RP instruction of the document processing description example 2 for the template 2. The portion enclosed by the bold frame denotes a portion repeatedly duplicated.

To the inserting/substituting unit, a first document part (or its ID) to be inserted or substituted and the ID of a second document part to indicate a position subject to the insertion or substitution are inputted. A node of a specified parse tree is found from the inputted ID of the second document part, and before (older node) or after (younger node) the node, the node of the specified first document part is inserted. For a substitution operation, a node specified as the second document part is deleted and the node of another document part specified in place of it is inserted. In place of the first or second document part, plural document parts may be specified for insertion or substitution. Each of the extracting unit, the repetitive duplication unit, and the inserting/substituting unit merely deforms or transforms the tree structure of a parse tree as described above, with techniques already known in the area of information processing industry, and the techniques are not described in more detail (the insertion and deletion of elements for a tree structure are described in, e.g., "Algorithm and Data Structure", Iwanami Shoten, Publishers, section 2.4).

Figure 9A:
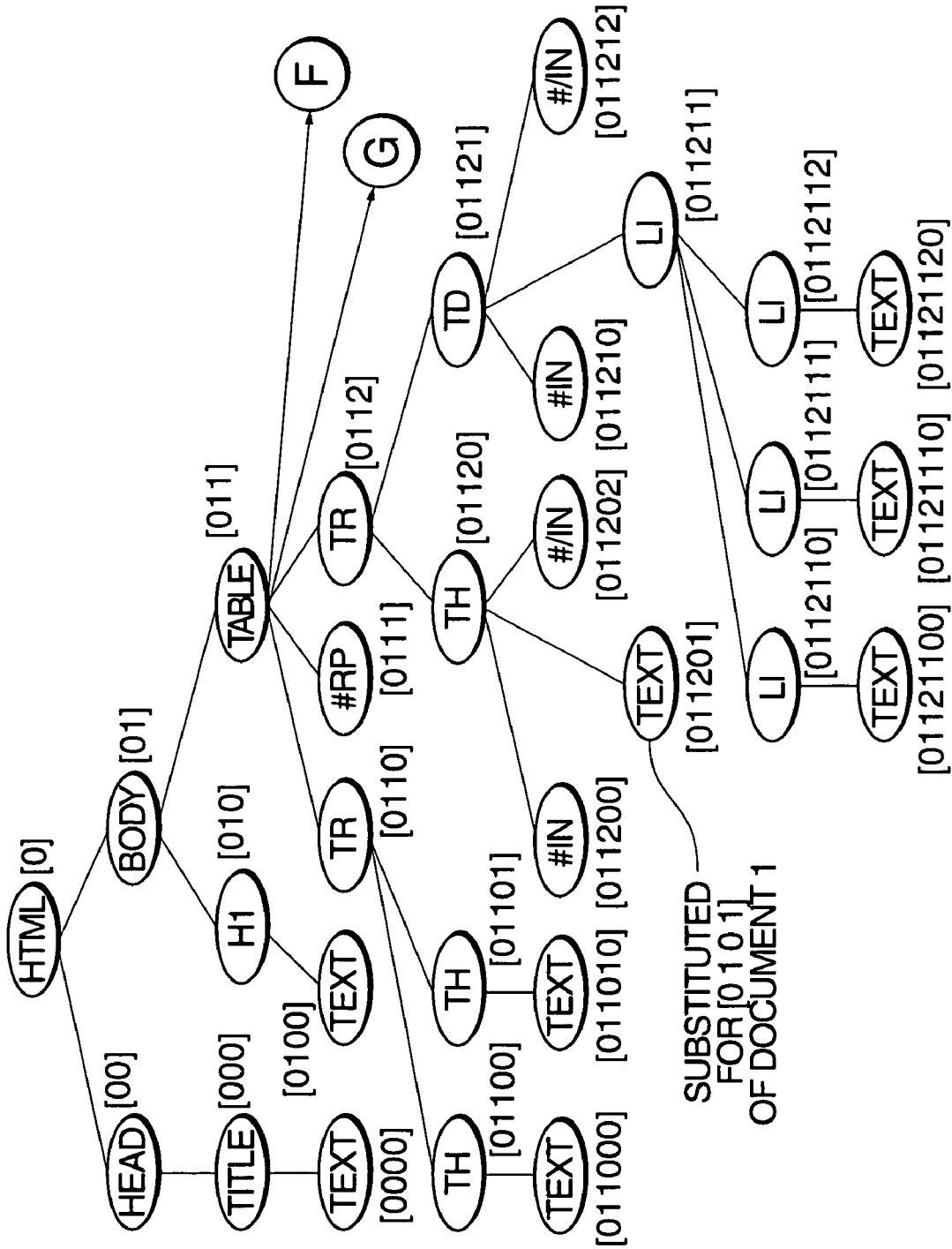
FIG. 9 shows the analysis tree of a document synthesized from the first original document, the second original document, and the first template.
Figure 9B:
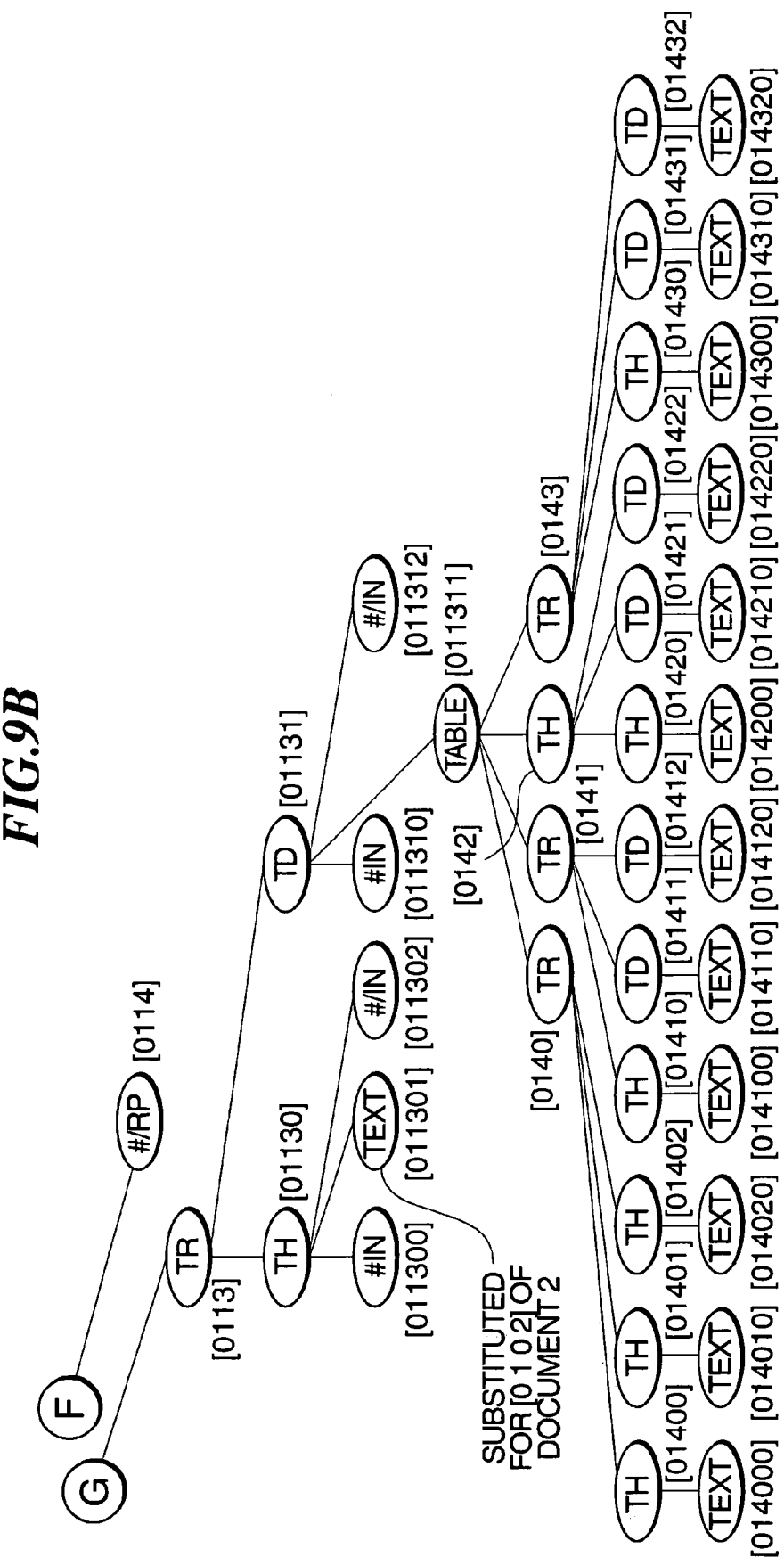

A document processing description is interpreted by the interpreter, a parse tree formed from a template is processed, and a document is synthesized. FIG. 9 shows the parse tree of a document synthesized from the first original document, the second original document, and the first template. In the figure, shaded nodes correspond to substituted document parts. An HTML file resulting from the synthesis is shown below.

<HTML>

<HEAD>

<TITLE> Template1</TITLE>

</HEAD>

<BODY BGCOLOR="#404040">
  <H1>progress summary </H1>
  <TABLE BORDER="1">
  <TR><TH> team </TH><TH> summary </TH></TR>
<!--#RP group-->
  <TR>
  <TH>
<!--#IN group--> Team A<!--#/IN-->
  </TH>
  <TD>

```
<!--#IN summary--><UL>
   <LI> Progress of item 1 is 60%. On schedule </LI>
   <LI> Progress of item 2 is 30%. Three days behind schedule
</LI>
   <LI> Progress of item 3 is 70%. An unexpected problem occurred. It is necessary to review the schedule. </LI>
   </UL><!--#/IN-->
   </TD>
   </TR>
   <TR>
   <TH>

<!--#IN group--> Team B<!--#/IN-->
   </TH>
   <TD>

<!--#IN summary--><TABLE BORDER="0" CELL SPACING="0"
CELLPADDING="1">
   <TR><TH> item </TH><TH> progress </TH><TH
ALIGN="LEFT""> evaluation </TH></TR>
   <TR><TH>1</TH><TD>20%</TD><TD>    a    little
behind schedule (one day)</TD></TR>
   <TR><TH>2</TH><TD>40%</TD><TD> no delay
</TD></TR>
   <TR><TH>3</TH><TD>60%</TD><TD>    ahead    of
schedule: three days </TD></TR>
   </TABLE><!--#/IN-->
   </TD>
   </TR>

<!--#/RP-->
</TABLE>
</BODY>
</HTML>
```

FIG. 20 shows the result of displaying the above HTML file by a standard HTML browser.

Likewise, an HTML file of a document synthesized from the original document, second original document, and second template is shown below.

```
<HTML>
<HEAD>
<TITLE> Template2</TITLE>
</HEAD>
   <BODY>
   <H1>progress summary </H1>
   <TABLE BORDER=" 1">
   <TR>
   <TH> team </TH>

<!--#BP group-->
   <TH>

<!--IN group--> Team A<!--#/IN-->
   </TH>
   <TH>

<!--IN group--> Team B<!--#/IN-->
   </TH>

<!--#/RP-->
   </TR>
   <TR>
   <TH> summary </TH>
```

```
<!--RP summary-->
   <TD ALIGN="LEFT">

<!--#IN summary-->
   <UL>
   <LI> Progress of item 1 is 60%. On schedule </LI>
   <LI> Progress of item 2 is 30%. Three days behind
      schedule </LI>
   <LI> Progress of item 3 is 70%. An unexpected problem
      occurred.
It is necessary to review the schedule. </LI>
   </UL><!--#/IN-->
   </TD>
   <TD ALIGN="LEFT">

<!--#IN summary-->
   <TABLE BORDER="0" CELLSPACING="0"
CELLPADDING=" 1">
   <TR><TH> item </TH><TH> progress </TH><TH
ALIGN="LEFT""> evaluation </TH></TR>
   <TR><TH>1</TH><TD>20%</TD><TD>    a    little
behind schedule (one day)</TD></TR>
   <TR><TH>2</TH><TD>40%</TD><TD>    no    delay
</TD></TR>
   <TR><TH>3</TH><TD>60%</TD><TD>    ahead    of
schedule: three days </TD></TR>
   </TABLE><!--/IN-->
   </TD>

<!--#/RP-->
   </TR>
</TABLE>
</BODY>
</HTML>
```

FIG. 21 shows the result of displaying the above HTML file by a standard HTML browser, which is apparently different from the document synthesizing result shown FIG. 20. That is, it is to be understood that, even though structured document processing of this embodiment is performed for the same original documents 1 and 2, if an applied template is different, a synthesized document is also different.

As has been described, the structured document processing system of this embodiment can synthesize structured documents by: inputting a first structured document provided with extraction instructions by the instruction providing unit and a second structured document provided with repetitive duplication instructions and insertion/substitution instructions by the instruction providing unit; forming a parse tree for each document by the analyzing unit; retrieving instruction strings from each document by the instruction separating unit; synthesizing a document processing description by subjecting the plural retrieved instruction strings to merging, sorting, and conversion by the document processing description synthesizing unit; sequentially scanning the document processing description by the interpreter; extracting first document parts from the first document by the extracting unit according to instructions contained in the document processing description; repeatedly duplicating document parts of the second structured document by the number of times determined depending on the number of first document parts by the repetitive duplication unit; and inserting or substituting the first document parts by the inserting/substituting unit.

According to the structured document system of this embodiment, the following can be achieved.

1. When the structure of an original document is changed, a script separately managed to deal with the change need not be prepared.

2. When document parts are to be retrieved from a mixture of plural original documents different in structure, since the extraction instructions are provided to the document parts on a document basis, extraction processing need not be specified individually for each of the documents. Likewise, document part insertion or substitution processing need not be specified. Users need not specify a script each time the structure of a document changes.

3. Document parts can be created by directly putting desired instructions in an original document and specifying conditions (e.g., a matching label string, etc.) for retrieved document parts and document parts to be subjected to insertion or substitution. Users can constitute document processing applications by designing (creating) a template according to their purposes or selecting a template in which instructions to perform desired processing are embedded, and combining them with original documents by themselves. In this way, since document processing can be performed by a non-procedural, in other words, declaration-like method, even users not having adequate programming knowledge can perform a wide range of document processing. That is, a structured document processing system which enables users to easily create structured document processing applications satisfying their purposes can be implemented.

Next, a second embodiment of the present invention is described.

Figure 10A:
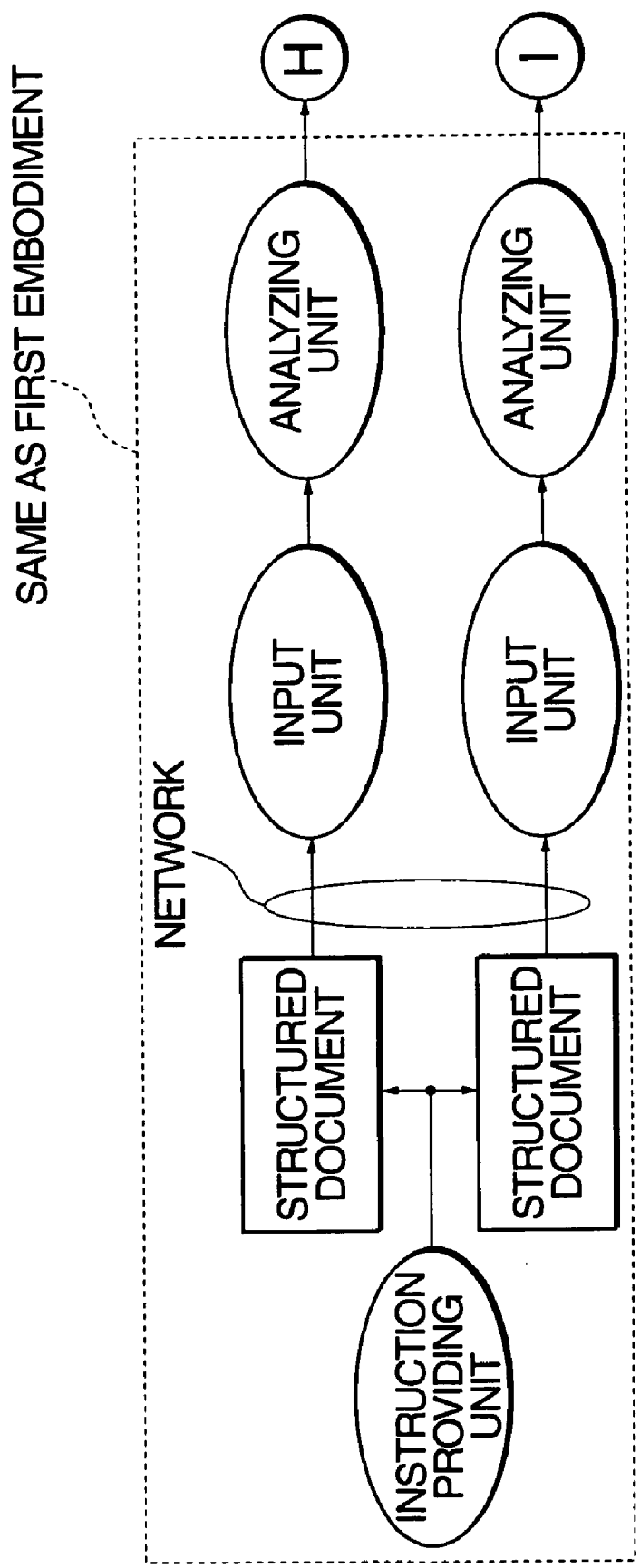
FIG. 10 is a functional block diagram schematically showing the configuration of a structured document processing system of a second embodiment of the present invention.
Figure 10B:
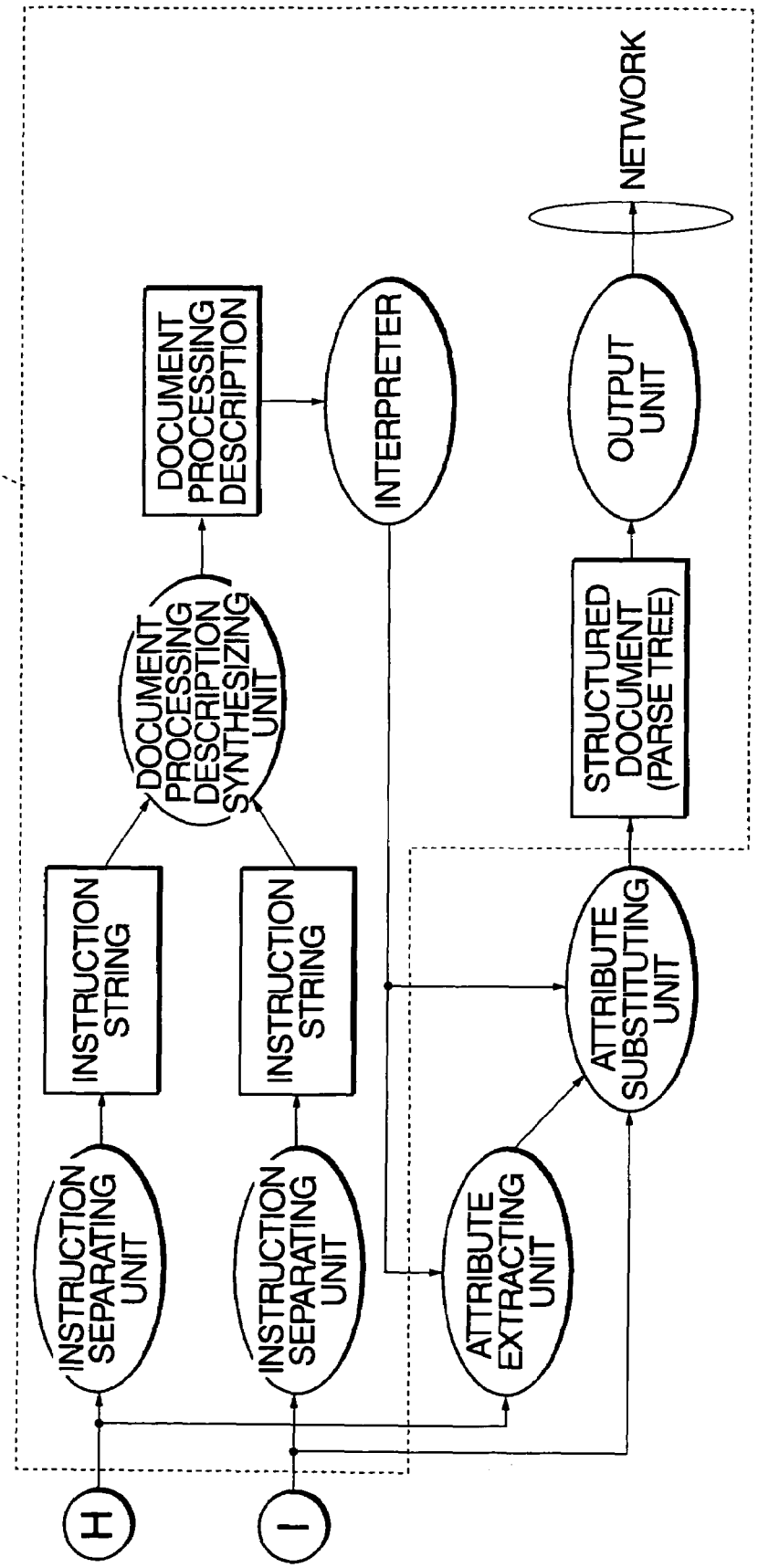

FIG. 10 is a schematic diagram showing the configuration of a structured document processing system of the second embodiment of the present invention. In this embodiment, document processing is performed for a structured document provided with attribute extraction instructions in place of extraction instructions, and attribute substitution instructions in place of insertion/substitution instructions. Hereinafter, this embodiment is described, centering on differences from the first embodiment.

The instruction providing unit is constituted by an HTML editor as in the first embodiment. The instruction providing unit of this embodiment embeds, within an inputted document, attribute extraction instructions in place of extraction instructions, and attribute substitution instructions in place of insertion/substitution instructions. The instructions are described as follows.

Attribute Extraction Instruction

<!--#GET LABEL tag name-->

* A document part written in HTML

<!--#/GET-->

Attribute Substitution Instruction

<!--#PUT LABEL tag-name attribute-name-->

* A document part written in HTML

<!--#/PUT-->

In the above, 'GET' designates an attribute extraction instruction and 'PUT' designates an attribute substitution instruction. <!--#GET LABEL tag name--> and <!--#/GET--> are an attribute extraction instruction start tag and an attribute extraction instruction end tag, respectively, and likewise, <!--#PUT LABEL tag-name attribute-name--> and <!--#/PUT--> are an attribute substitution instruction start tag and an attribute substitution instruction end tag, respectively.

An example of an HTML file provided with an attribute extraction instruction is shown below. This specification uses the HTML file as a third original document.

<HTML>

<HEAD>

<TITLE> Sample3</TITLE>

</HEAD>

<BODY>
　　<H2>link collection </H2>
　　<HR>
<!--#GET link A-->
　　<A　HREF="http://sample.com/"　target="win0">link 1</A>
<!--#/GET-->
　　<HR>
</BODY>

</HTML>

Figure 22:
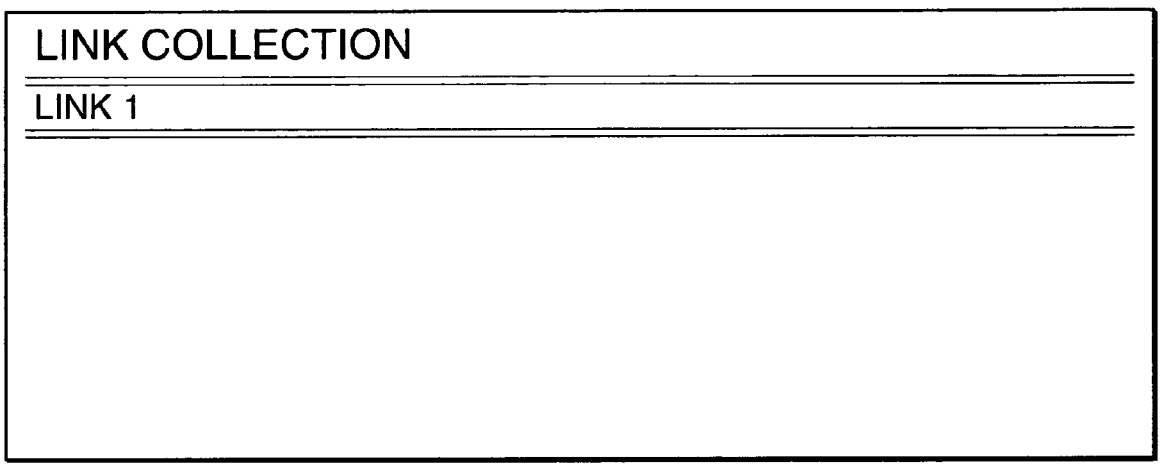
FIG. 22 shows the result of displaying the third original document by a standard HTML browser.

FIG. 22 shows the result of displaying the third original HTML file by a standard HTML browser.

An example of an HTML file provided with an attribute substitution instruction is shown below. This specification uses the HTML file as a third template.

<HTML>

<HEAD>

<TITLE> Sample3</TITLE>

</HEAD>

<BODY>
　　<HI> information collection </HI>
　　<HR>
　　<IMG SRC="images/chart.gif" alt="chart" WIDTH="600" HEIGHT="200" BORDER="0" USEMAP="#mapdata0">
　　<MAP NAME="mapdata0">
<!--#PUT link AREA=HREF-->
　　<AREA SHAPE="rect" ALT="link collection" coords=0, 20,200,85 HREF=" ">
<!--#/PUT-->
　　</MAP>
　　<HR>
</BODY>

</HTML>

The configuration and operation characteristics of the instruction providing unit and the input unit are almost the same as those of the above-described first embodiment; an explanation thereof is omitted herein.

The analyzing unit is also the same as that of the first embodiment. However, the analyzing unit of this embodiment analyzes whether comment tags follow the rules described below.

Figure 11:
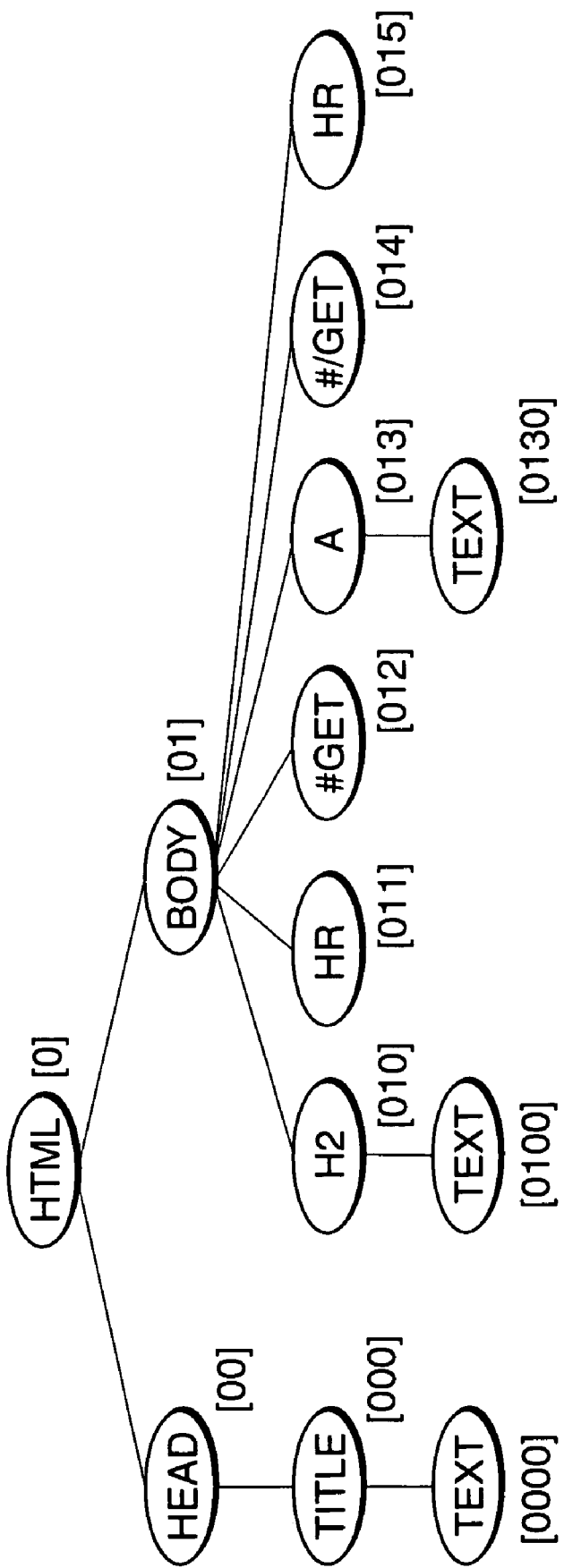
FIG. 11 shows the parse tree of a third original document.
Figure 12:
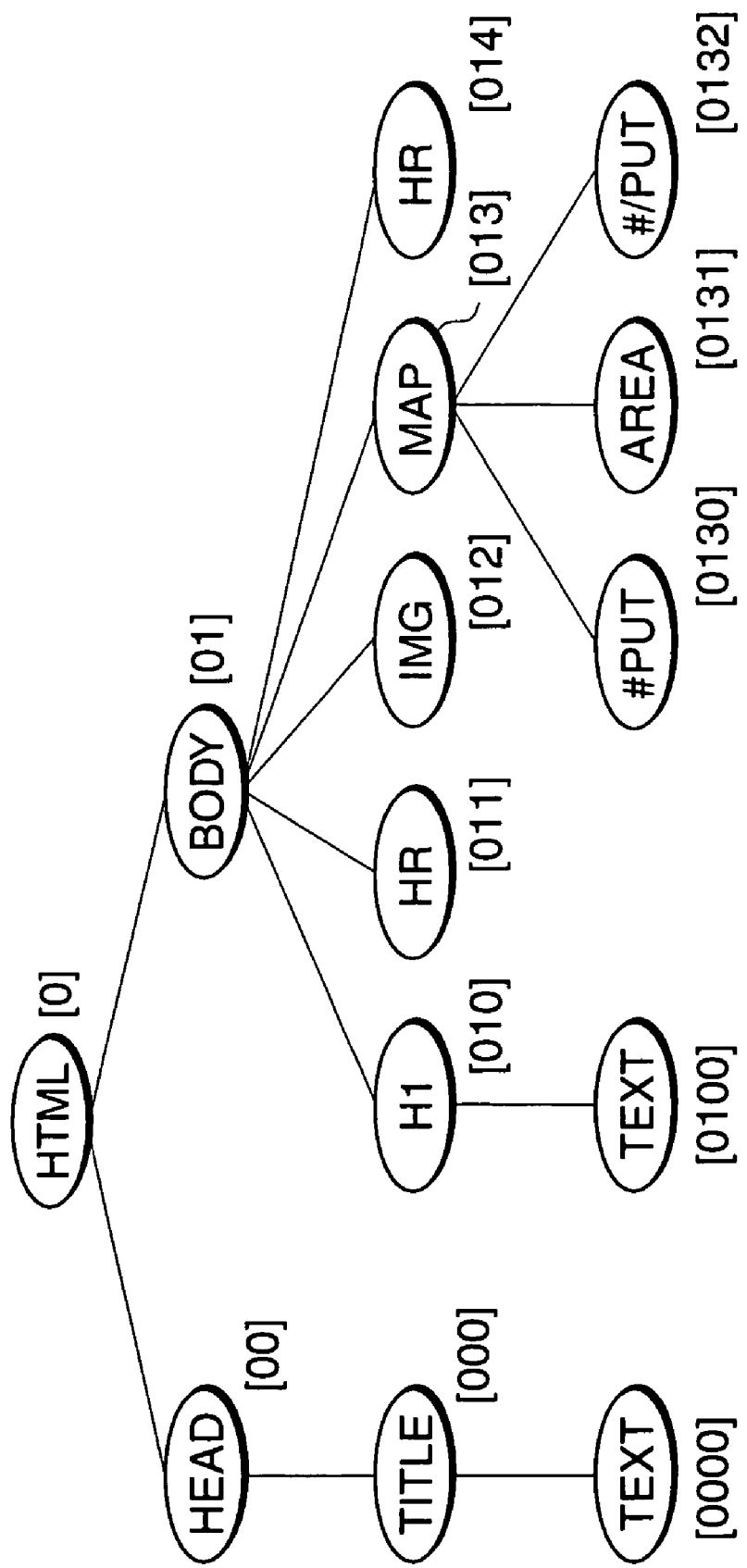
FIG. 12 shows the parse tree of a third template.

"#GET<blank><LABEL string><blank><tag name string>"→Attribute extraction instruction start tag "#/GET"→Attribute extraction instruction end tag "#PUT<blank><LABEL string><blank><tag name string>=<attribute name string>"→Attribute substitution instruction start tag "#/PUT"→Attribute substitution instruction end tag FIG. 11 shows the parse tree of the third original document, and FIG. 12 shows the parse tree of the third template.

In FIG. 11, a document part provided with an attribute extraction instruction [0 1 2] is the node of [0 1 3]. Likewise, in FIG. 12, a document part provided with an attribute substitution instruction [0 1 3 0] is the node of [0 1 3 1]. In these document parts, the tags of tag names specified in the attribute extraction instruction or attribute substitution instruction are the target tags of attribute extraction instructions or attribute substitution instructions, respectively. In this embodiment, the target tags of attribute extraction instructions are <A> tags and the target tags of attribute substitution instructions are <AREA> tags. Plural target tags may exist in a document part. To retrieve target tags, as in the first embodiment described above, a tree is scanned in prefix order and the tags of tag names specified in operands can be collected.

The instruction separating unit is also almost the same as that of the first embodiment. However, it is different from that of the first embodiment in that operation codes are GET for attribute extraction instructions and PUT for attribute insertion instructions. Since attribute extraction instructions are provided with tag names and attribute insertion instructions are provided with tag names and attribute names, as arguments of the instructions respectively, they are outputted as operands.

Instruction strings separated from the third original document and the third template by the instruction separating unit are shown below. The IDs of document analysis trees are 5 and 6, respectively.

Instruction string separated from the third original document

| Operation code | Label | Tag name | Document part ID |
|---|---|---|---|
| GET | Link | A | <5, [0 1 3]> |

Instruction string separated from the third template

| Operation code | Label | Tag name | Attribute name | Document part ID |
|---|---|---|---|---|
| PUT | Link | AREA | HREF | <6, [0 1 3 1> |

The document processing description synthesizing unit inputs instruction strings separated from plural original documents or templates, merges and sorts the instruction strings, and outputs a document processing description after conversion and synthesis. The document processing description synthesizing unit is the same as that of the first embodiment, except the points described below.

Procedure C: Synthesizing Instructions

Of all combinations of GETs of original documents and PUTs of templates, those matching in a label string are paired, and new instructions are synthesized from the pairs. The procedure of the operation is described below.

In this embodiment, "SUBST tag-name-1 document-part-1 tag-name-2 document-part-2 attribute-name" is synthesized from the pair of "GET LABEL tag-name-1 document-part-1" and "PUT LABEL tag-name-2 attribute-name document-name-2." SUBST is an instruction that selects an attribute value specified by the attribute name from the attribute field of the node of the tag name 1 contained in the document part 1 and sets it in the attribute field of the node of the tag name 2 contained in the document part 2. This operation enables the attribute values of tags contained in the template to be replaced by different values. Attribute value replacement is made also for a pair of instructions having different tag names if they have an attribute field of the same name.

Step 41: All instruction strings of the original documents are scanned and an array of instructions is created for each of label strings. This array is called a GET array. The GET array is stored in an associative array with label strings as key.

Step 42: All instruction strings of the template are scanned and an array of instructions is created for each of label strings. This array is called a PUT array. The PUT array holds label strings as attributes.

Step 43: For all the PUT arrays, step 44 and subsequent steps are executed.

Step 44: A GET array having, as an operand, a string matching a label string of the PUT arrays, which is the attribute of the PUT arrays, is retrieved.

Step 45: For all elements of the PUT arrays, step 46 and subsequent steps are sequentially executed beginning with the 0-th element.

Step 46: Tag name 1 as a tag name and document part 1 as document part ID are retrieved from operands of a GET instruction stored as the m-th element of the GET array. Tag name 2 as a tag name, attribute name, and document part 2 as document part ID are retrieved from operands of a PUT instruction stored as the m-th element of the PUT array.

Step 47: The following instruction is added to the document processing description. In this example, an operation code is SUBST and operands are tag name, document part 1, tag name 2, document part 2, and attribute name.

SUBST tag-name-1 document-part-1 tag-name-2 document-part-2 attribute-name

An example of a document processing description synthesized from the third original document and the third template by the above-described processing is shown below.
SUBST A 5, [0 1 3] AREA 6, [0 1 3 1] HREF This instruction sets the value of HREF attribute of A tag of a node [0 1 3] and its subordinate nodes of document 5 (see FIG. 11) in HREF attribute of AREA tag of a node [0 1 3 1] and its subordinate nodes of document 6 (see FIG. 12).

Although the examples shown in FIGS. 11 and 12 handle the case where GET instructions are provided to document parts within original documents, the structured document processing system of this embodiment can perform the same processing also in the case where GET instructions are provided to document parts within templates. In this case, in step 42 of the instruction synthesizing processing described previously, an array of GET instructions and an array of PUT instructions are created separately, and the array of GET instructions may be added to the array created in step 41.

Although the above description is made on the case where there is only one attribute name to be substituted, plural attribute values may be substituted at a time by specifying plural attribute names in an attribute substitution start instruction, each separated by a comma.

Next, the operations of the interpreter, attribute extracting unit, and attribute substitution unit are described.

The basic operations of the interpreter are almost the same as those in the first embodiment; only different points will be primarily described. The interpreter, if the operation code of an inputted document processing description is SUBST, inputs document part ID of document part 1 and tag name 1, specified in operands, to the attribute extracting unit. Document part ID of document part 2, tag name 2, and attribute name are inputted to the attribute substitution unit.

The attribute extracting unit retrieves a node of a specified parse tree from the document part ID inputted from the interpreter according to the address. The attribute extracting unit scans the node and its subordinate nodes in prefix order for nodes of target tag 1 matching the inputted tag name and returns the node found first.

The attribute substitution unit retrieves a node of a specified document analysis tree from the document part ID inputted from the interpreter according to the address. The attribute substitution unit searches the node and its subordinate nodes in prefix order for the node of target tag 2 matching the inputted tag name. The attribute value of an attribute name of the attribute field of the found node of target tag 2, which matches the attribute name inputted from the interpreter, is replaced by the attribute value of the attribute name of target tag 1. If there are plural target tags 2, the replacement processing is repeated.

The above-described steps 46 and 47 may be replaced by steps 46a and 47a described below.

Step 46: Tag name 1 as a tag name and document part 1 as document part ID are retrieved from operands of a GET instruction stored as the m-th element of the GET array. The parse tree is scanned in prefix order from the node of document part 1 to search for the target tag 1 of tag name 1. Tag name 2 as a tag name, attribute name, and document part 2 as document part ID are retrieved from operands of a PUT instruction stored as the m-th element of the PUT array. The analysis tree is patrolled in prefix order from the node of document part 2 to search for the target tag 2 of tag name 2.

Step 47a: The following instruction is added to the document processing description. In this example, an operation code is SUBST and operands are target tag 1 (document part ID thereof), target tag 2 (document part ID thereof), and attribute name. SUBST target-tag-1 target-tag-2 attribute-name An example of another document processing description synthesized from the third original document and the third template by the above-described processing is shown below.

SUBST5, [0 1 3] 6, [0131] HREF

This instruction sets the value of HREF attribute (of A tag) of a node [0 1 2] of document 5 (see FIG. 11) in HREF attribute (of AREA tag) of a node [0 1 3 1] of document 6 (see FIG. 12).

The interpreter inputs the document part ID and attribute name of target tag 1 specified in an operand of the operation code SUBST of the inputted document processing description to the attribute extracting unit. The interpreter inputs the document part ID and attribute name of target tag 2 to the attribute substitution unit.

The attribute extracting unit and the attribute substitution unit retrieve the target tag 1 or 2 from the inputted document part ID according to the address, and then retrieves the attribute value of the specified attribute name of target tag 1 or replaces the attribute of target tag 2 by it.

An HTML file synthesized from the third original document and the third template is shown below.

```
<HTML>
<HEAD>
<TITLE> Template 3</TITLE>
</HEAD>
<BODY>
  <H1>information collection </H1>
  <HR>
  <IMG SRC="images/chart.gif" alt="chart" WIDTH="600" HEIGHT="200" BORDER="0" USEMAP="#mapdata0">
  <MAP NAME="mapdata0">
<!--#PUT link AREA=HREF-->
  <AREA SHAPE="rect" ALT="link collection" coords=0, 20,200,85 HREF="http://sample.com/">
<!--#/PUT-->
  </MAP>
  <HR>
</BODY>
</HTML>
```

Figure 23:
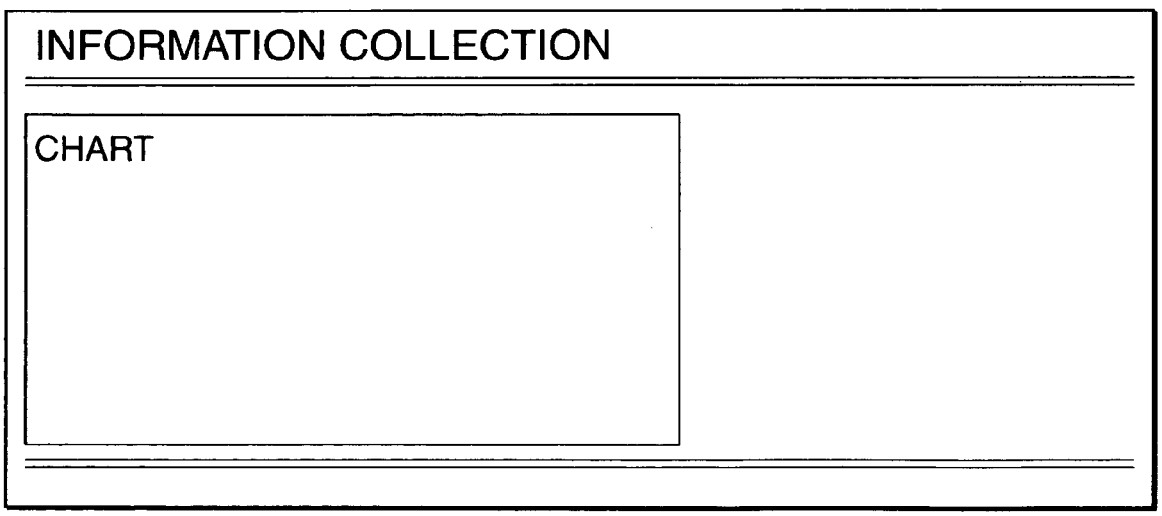
FIG. 23 shows the result of displaying, by a standard HTML browser, an HTML file synthesized from the third original document, and the third template (second embodiment)
Figure 26:
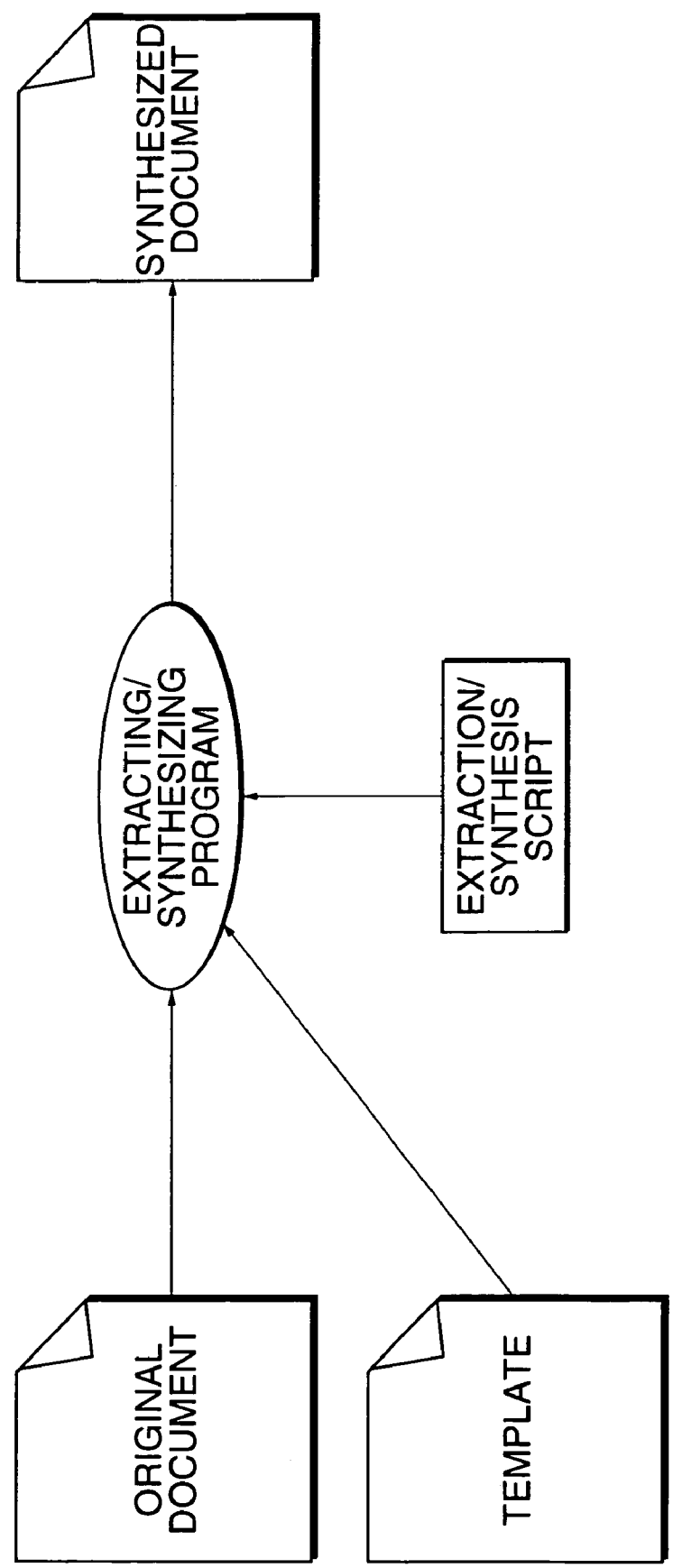
FIG. 26 shows an example of the configuration of a structured document processing system of conventional technology.
Figure 27:
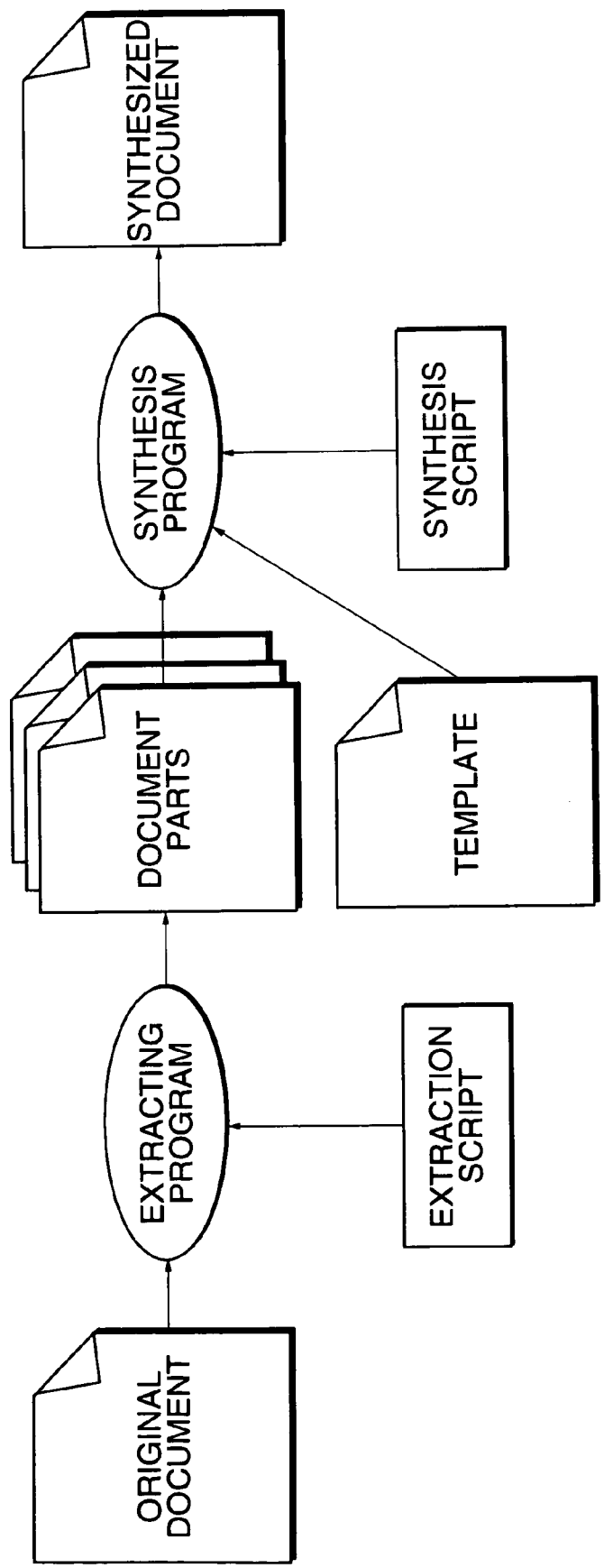
FIG. 27 shows an example of the configuration of a structured document processing system of conventional technology.

FIG. 23 shows the result of displaying the HTML file synthesized from the third original document and the third template by a standard HTML browser.

In the example of the third template, linked pages can be followed by clicking specified coordinate positions (coords=0,20,200,85) of a displayed image (chart: images/chart.gif). By the document processing of this embodiment, a link destination not specified in the third template is replaced by one (http://sample.com) specified in the third original document.

Next, a third embodiment of the present invention is described. In this embodiment, document processing is performed for a structured document provided with extraction instructions having a path name in place of extraction instructions, repetitive duplication instructions having a pattern expression in place of repetitive duplication instructions, and insertion/substitution instructions having a pattern expression in place of insertion/substitution instructions. Hereinafter, this embodiment is described, centering on differences from the first embodiment.

The instruction providing unit is constituted by an HTML editor as in the first embodiment. The instruction providing unit of this embodiment embeds, within an inputted document, extraction instructions having a path name in place of extraction instructions, repetitive duplication instructions having a pattern expression in place of repetitive duplication instructions, and insertion/substitution instructions having a pattern expression in place of insertion/substitution instructions. The instructions are described as follows.

Extraction Instruction Having a Path Name

<!--#/OUT path name-->

*A document part written in HTML

<!-#/OUT-->

Repetitive Duplication Instruction Having a Pattern Expression

<!--#RP pattern expression-->

*A document part written in HTML

<!--#/RP-->

Insertion/Substitution Instruction Having a Pattern Expression

<!--#IN pattern expression-->

* A document part written in HTML

<!--#/IN-->

Each of the input unit, the analyzing unit, and the instruction separating unit is almost the same as those of the first embodiment. The instruction separating unit extracts, as operands, a path name or a pattern expression instead of a label string. This can be easily achieved using string matching by regular expression as described in the first embodiment; a detailed description of it is omitted herein.

In this embodiment, a structured document in which label strings "group" and "summary" of the first original document (see FIG. 3) are replaced by path names "monthly report/group A" and "monthly report/summary A" is used as a fourth original document (original document 4). A structured document in which label strings "group" and "summary" of the second original document (see FIG. 4) are replaced by path names "monthly report/group B" and "monthly report/summary B" is used as a fifth original document (original document 5). A structured document in which label strings "group" and "summary" of the second original document are replaced by path names "monthly report/group E" and "monthly report/summary E" is used as a sixth original document (original document 6).

In this embodiment, pattern expressions use regular expression.

A structured document in which label strings "group" and "summary" of the first template are replaced by pattern expressions ".*/group[A–D]" and ".*/summary[A–D]"is used as a fourth template (template 4). The regular expression ".*/group[A–D]" referred to here denotes a pattern matching any string (.*), followed by '/group', followed by one of 'A', 'B', 'C', and 'D'.

Instruction strings separated from each document by the instruction separating unit are shown below.

Instruction strings separated from the fourth original document

| Operation code | Label | Document part ID |
|---|---|---|
| OUT | Monthly report/group A | <7, [0 1 0 1]> |
| OUT | Monthly report/summary A | <7, [0 1 4]> |

Instruction strings separated from the fifth original document

| Operation code | Path name | Document part ID |
|---|---|---|
| OUT | Monthly report/group B | <8, [0 1 0 2]> |
| OUT | Monthly report/summary B | <8, [0 1 4]> |

Instruction strings separated from the sixth original document

| Operation code | Path name | Document part ID |
|---|---|---|
| OUT | Monthly report/group E | <9, [0 1 0 2]> |
| OUT | Monthly report/summary E | <9, [0 1 4]> |

Instruction strings separated from the fourth template

| Operation code | Pattern expression | Document part ID |
|---|---|---|
| RP | .*/group[A–D] | <10, [0 1 1 2]> |
| IN | .*/group[A–D] | <10, [0 1 1 2 0 1]> |
| IN | .*/summary[A–D] | <10, [0 1 1 2 1 1]> |

Next, the document processing description synthesizing unit of this embodiment is described. In this embodiment, except that pattern matching by path name and pattern expression is performed instead of judging whether strings match, the document processing description synthesizing unit of this embodiment performs almost the same processing as that of the first embodiment. Herein, the operation characteristics of the document processing description synthesizing unit are described using an example of forming a document processing description from instruction strings separated from each of the original documents 4 and 5, and the template 4.

Procedure A: Counting OUT

OUT is not counted, which was performed in procedure A of the first embodiment.

Procedure B: Duplicating Instructions by RP

If RPs are contained in the instruction strings of the template 1, then IN, OUT, and RP contained in document parts of operands of all the RPs are duplicated according to the number of OUT instructions of the original document that succeeded in pattern matching by path name and pattern expression. The duplication is made by performing the following steps 51 to 56 for one template. Pattern matching of regular expression is achieved by using, e.g., a grep command (already known) on UNIX.

Step 51: An RP list is created.

Step 52: While sequentially modifying pertinent RPs (repetitive duplication instruction) in the RP list, step 53 and subsequent processing are performed for each of the RPs.

Step 53: The pattern expression of an operand of a pertinent Rp is retrieved, the instruction strings are sequentially scanned from the beginning to retrieve the path name of an operand of an OUT instruction, pattern matching is performed, and the number of OUT instructions that succeeded is used as a repetitive duplication count t. If t is 2 or greater, step 54 and subsequent steps are executed. Step 54 and subsequent steps are almost the same as step 24 and subsequent steps in the first embodiment; an explanation thereof is omitted.

The pattern expression "./group [A–D]" succeeds in pattern matching with "monthly report/group A" and "monthly report/group B", but fails in pattern matching with "monthly report/group E." Therefore, in the above example, a duplication count t is set to 2.

Instruction strings resulting from execution of the procedure B for instruction strings separated from the fourth template

| Operation code | path name/ pattern expression | Document part ID |
|---|---|---|
| RP | 2 | <10, [0 1 1 2]> |
| IN | .*/group[A–D] | <10, [0 1 1 2 0 1]> |
| IN | .*/group[A–D] | <10, [0 1 1 2 1 1]> |
| IN | .*/group[A–D] | <10, [0 1 1 3 0 1]> |
| IN | .*/summary[A–D] | <10, [0 1 1 3 1 1]> |

Procedure C: Synthesizing Instructions

Of all combinations of OUT instructions in the original documents and IN instructions in the template, those that succeed in pattern matching between path names and a pattern expression are paired, and new instructions are synthesized from the pairs. The procedure of the operation is described below.

In this embodiment, for example, "FILL document-part-1 document-part-2" is synthesized from the pair of "OUT path-name document-part-1" and "IN pattern-expression document-part-2." FILL indicates an instruction that substitutes the document part 1 for the document part 2. This operation enables document parts of original documents to be substituted or inserted in user-desired positions of the template, regardless of the occurrence order of the document parts in the original documents.

Step 61: All instruction strings of the original documents are scanned and OUT instructions are stored in an array. This array is called an OUT array. The OUT array holds path names as attribute.

Step 62: All instruction strings of the template are scanned and IN instructions are stored in an array. This is called an IN array. The IN array holds pattern expressions as attribute.

Step 63: For all IN instructions of the IN array, step 64 and subsequent steps are sequentially executed.

Step 64: A pattern expression, which is the attribute of the IN array, is retrieved, elements of the OUT array are sequentially scanned from the beginning to perform pattern matching between the path names of the elements and the pattern expression, and OUT instructions are retrieved from the elements that succeeded. The elements that succeeded are removed from the OUT array.

Step 65: Document part 1, which is the document part ID of an operand of an OUT instruction retrieved from the OUT array, is retrieved. Document part 2, which is the document part ID of an operand of an IN instruction, is retrieved.

Step 66: The following instruction is added to the document processing description. In this example, the operation code of the instruction is FILL and operands are document part 1 and document part 2.

FILL document-part-1 document-part-2

A document processing description is synthesized by the above procedure. An example of the synthesized document processing description is shown below.

*An example of a document processing description synthesized from the first original document, the second original document, and the first template

```
RP      2              2, [0 1 1 2]
FILL    0, [0 1 0 1]   2, [0 1 1 2 0 1]
FILL    1, [0 1 0 2]   2, [0 1 1 3 0 1]
FILL    0, [0 1 4]     2, [0 1 1 2 1 1]
FILL    0, [0 1 4]     2, [0 1 1 3 1 1]
```

It is to be noted that, in the above example, document parts specified in operands of OUT instruction that failed in pattern matching are not inserted or substituted in the template.

An HTML file synthesized from the original documents 4, 5, and 6 and the template 4 by the structured document processing system of this embodiment is shown below.

<HTML>

<HEAD>

<TITLE> Template1 </TITLE>

</HEAD>

<BODY BGCOLOR="#404040">
  <H1>progress summary </H1>
  <TABLE BORDER="1">
  <TR><TH> team </TH><TH> summary </TH></TR>
<!--#RP.*/ group [A–D]-->
  <TR>
  <TH>
<!--IN .*/ group [A–D]--> Team A<!--#/IN-->
  </TH>
  <TD>
<!--#IN .*/ summary [A–D]--><UL>
  <LI> Progress of item 1 is 60%. On schedule </LI>
  <LI> Progress of item 2 is 30%. Three days behind schedule
</LI>
  <LI> Progress of item 3 is 70%. An unexpected problem occurred. It is necessary to review the schedule. </LI>
  </UL><!--#/IN-->
  </TD>
  </TR>
  <TR>
  <TH>
<!--IN .*/ group [A–D]--> Team B<!--#/IN-->
  </TH>
  <TD>
<!--#IN .*/ summary [A–D]--><TABLE BORDER="0" CELLSPACING=" 0" CELLPADDING="1">
  <TR><TH> item </TH><TH> progress </TH><TH ALIGH="LEFT""> evaluation </TH></TR>
  <TR><TH>1'/TH><TD>20%</TD><TD> a little behind schedule (one day)</TD></TR>
  <TR><TH>2</TH><TD>40%</TD><TD>  no   delay </TD></TR>
  <TR><TH>3</TH><TD>60%</TD><TD>  ahead  of schedule: three days </TD></TR>
  </TABLE><!--#/IN-->
  </TD>
  </TR>
<!--#/RP-->
</TABLE>
</BODY>

</HTML>

FIG. 24 shows the result of displaying the above HTML file by a standard HTML browser.

The third embodiment of the present invention can have the same effect as the first embodiment. It is to be noted that the use of pattern expressions in place of label strings has made it possible to synthesize a more flexible and complex document processing description.

Next, a fourth embodiment of the present invention is described. This embodiment is conspicuously different from the third embodiment above in that it has, in place of the document processing description synthesizing unit and the inserting/substituting unit, a document processing description synthesizing unit and an inserting/substituting unit which are described below.

A description is made below of procedure C performed by the instruction document processing description synthesizing unit in this embodiment.

Procedure C: Synthesizing Instructions

Of all combinations of OUT instructions in the original documents and IN instructions in the template, those that succeed in pattern matching between path names and a pattern expression are paired, and new instructions are synthesized from the pairs. The instruction synthesizing operation is described below.

In this embodiment, for example, "FILL document-part-1 document-part-2 path-name" is synthesized from the pair of "OUT path-name document-part-1" and "IN pattern-expression document-part-2." FILL indicates an instruction that substitutes the document part 1 for the document part 2. Additionally, it substitutes an insertion/replacement instruction start tag and an insertion/replacement instruction end tag for an extraction instruction start tag and an extraction instruction end tag, respectively. This operation enables document parts of original documents to be substituted or inserted in user-desired positions of the template, regardless of the occurrence order of the document parts in the original documents. Additionally, when a document synthesized as a result of the processing is inputted and processed again by the structured document processing system of this embodiment, document parts contained in the original documents can be identified.

Step 71: All instruction strings of the original documents are scanned and OUT instructions are stored in an array. This array is called an OUT array. The OUT array holds path names as attribute.

Step 72: All instruction strings of the template are scanned and IN instructions are stored in an array. This is called an IN array. The IN array holds pattern expressions as attribute.

Step 73: For all IN instructions of the IN array, step 74 and subsequent steps are sequentially executed.

Step 74: A pattern expression, which is the attribute of the IN array, is retrieved, elements of the OUT array are sequentially scanned from the beginning to perform pattern matching between the path names of the elements and the pattern expression, and OUT instructions are retrieved from the elements that succeeded. The elements that succeeded are removed from the OUT array.

Step 75: Document part 1, which is the document part ID of an operand of an OUT instruction retrieved from the OUT array, is retrieved. Additionally, the path name of the OUT instruction is retrieved, and document part 2, which is the document part ID of an operand of an IN instruction, is retrieved.

Step 76: The following instruction is added to the document processing description. In this example, the operation code of the instruction is FILL and operands are document part 1 and document part 2.

FILL document-part-1 document-part-2 path-name

Path names may be not only path name strings retrieved from operands of extraction instructions (IN instructions) separated from original documents but also strings assigned to environment variables or global variables of predetermined names, or strings passed as arguments when the structured document processing system of this embodiment is started, wherein the strings are separated by a proper separator. In the above example, "/" is used as a separator and a host name is specified as a history string. The host name is "General Affairs Division." An example of a document processing description synthesized by this processing is shown below.

*An example of a document processing description synthesized from the fourth original document, the fifth original document, and the fourth template

```
RP          2                        2, [0 1 1 2]
FILL        0, [0 1 0 1]             2, [0 1 1 2 0 1]
General Affairs Division/monthly report/group A
FILL        1, [0 1 0 2]             2, [0 1 1 3 0 1]
General Affairs Division/monthly report/group B
FILL        0, [0 1 4]               2, [0 1 1 2 1 1]
General Affairs Division/monthly report/summary A
FILL        0, [0 1 4]               2, [0 1 1 3 1 1]
General Affairs Division/monthly report/summary B
```

Next, the interpreter and the inserting/substituting unit are described.

The interpreter interprets a FILL instruction of the document processing description and inputs document parts 1 and 2, and a path name to the inserting/substituting unit. Except for this point, the interpreter of this embodiment is almost the same as that of the first embodiment.

The inserting/substituting unit replaces an insertion/substitution instruction start tag and insertion/substitution instruction end tag, which indicate an insertion/substitution instruction originally provided to a document part of ID specified by document part 2, by an extraction instruction start tag and an extraction instruction end tag, respectively. A path name inputted from the interpreter is provided to the extraction instruction start tag. This replacement processing can be easily achieved by replacing comment strings of respective comment tags in the HTML file. Except for this point, the interpreter of this embodiment is almost the same as that of the first embodiment described above.

An HTML file synthesized from the original documents 4, 5, and 6 and the template 4 by the structured document processing system of this embodiment is shown below.

<HTML>

<HEAD>

<TITLE> Template1</TITLE>

</HEAD>

<BODY BGCOLOR="#404040">

<H1>progress summary </H1>

<TABLE BORDER="1">

<TR><TH> team </TH><TH> summary </TH></TR>

<!--#RP .*/ group [A–D]-->

<TR>

<TH>

<!--#OUT General Affairs Division/monthly report/group A--> Team A<!--#/OUT-->

</TH>

<TD>

<!--#OUT General Affairs Division/monthly report/summary A--><UL>

<LI> Progress of item 1 is 60%. On schedule </LI>

<LI> Progress of item 2 is 30%. Three days behind schedule

```
</LI>
   <LI> Progress of item 3 is 70%. An unexpected problem
occurred. It is necessary to review the schedule. </LI>
      </UL> <!--#/OUT-->
      </TD>

</TR>

<TR>
   <TH>

<!--#OUT General Affairs Division/monthly report/group
B--> Team B<!--#/OUT-->
   <TH>
   <TD>

<!--OUT General Affairs Division/monthly report/summary
B--><TABLE BORDER="0" CELLSPACING="0" CELL-
PADDING="1">
   <TR><TH> item </TH><TH> progress </TH><TH
ALIGH="LEFT""> evaluation </TH></TR>
   <TR><TH>1</TH><TD>20%</TD> a little behind
schedule (one day)</TD></TR>
   <TR><TH>2</TH><TD>40%</TD><TD> no delay
</TD></TR>
   <TR><TH>3</TH><TD>60%</TD><TD> ahead of
schedule: three days </TD></TR>
   </TABLE><!--#/OUT-->
   </TD>
   </TR>

<!--#/RP-->

</TABLE>

</BODY>

</HTML>
```

FIG. 25 shows the result of displaying the above HTML file by a standard HTML browser.

The fourth embodiment of the present invention can have the same effect as the first embodiment, and furthermore can deliver extraction instructions and path names of original documents to document parts of a synthesized structured document.

By connecting two or more of the structured document processing system of this embodiment to constitute a pipeline, document parts contained in an original document outputted in the first structured document processing system can be identified by checking path names in structured document processing of the second stage or later. By this function, more flexible and complex structured document processing can be performed.

A fifth embodiment of the present invention is described.

In the above-described first embodiment, the structured document processing system is configured as an HTTP server that inputs an HTTP request, performs specified structured document processing, and outputs a synthesized structured document as an HTTP response. In contrast, in this embodiment, a processing invocation description is embedded in an HTTP request. The processing initiation description referred to here includes both the URL of an original document and the URL of a template.

Figure 13B:
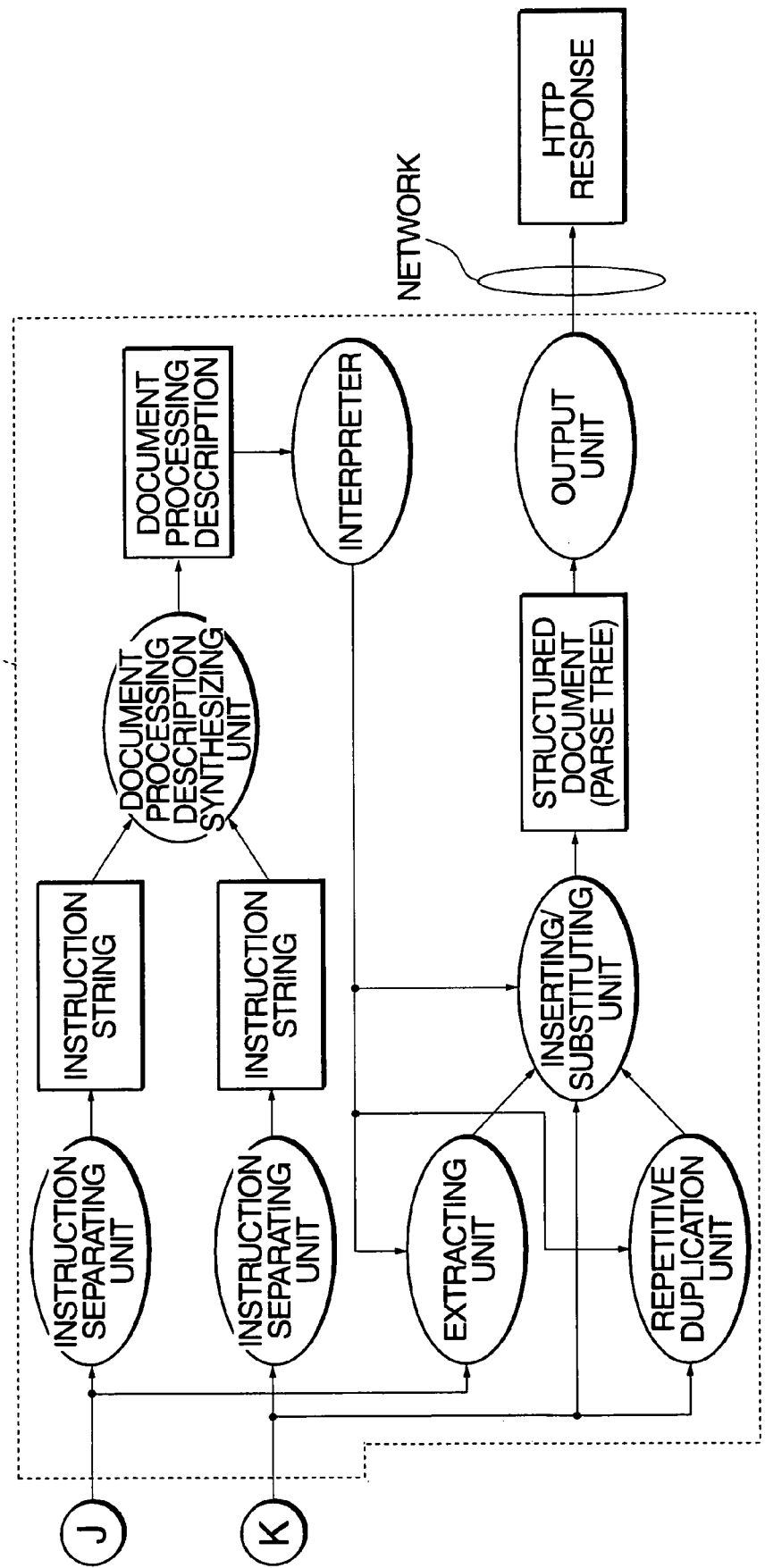
FIG. 13 is a functional block diagram schematically showing the configuration of a structured document processing system of a fifth embodiment of the present invention.

The structured document processing system of this embodiment further includes a processing invocation description analyzing unit that analyzes such a processing invocation description and retrieves URLs of original documents and URLs of templates. Based on the URLs retrieved as a result of analysis by the processing invocation description analyzing unit, the original documents and templates can be inputted by the input unit that processes. FIG. 13 is a schematic diagram showing the configuration of a structured document processing system of this embodiment. Hereinafter, the configuration and operation characteristics of the system are described, centering on differences from the first embodiment.

A processing invocation description is constituted by embedding the URL of an original document and the URL of a template of a structured document processing apparatus in an HTTP request. In this embodiment, particularly in a URL string contained in an HTTP request, the URL of an original document and the URL of the a template are embedded in a predetermined syntax format.

Another a URL of an HTTP request wherein other URLs are embedded in the URL is called a "virtual URL." That is, a processing invocation description of this embodiment is constituted as a virtual URL. For the syntax of processing invocation description and a method of embedding and retrieving according to the syntax, if necessary, see Japanese Patent Publication No. 2746218 "Resource Management Apparatus and Resource Management Method" already assigned to the applicant.

The processing invocation description analyzing unit analyzes an HTTP request according to a predetermined syntax format and retrieves the URL of an original document and the URL of a template. The configuration and operation characteristics of functional blocks other than the processing invocation description analyzing unit in the structured document processing system are almost the same as those of the first embodiment.

The structured document processing server receives a processing invocation description of an HTTP request wherein the URL of the HTTP request contains the URL of an original document and the URL of a template, inputs the original document and template specified in the processing invocation description to synthesize a document processing description, and interprets the document processing description and performs structured document processing.

An example of a processing invocation description used in this embodiment is shown below.

URL of original document 1: http://host1/Sample1.html

URL of original document 2: http://host2/Sample2.html

URL of template 1: http://host3/Template1.html

URL of structured document processing server: http://server/HTMLTools?method=fill Processing invocation description (URL of HTTP request)

http://server/HTMLTools?method=fill&template=http %3A %2F %2Fhost3%2FTemplat e1.html&file1=http %3A %2F %2Fhost1%2FSample1.html&file2=http %3A %2F %2Fhost2%2FSample2.html In the processing invocation description example shown above, the URL of the template is embedded in and after the string "template=" and before the next "&." ":" and "/" contained in the original URL is converted to "%3A" and "%2F", respectively. The URLs of the original documents 1 and 2 are embedded in and after the string "file1=" and before the next "&", and are embedded in and after "file2=", respectively.

According to the URL notation as described in Japanese Patent Publication No. 2746218, a virtual URL to initiate structured document processing servers at two stages can be hierarchically constituted. For example, original documents and templates may be the results of processing by different structured document processing servers. However, the URLs of the original documents and templates in this case are virtual URLs based on the URL of a second structured document processing server. URL of original document 3: URL of the HTTP request (virtual URL of processing result)

URL of template 2: http://host3/Template2.html

Figure 14:
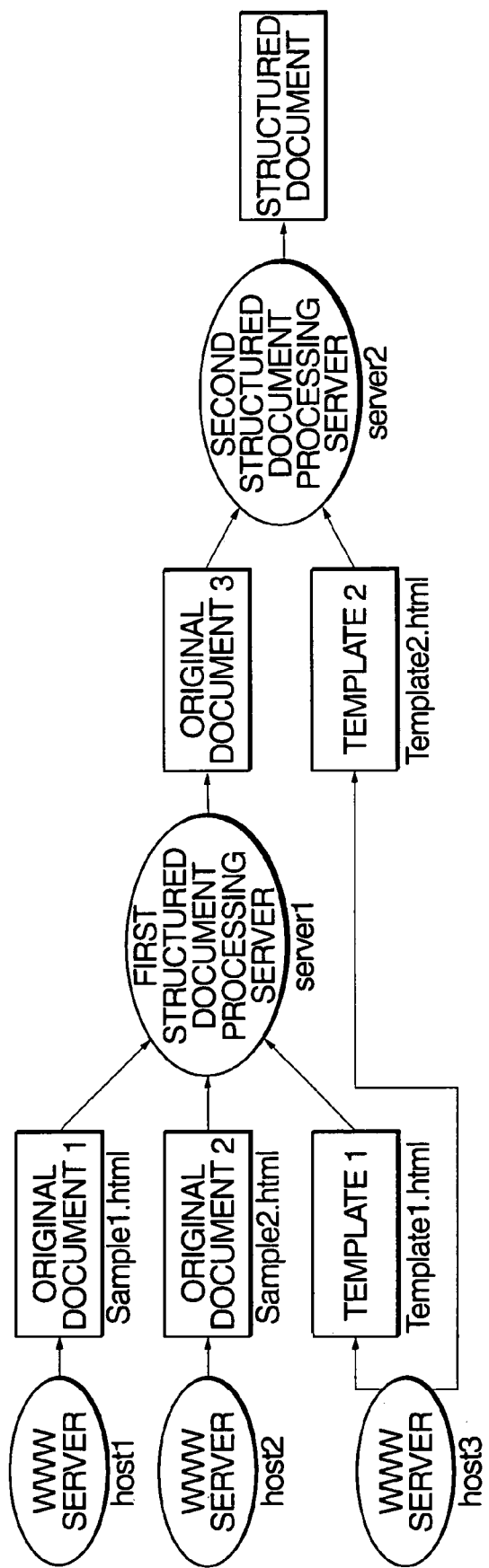
FIG. 14 shows the flow of processing initiated by the above-described second processing invocation description.

URL of second structured document processing server: http://server2/HTYMLTools?method=fill Second processing invocation description with the document processing description as original documents:

http://server2/HTMLT001s?method=fill&template=http%3A%2F%2Fhost3%2FTemplate2.html&file1=http%3A%2F%2Fserver%2FHTMLTool%3Fmethod%3Dfill%3Ftemplat%3Dhttp%253A%252F%252Fhost3%252FTemplate1.html%26file1%3Dhttp%253A%252F%252Fhost1%252FSample1.html%26file2%3Dhttp%253A%252F%252Fhost2%252FSample2.html FIG. 14 shows the flow of processing invoked by the above-described second processing invocation description.

To the second structured document processing server (server2), an HTTP request indicating that the original document 3 is processed using the template (Template.html) is inputted. The HTTP request is described using a virtual URL.

The template 2 (Template2.html) is provided by a WWW server (host3) and is specified by an ordinary URL notation "http://host3/Template2.html."

On the other hand, the original document 3 is the result of processing by the first structured document processing server (server1). To be more specific, the processing result is the product of processing the original document 1 (Sample1.html), which is a resource of a WWW server (host 1), and the original document 2 (Sample2.html), which is a resource of a WWW server (host 2), using the template 1 (Template1.html), which is a resource of the WWW server (host3).

Accordingly, the first structured document processing server inputs the original documents 1 and 2, and the template 1 from the appropriate WWW servers, and passes the original document 3 produced as a result of the processing to the second structured document processing server.

Next, the second structured document processing server further inputs the original document 2 from the WWW server (host3), processes the original document 3, and returns a structured document produced as a result of the processing to a requesting source as an HTTP response.

According to the structured document processing system as shown in FIG. 13, document processing instructions can be managed and processed in distributed manner. Consequently, more flexible document processing can be provided in response to document revisions and changes of a processing system. Since servers to process documents can be handled as modules, a flexible document processing system can be created which enables end users to easily perform customization by combining original documents, templates, and document processing modules on a document processing description.

Next, a sixth embodiment of the present invention is described.

In this embodiment, the first structured document processing server and the second structured document processing server of the fifth embodiment share a single database.

The database uses URLs as identifiers or processing invocation descriptions as keys and stores the parse trees of structured documents corresponding to the URLs or processing invocation descriptions. Therefore, by specifying a URL or processing invocation description, a desired parse tree can be retrieved. Such a database can be implemented by computing a proper hash value from a URL or processing invocation description and searching a table storing pointers to data making up the parse by the hash method (the hash method is described in detail in, e.g., "Algorithm and Data Structure", Iwanami Shoten, Publishers, section 2.4, pages 123 to 137).

Figure 15A:
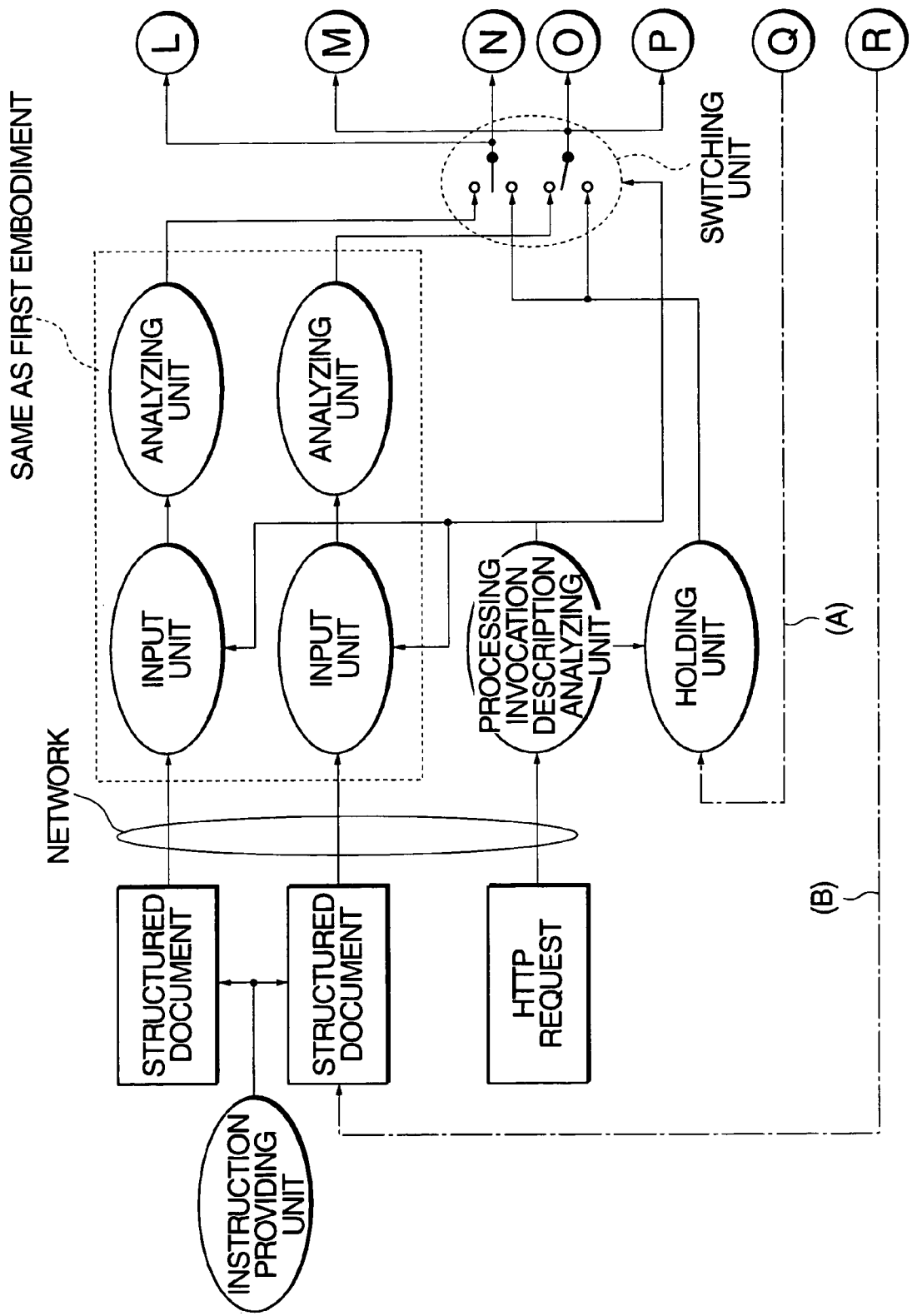
FIG. 15 is a functional block diagram schematically showing the configuration of a structured document processing system of a sixth embodiment of the present invention.

FIG. 15 is a functional block diagram of a first synthesizing server of this embodiment. It is to be appreciated that, in this embodiment, a second (or succeeding) synthesizing server has almost the same configuration and operation characteristics as the first synthesizing server.

The first synthesizing server is implemented as an HTTP server that inputs an HTTP request, performs specified structured document processing, and outputs a synthesized structured document as an HTTP response. This embodiment is almost the same as the first embodiment, except for the two points described below.

(1) The extracting unit, the repetitive duplication unit, and the replacing/substituting unit input parse trees via the switching unit instead of inputting parse trees from the analyzing unit.

(2) The switching unit checks a system status and switches between the analyzing unit or the holding unit to input parse trees.

A system status can be judged by using an in-process processing invocation description as key and determining whether a pertinent parse tree is stored in the holding unit.

If the pertinent parse tree is stored in the holding unit, since there is no need to newly analyze the structured document, control is switched to input the parse tree from the holding unit. In this case, the parse tree is processed according to the direction of the arrow of the alternate long and short dash line indicated by the symbol (A) of FIG. 15.

On the other hand, if no pertinent parse tree is stored in the holding unit, the switching unit makes switching so as to newly input parse trees from the analyzing unit. In this case, input/output is performed according to the direction of the arrow of the alternate long and short dash line indicated by the symbol (B) of FIG. 15.

According to the configuration of the structured document processing system of this embodiment, the result of processing by the first synthesizing server can be inputted to the second (succeeding) synthesizing server in the form of parse trees. Accordingly, two processing steps, conversion of structured documents into HTML by the output unit and HTML analysis by the analyzing unit, can be omitted.

Since results computed in the first synthesizing server are stored in the holding unit, instead of the second synthesizing server inputting a processing invocation description to the first synthesizing server, which newly processes it, by using a parse tree corresponding to the processing invocation description already computed, computations and synthesis processing in the first synthesizing server can be omitted.

Accordingly, efficient distributed document processing can be performed which is better in processing performance than conventional processing.

Next, a seventh embodiment of the present invention is described.

Figure 16A:
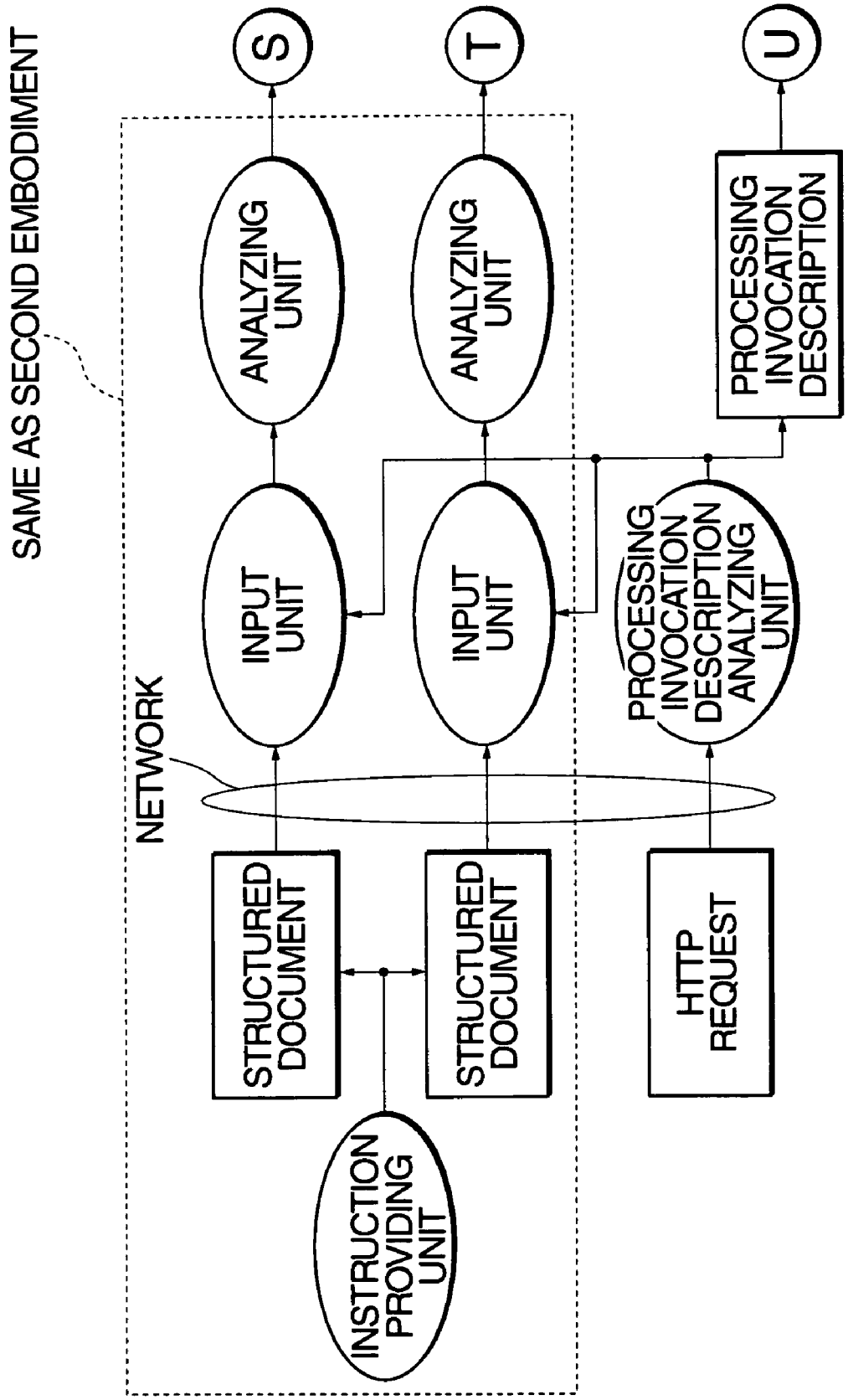
FIG. 16 is a functional block diagram schematically showing the configuration of a structured document processing system of a seventh embodiment of the present invention.
Figure 16B:
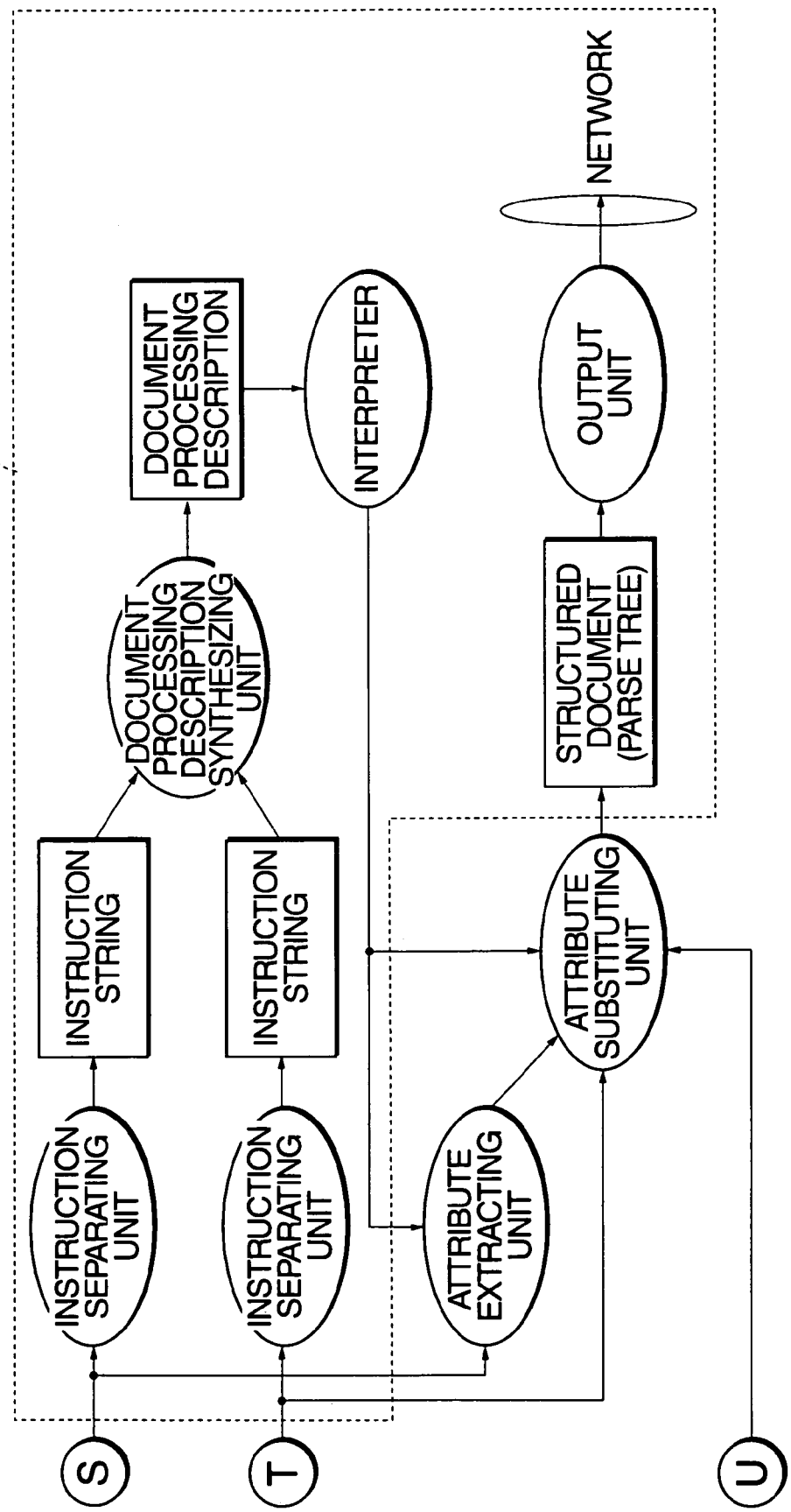

FIG. 16 is a schematic diagram showing the configuration of a structured document processing system of a seventh embodiment of the present invention. The structured document processing system of this embodiment further includes the processing invocation description analyzing unit of the fifth embodiment, in addition to the configuration of the above-described second embodiment.

In the second embodiment, attribute substitution is performed between document parts respectively specified by attribute extraction instructions and attribute substitution instructions. In contrast, in this embodiment, attribute extraction instructions specify not document parts but procedure names. Attribute substitution instructions replace the attribute of a specified document part by the result of conversion by a procedure specified in an attribute extraction instruction. The processing invocation description analyzing unit is almost the same as that of the fifth embodiment; hereinafter, differences from the second embodiment are primarily described.

In this embodiment, attribute extraction instructions are described in a format as shown below.

Attribute Extraction Instruction

<!--#GET LABEL procedure name-->

<!--#/GET→-->

Unlike the second embodiment, attribute extraction instructions need not specify a tag name to be substituted or sandwich a document part between a start tag and an end tag. Attribute substitution instructions are the same as those of the second embodiment.

An HTML file provided with an attribute extraction instruction is shown below as a fourth original document.

<HTML>

<HEAD>

<TITLE> Sample3</TITLE>

</HEAD>

<BODY>

<H2>link collection </H2>

<HR>

<!--#GET link Proc1-->

<!--#/GET-->

<HR>

</BODY>

</HTML>

The analyzing unit analyzes whether comment tags follow the rules described below.

"#GET<blank><LABEL string><blank><procedure name string>"→Attribute extraction instruction start tag "#/GET"→Attribute extraction instruction start tag

*Attribute substitution instructions are the same as those in the second embodiment.

Since attribute extraction instructions have no target tags, they do not perform the processing that a document part is searched for target tags.

Although the instruction separating unit is also the same as that of the second embodiment, since attribute extraction instructions are provided with a procedure name as an argument instead of a tag name, the instruction separating unit outputs the procedure name as an operand. An instruction string separated from the fourth original document by the instruction separating unit is shown below.

| Operation code | Label | Procedure name |
|---|---|---|
| GET | Link | Proc1 |

The document processing description synthesizing unit is different from the second embodiment in procedure C, which synthesizes instructions. The document processing description synthesizing unit synthesizes a new instruction from a pair of an attribute extraction instruction and an attribute substitution instruction. For example, "SUBST procedure-name tag-name document-name attribute-name" is synthesized from a pair of "GET LABEL procedure-name" and "PUT LABEL tag-name attribute-name document-part." SUBST selects an attribute values specified in an attribute name from the attribute field of the node of a tag name contained in a document part and converts the attribute value according to a procedure specified in a procedure name.

The document processing description synthesizing unit performs processing as described below in step 46 and subsequent steps, which are different from those of the second embodiment.

Step 46b: A procedure name is retrieved from operands of a GET instruction stored as the m-th element of the GET array. A tag name, an attribute name, and a document part as document part ID are retrieved from operands of a PUT instruction stored as the m-th element of the PUT array.

Step 47b: The following instruction is added to the document processing description. In this example, an operation code is SUBST and operands are a procedure name, a tag name, a document part, and an attribute name.

SUBST procedure-name tag-name document-part attribute-name

An example of a document processing description synthesized from the fourth original document and the third template by the above-described processing is shown below.

SUBST Proc1 AREA 6, [0 1 3 1] HREF

This instruction replaces the value of HREF attribute of AREA tag of a node [0 1 3 1] and its subordinate nodes of document 6 by the result of conversion by Proc 1.

The interpreter inputs a SUBST instruction to the attribute substituting unit. The operation of the attribute substituting unit of this embodiment is different from that of the second embodiment, in that it interprets a SUBST instruction and operates as follows. That is, the interpreter uses the attribute value of HREF attribute of target tag as a first argument to invoke a procedure Proc1, and sets a string obtained as the return value of Proc1 in the target tag as a new HREF attribute. Procedures are invoked in the form of procedure invocation (subroutine call) commonly known, and HREF attributes are retrieved and set by separating or coupling ordinary strings.

The following example is conceivable as a procedure for converting attribute values. If a document part provided with an attribute substituting instruction contains a node of a tag of type that can set URL in an attribute value field, the URL string is converted into a processing invocation description (virtual URL) described in the fifth embodiment. As an example of such a procedure, strings for identifying a template and a document set in an original URL are analyzed and a new processing invocation description resynthesized based on them is returned. Such URL strings are exchanged as arguments of the procedure.

An example of a URL description before conversion and an example of a processing invocation description after conversion are shown here. In the examples, the second of original documents contained in a processing invocation description inputted to the processing invocation analyzing unit is used as an original document to be contained in a processing invocation description to be newly synthesized. A template to be contained in the processing invocation description to be newly synthesized is different from a template contained in the inputted processing invocation description.

Original processing invocation description (inputted to the processing initiation description analyzing unit):

http://server/HTMLTools?method=fill&template=http%3A%2F%2Fhost3%2FTemplate1.html&file1=http%3A%2F%2Fhost1%2FSample1.html&file2=http%3A%2F%2Fhost2%2FSample2.html URL of template: http://host3/Template2.html URL ( ) before conversion: http://host3/Template2.html?file2=

URL after conversion (processing invocation description):

http://server/HTMLTools?method=fill&template=http%3A%2F%2Fhost3%2FTemplate2.html&file2=http%3A%2F%2Fhost2%2FSample2.html As another example of a procedure, instead of newly synthesizing a processing invocation description, the URLs of original documents contained in an original processing invocation description are returned without modification.

An example of a URL description before conversion and an example of a processing invocation description after conversion are shown below. The first of original documents contained in a processing invocation description inputted to the processing invocation analyzing unit is used as an original document.

Original processing invocation description (inputted to the processing invocation description analyzing unit):

http://server/HTMLTools?method=fill&template=http%3A%2F%2Fhost3%2FTemplate1.html&file1=http%3A%2F%2Fhost1%2FSample1.html&file2=http%3A%2F%2Fho st2%2FSample2.html URL( ) before conversion: dummy.html#file1

URL after conversion (processing invocation description):

http://host/Sample1.html

The URL before conversion shown in the above example is a specific description method defined here. The URL before conversion may, in the example of the third template, be set as the HREF attribute value of AREA tag.

As arguments of a procedure, date, system status variables, and the like obtained using OS system calls may be used.

Next, an eighth embodiment of the present invention is described.

Figure 17B:
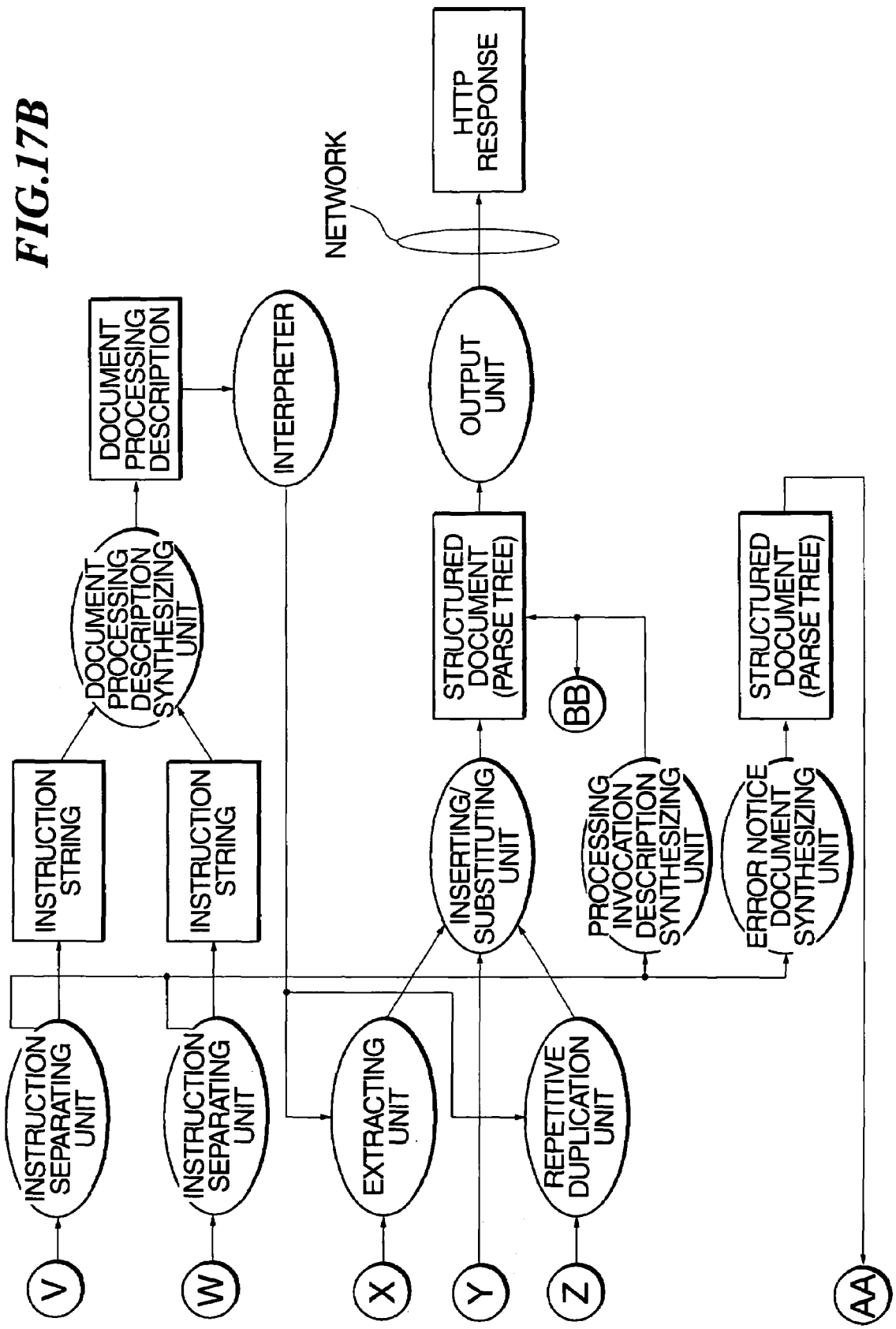
FIG. 17 is a functional block diagram schematically showing the configuration of a structured document processing system of an eighth embodiment of the present invention.

FIG. 17 is a schematic diagram showing the configuration of a structured document processing system of a seventh embodiment of the present invention. The structured document processing system of this embodiment further includes the processing invocation description analyzing unit and the error notice document synthesizing unit, in addition to the configuration of the above-described sixth embodiment.

The instruction separating unit of this embodiment, in addition to the operation of the instruction separating unit of the first embodiment, detects syntax errors of instructions detected during extraction of instruction strings, and inputs error information to the error notice document synthesizing unit. The error information referred to herein may be information often used in ordinary error processing such as an error type and a position (line count) in a document in which an error was detected (methods for detecting errors and performing error processing in the instruction separating unit are described in detail in, e.g., Iwanami Lecture Series Software Science 5, "Compiler System for Progranmming Language", Iwanami Shoten, Publishers, pages 89, 123 to 125, and 206 to 208).

The output unit of this embodiment, in addition to the operation of the output unit of the first embodiment, inserts a processing invocation description synthesized by the processing invocation description synthesizing unit in an HTML document as output results. The operation procedure is described below.

The error notice document synthesizing unit inputs error information and synthesizes documents for error notice. Error information is, e.g., an error number, and an error document is a file using the error number as a file name. The error notice document synthesizing unit regards an error number inputted from the instruction analyzing unit as a file name and inputs one of error notice documents from the file. The inputted document is used by the analyzing unit to generate a parse tree. The parse tree is generated in the same way as in the first embodiment. Although the parse tree is held in the holding unit as described later, it need not always be generated and the inputted document may be held in the holding unit in the form of string information without having to be transformed into a parse tree. For example, an error number 1 may be the error that no correspondence is taken between an extraction instruction start tag and an extraction instruction end tag, and the file name of an error notice document may be file-1.html.

An example of a file is shown below.

<HTML>

<HEAD>

<TITLE> error 1</TITLE>

<BODY>

During processing of an original file, the error that no correspondence is taken between an extraction instruction start tag and an extraction instruction end tag occurred.

</BODY>

</HTML>

The processing invocation description synthesizing unit synthesizes URL for accessing error notice pages. For example, if a synthesizing server that performed the document processing is "server" and the process number of a process that performed the document processing is 12345, a URL containing the process number is synthesized as shown below.

http://server/HTMLTools?method=userlog&pid=12345

Next, the operation of the output unit of this embodiment is described, centering on differences from that of the first embodiment. For example, if a processing invocation description as described above is inputted, a string <META USERLOG="http://server/HTMLTools?method=userlog&pid=12345"> is synthesized and inserted in an HTML document to be outputted. Such insertion is string synthesis and string insertion processing commonly known. Part (example 7-A) of the HTML document in which the string has been inserted is shown below.

<HTML>

<HEAD>

<META USERLOG="http://server/HTMLTools?method=userlog&pid=12345">

</HEAD>

. . .

An example of the HTML document in which another synthesized string is inserted is shown below.

<HTML>

<HEAD>

<SCRIPT LANGUAGE="JavaScript"><!--window.open ("http://server/HTMLTools?method=userlog&pid=12345"); //-->

</SCRIPT>

</HEAD>

An error notice document synthesized by the error notice document synthesizing unit is stored and held in the holding unit, using a URL synthesized by the processing invocation description synthesizing unit as key information. The operation of storing documents in the holding unit is different from that in the sixth embodiment.

In the above-described sixth embodiment, a first processing invocation description is given as a request or an HTTP request from a WWW client. Next, processing invocation description processing is performed, and a document synthesized as processing results is stored in the holding unit, using the first processing invocation description as key. On the other hand, in this embodiment, a second processing invocation description for obtaining a subsequent error notice document is synthesized in a synthesizing server before a request for an error notice document, and is stored in the holding unit (before an actual request is inputted).

This embodiment is described below using as an example the case where an error occurs when document processing is performed in a synthesizing server.

For the above-described 7-A type, a user searches the contents of an HTML document sent by an HTTP response outputted from the server for a META tag having the USERLOG attribute and obtains a URL corresponding to the processing invocation description of an error notice document. The user sends a second HTTP request containing the URL to the server. The synthesizing server retrieves the processing invocation description contained in the HTTP request by the processing invocation description analyzing unit, uses it as key to search for the document, and obtains the error notice document. As subsequent processing, the same operation procedure as in the first embodiment is performed and an error notice document is outputted as a new HTTP response.

If the error notice document is treated as a template, proper document processing is performed and a document is outputted. In this case, it is conceivable to insert a position (line count) in which an error occurred and the ID of a document in which an error occurred. Arguments (input parameters) for such document processing can be included in a document processing description according to a URL description method for HTTP servers which is widely known as CGI (Common Gateway Interface) in the area of information processing industry.

For a type as shown in the example 7-B, by inserting a script description (e.g., JavaScript language) for automatically sending a second HTTP request containing the URL in an HTML document sent by a (first) HTTP response outputted by the server, an error notice document can be automatically obtained without human intervention. For example, on receiving the first HTTP response, a WWW browser executes the script contained in the HTML document. The script describes that an error notice document obtained by sending the processing invocation description to the server is displayed by opening a predetermined window. It is to be understood that other operations are almost the same as those in the example 7-A.

In short, in the configuration of this embodiment, errors occurring in the process of document processing can be reported to users, aside from the synthesizing results of the document processing. Therefore, advanced and flexible document processing applications can be created. Furthermore, the structured document processing system can operate so that an error notice document is generated at the point where an error occurs, is stored in a holding unit that temporarily stores the results of document processing (before a request for the error notice document), and is outputted for a subsequent request for the error notice document. Consequently, there need not be provided a mechanism for holding error types and error information in association with processes in which the errors occurred.

The present invention has been described while referring to specific embodiments. It is self-explanatory that those skilled in the art can modify and substitute the embodiments without departing from the spirit and scope of the present invention. That is, the present invention has been disclosed by way of illustration and should not be limitedly interpreted. To judge the spirit and scope of the present invention, the appended claims should be referred to.

As has been described, the present invention can provide an excellent structured document processing system and structured document processing method that disassemble a document into chapters, sections, paragraphs and charts, or plural primitives such as captions, chapter titles, and summaries to represent and handle the document using a structure such as a tree structure or graph structure with the primitives as nodes.

Also, the present invention can provide an excellent structured document processing system and structured document processing method that can newly synthesize a document from plural structured documents.

Also, the present invention can provide an excellent structured document processing system and structured document processing method that retrieve document portions ("document parts") satisfying specific conditions from plural structured documents and insert or substitute the document parts in other documents for document synthesis.

Also, the present invention can provide an excellent structured document processing system and structured document processing method that synthesize structured documents without using a script that describes a procedure for extracting document parts from structured documents, and inserting or substituting the document parts in a template.

What is claimed is:

1. A structured document processing system for processing a structured document that is structurally represented and contains one or more document parts, the structured document processing system comprising:

a processor;

rule providing means for providing a plurality of extraction rules to extract a document part, a repetitive duplication rule to duplicate a document part by a given number of times, or an insertion/substitution rule to insert or substitute a document part to a corresponding document part, the rule providing means embedding the plurality of rules in a plurality of structured documents containing the document part;

a processing invocation description analyzing means for analyzing processing invocation descriptions;

analyzing means for analyzing the structure of the structured documents to generate parse trees;

a plurality of rule separating means for separating the rules embedded in the structured documents and the document part to retrieve the rules, based on the parse trees generated by the analyzing means;

document processing synthesizing means for synthesizing a document processing rule string based only on the rule embedded in each structured document, the document processing description synthesizing means merging and sorting the extraction rule embedded in a first structured document and retrieved by the rule separating means, and the repetitive duplication rule and/or insertion/substitution rule embedded in a second structured document and retrieved by the rule separating means from a second structured document in which the repetitive duplication rule and/or insertion/substitution rule is embedded, to synthesize a document processing rule string for processing the first and second structured documents;

extracting means for retrieving a first document part subject to the extraction rule from the first structured document;

repetitive duplication means for repeatedly duplicating a document part subject to the repetitive duplication rule and a rule provided to the document part by a given number of times;

an error notice document synthesizing means for synthesizing syntax errors of rules detected by the rule separating means for an error notice;

a processing invocation description synthesizing means for synthesizing the processing invocation descriptions and error notice for assessing an error notice page;

inserting/substituting means for inserting the first document part before or after a second document part subject to the insertion/substitution rule or substituting the first document part for the second document part; and an interpreter for sequentially executing the document processing rule string and synthesizing document parts by using the extracting means, the repetitive duplication means, and/or the inserting/substituting means.

2. The structured document processing system according to claim 1, wherein:

the extraction rules are attribute extraction rules that specify retrieval of an attribute of a document part;

the insertion/substitution rule is an attribute substitution rule that specifies substitution of an attribute of a document part;

the rule separating means retrieve the attribute extraction rules and attribute insertion/substitution rule from a structured document;

the inserting/substituting means is attribute substituting means for substituting an attribute of the first document part for an attributes of the second document part subject to the attribute substitution rule; and the interpreter executes the document processing rule string synthesized by the document processing synthesizing means, extracts the attribute of a given node of the document part specified in the attribute extraction rules, and sets the extracted attribute in the given node of the document part specified in the attribute substitution rule.

3. The structured document processing system according to claim 2, wherein the attribute substituting means makes, in accordance with the attribute substitution rule, substitution of a string synthesized by combining an attribute value string set in advance in the document part and a string obtained from a state of the system.

4. The structured document processing system according to claim 2, wherein:

the structured document processing system inputs a processing invocation description containing a file name of the first structured document in which the extraction instruction specifying the extraction of a document part is embedded, and a file name of the second structured document in which the repetitive duplication instruction or attribute substitution instruction is embedded; and the attribute substituting means sets a string obtained by replacing part of the processing invocation description by an attribute string set in advance in the document part, as the attribute string of the document part.

5. The structured document processing system according to claim 1, wherein:

the extraction rules include a path name;

each of the repetitive duplication rule and insertion/substitution rule includes a pattern expression;

the rule separating means retrieve, from the structured document, the extraction rules and the path names, or the repetitive duplication rule, the insertion/substitution rule, and the pattern expressions;

the repetitive duplication means performs pattern matching between the path name provided to the extracted document part and the pattern expression, and performs repetitive duplication by the number of document parts having a matching path name; and the inserting/substituting means performs pattern matching between the path name provided to the extracted document part and the pattern expression, and inserts or substitutes a document part having a matching path name.

6. The structured document processing system according to claim 1, wherein the inserting/substituting means inserts or substitutes the extraction rules provided to the document part retrieved by the extracting means.

7. The structured document processing system according to claim 5, wherein the inserting/substituting means, when inserting or substituting the extraction rules provided to the document part retrieved by the extracting means, changes the path names included in the extraction rules and then inserts or substitutes the extraction rules.

8. A structured document processing system for processing a structured document containing one or more document parts and structurally represented, the processing being implemented by cooperative processing through computer communications on a distributed network system constituted of two or more networked computers, the structured document processing system comprising at least:

a file server that stores a structured document as a file of a predetermined format, and in response to the receipt of a file name, sends a corresponding file via the network; and a structured document processing server that performs document processing for the file, wherein the structured document processing server comprises:

input means for inputting and analyzing a processing invocation description containing the file name of a first structured document in which a plurality of extraction rules specifying extraction of a document part are embedded and the file name of a second structured document in which a repetitive duplication rule or insertion/substitution rule is embedded, sending the file name contained in the processing invocation description to the file server via the network, and inputting a file corresponding to the file name from the file server via the network;

a processing invocation description analyzing means for analyzing processing invocation descriptions;

document processing means for analyzing the first structured document and the second structured document to generate a parse tree, scanning the parse tree and separating the document part, the document processing means retrieving the extraction rules embedded in the first structured document and the repetitive duplication or insertion/substitution rule from the second structured document and merging and sorting the rules to synthesize a document processing rule string based only on the extraction rules embedded in the first structured document and the repetitive duplication instruction or insertion/substitution rule embedded in the second structured document, and executing the document processing rule string to synthesize a structured document;

an error notice document synthesizing means for synthesizing syntax errors of rules detected by the rule separating means for an error notice;

a processing invocation description synthesizing means for synthesizing the processing invocation descriptions and error notice for assessing an error notice page; and output means for outputting the synthesized structured document or the document part obtained by the document processing means as a file of a given format via the network.

9. The structured document processing system according to claim 8, wherein:

the processing invocation description may define a distributed file name on the network in a format in which the server name of the structured document processing server is contained;

at least first and second structured document processing servers to process the structured document exist on the network;

in a first processing invocation description inputted to the first structured document processing server, file names of a first original document and/or first template subject to document processing are described in a format of a second processing invocation description containing the server name of the second structured document processing server; and the first structured document processing server, in response to the input of the first processing invocation description, extracts the second processing invocation description described as the file names of the first original document and/or first template, sends it to the second structured document processing server via the network, receives a file containing a structured document or a document part outputted by the second structured document processing server invoking the second processing invocation description, via the network, and uses it as the first original document and/or first template.

10. The structured document processing system according to claim 9, wherein:

the second structured document processing server to input the second processing invocation description is configured on the same computer system as that of the first structured document processing server and does not require communications with the first structured document processing server via the network; and the first structured document processing server has switching means for inputting, in place of the file containing a structured document or document parts, the structured document or document part, which is the product of processing by the second structured document processing server, as a parse tree.

11. The structured document processing system according to claim 8, further comprising:

holding means for holding a parse tree of an original document or template inputted from the file server in association with a file name or a processing invocation description; and input means for inputting, instead of a structured document file corresponding to the file name from the file server, a corresponding parse tree from the holding means.

12. A structured document processing system for processing a structured document that is structurally represented and contains one or more document parts, the system comprising:

a processor;

analyzing means for analyzing a structure of the structured document to generate a parse tree;

a processing invocation description analyzing means for analyzing processing invocation descriptions;

rule separating means for separating, based on the parse tree generated by the analyzing means, a plurality of rules embedded in the structured document from a document part to which the rules are provided, retrieving the rules, and outputting error information upon detection of a syntax error of the rules;

an error notice document synthesizing means for synthesizing syntax errors of rules detected by the rule separating means for an error notice;

a processing invocation description synthesizing means for synthesizing the processing invocation descriptions and error notice for assessing an error notice page;

holding means for holding the error notice document.

13. A processor-implemented structured document processing method for processing a structured document that is structurally represented and contains one or more document parts, the method comprising the steps of:

analyzing the structured document in which rules are embedded to generate a parse tree;

detecting syntax errors in the rules;

scanning the parse tree and separating the rules from a document part, to which the rule is provided, to retrieve the rules embedded in the structured document;

analyzing processing invocation descriptions;

synthesizing the syntax errors detected in the rules;

generating an error notice based on the synthesized syntax errors;

synthesizing the processing invocation descriptions and the error notice for accessing an error notice page;

merging and sorting the rules retrieved from the structured document to synthesize a document processing rule string, based only on the rules embedded in the structured document; and executing the document processing rule string to synthesize a structured document.

14. A processor-implemented structured document processing method for processing a structured document that is structurally represented and contains one or more document parts, the structured document processing method comprising the steps of:
   (a) analyzing a first structured document, in which extraction rules specifying extraction of a document part are embedded, to generate a parse tree;
   (b) analyzing a second structured document, in which a repetitive duplication rule specifying duplication of a document part by a given number of times or an insertion/substitution rule specifying insertion or substitution of a document part is embedded, and generating a parse tree;
   (c) scanning the parse tree and separating the rules from the document part, to which the rules are provided, to retrieve the extraction rules are embedded in a first structured document and a repetitive duplication or insertion/substitution rule from a second structured document;
   (d) merging and sorting the extraction rules retrieved from the first structured document and the repetitive duplication rule and/or insertion/substitution rule retrieved from the second structured, and synthesizing a document processing rule string, based only on the extraction rule embedded in the first structured document and the repetitive duplication or insertion/substitution rule embedded in the second structured document;
   (e) executing the document processing rule string and retrieving a first document part subject to the extraction rules from the first structured document;
   (f) executing the document processing rule string and repeatedly duplicating a document part subject to the repetitive duplication rule and a rule provided to the document part by a given number of times;
   (g) executing the document processing rule string and inserting the first document part before or after a second document part subject to the insertion/substitution rule or substituting the first document part for the second document part; and
   (h) outputting a parse tree obtained as a result of execution of the steps (e) to (g).

* * * * *